United States Patent
Tsuji et al.

(12)

(10) Patent No.: US 6,522,347 B1
(45) Date of Patent: Feb. 18, 2003

(54) DISPLAY APPARATUS, PORTABLE INFORMATION PROCESSING APPARATUS, INFORMATION RECORDING MEDIUM, AND ELECTRONIC APPARATUS

(75) Inventors: Keisuke Tsuji, Fuchi (JP); Hiroaki Sakai, Shiojin (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/484,187

(22) Filed: Jan. 18, 2000

(51) Int. Cl.[7] .................................................. G09G 5/00
(52) U.S. Cl. ...................... 345/848; 345/419; 345/781; 345/836; 345/844; 345/835; 345/855
(58) Field of Search ................................. 345/784, 781, 345/844, 835, 848, 850, 855, 419, 427, 779, 775, 836, 839, 440

(56) References Cited

U.S. PATENT DOCUMENTS

| | | | | |
|---|---|---|---|---|
| 5,438,679 A | * | 8/1995 | Inomata et al. | 395/800 |
| 5,528,735 A | * | 6/1996 | Strasnick et al. | 345/127 |
| 5,621,906 A | * | 4/1997 | O'Neill et al. | 345/848 |
| 6,137,499 A | * | 10/2000 | Tesler | 345/440 |
| 6,169,552 B1 | * | 1/2001 | Endo et al. | 345/427 |
| 6,222,547 B1 | * | 4/2001 | Schwuttke et al. | 345/419 |
| 6,307,563 B2 | * | 10/2001 | Kimura | 345/474 |
| 6,370,533 B1 | * | 4/2002 | Sato et al. | 707/10 |

\* cited by examiner

Primary Examiner—John Cabeca
Assistant Examiner—Cuong T. Thai

(57) ABSTRACT

A display apparatus, a portable information processing apparatus, an information recording medium, and an electronic apparatus that can be easily applied to an apparatus of which the size of a display screen is smaller and by which plural types of information can be visually grasped without unnecessary operations to be performed and functions corresponding to icons can be easily understood. The display apparatus of the present invention comprises a display to combine a time axis with a background screen to be three-dimensionally displayed and to display the combined screen on a display screen, a width of the time axis changing to be wider as it approaches a past time and changing to be narrower as it approaches the future. The display apparatus also comprises a storage section to store background screen data used to display the background screen and time-axis display data used to display the time axis. The display apparatus further comprises a controlling section to display-control so as to combine the time axis with the background screen in accordance with the background screen data and the time-axis display data.

27 Claims, 71 Drawing Sheets

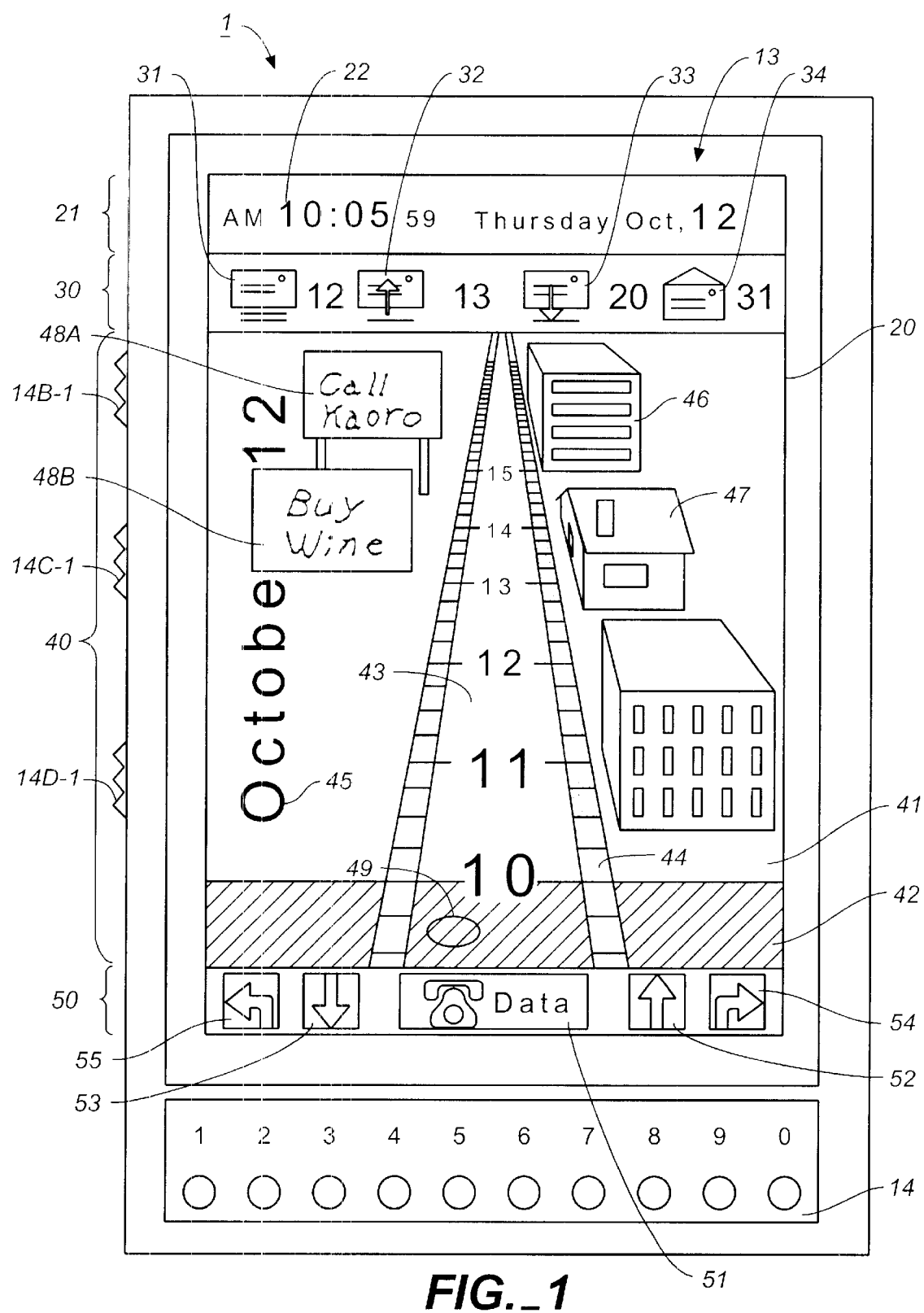
FIG._1

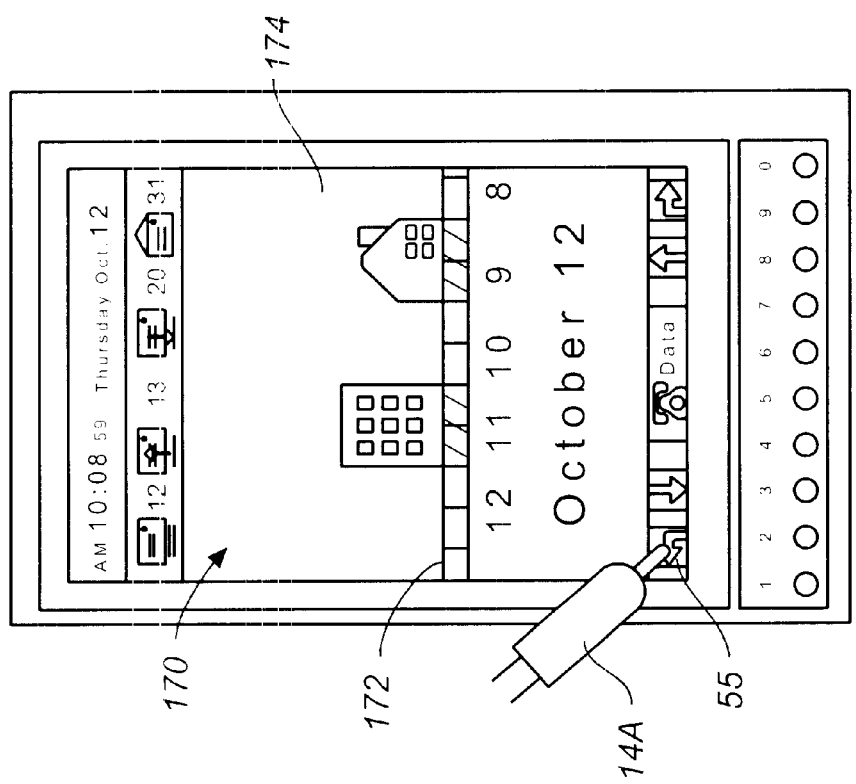
FIG._2B
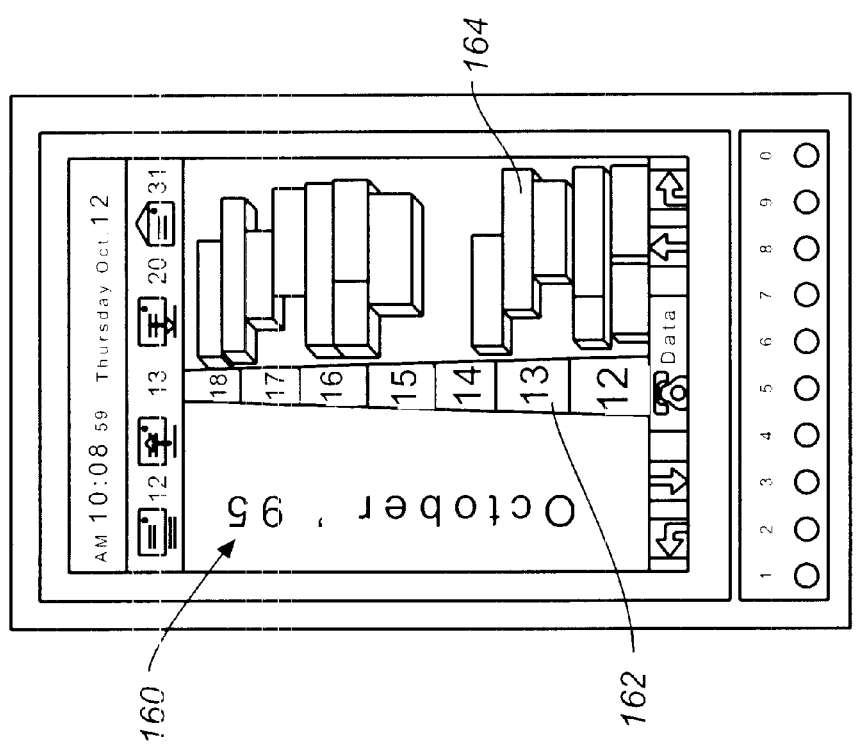
FIG._2A

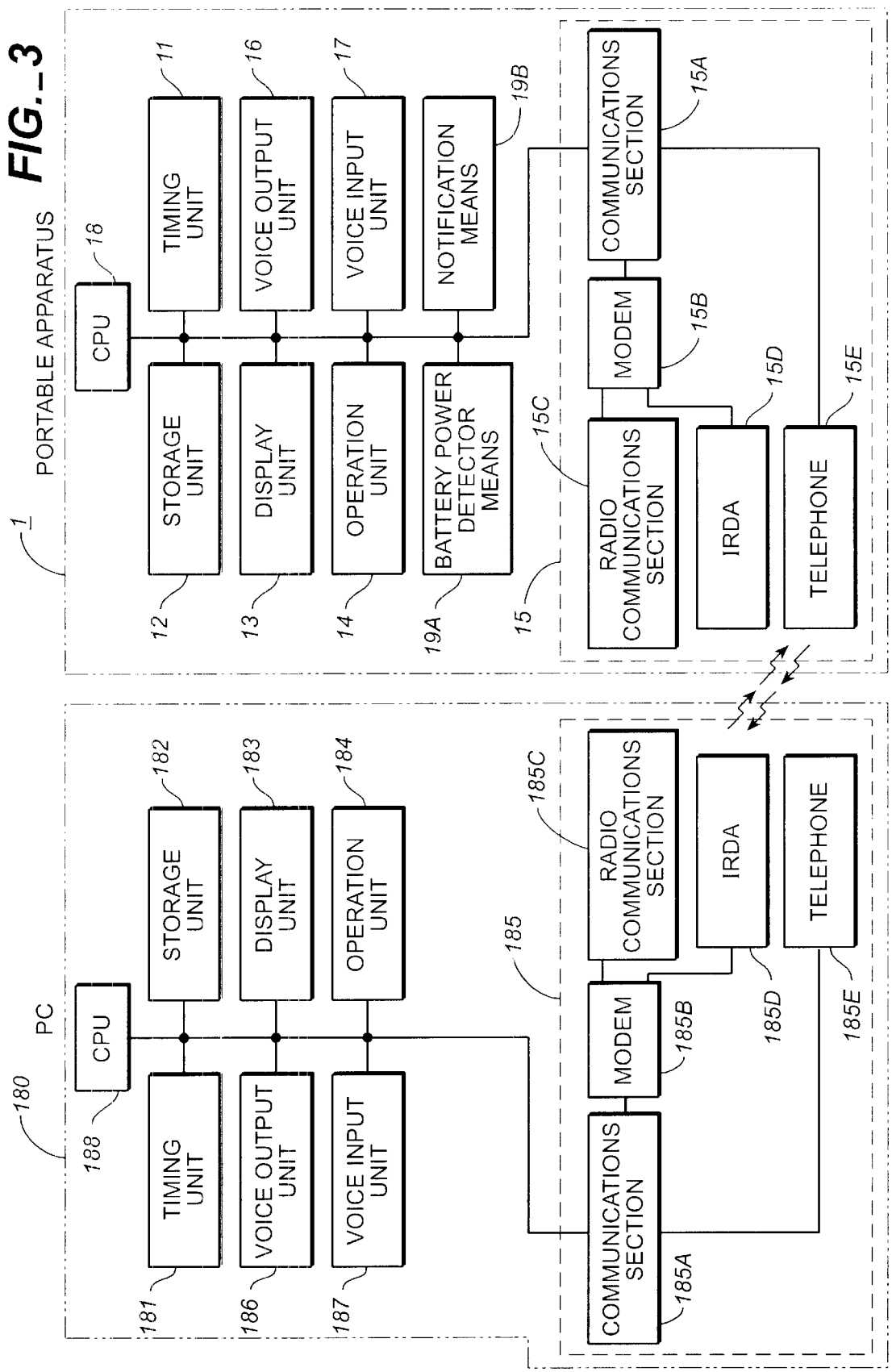

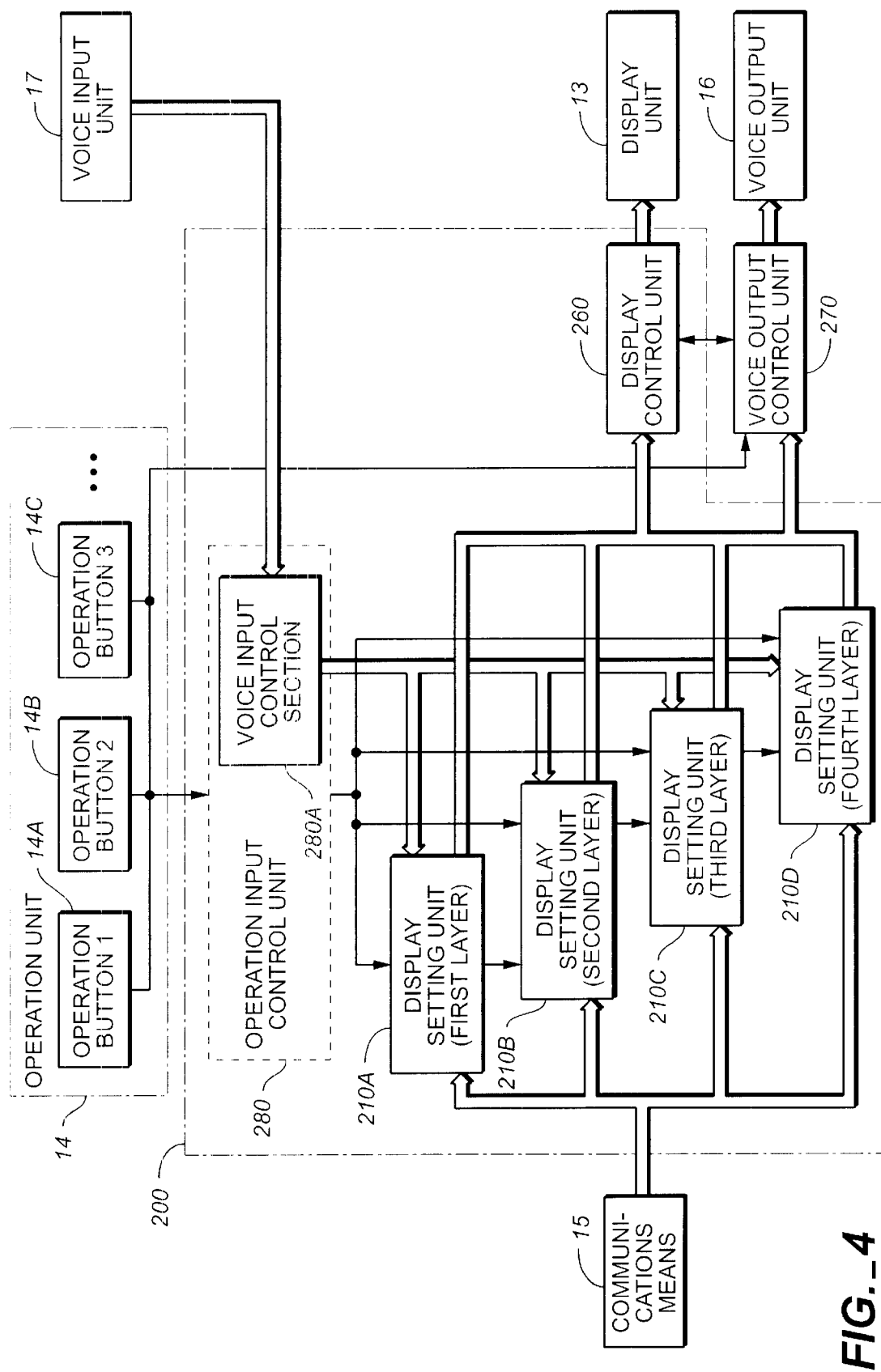
FIG._4

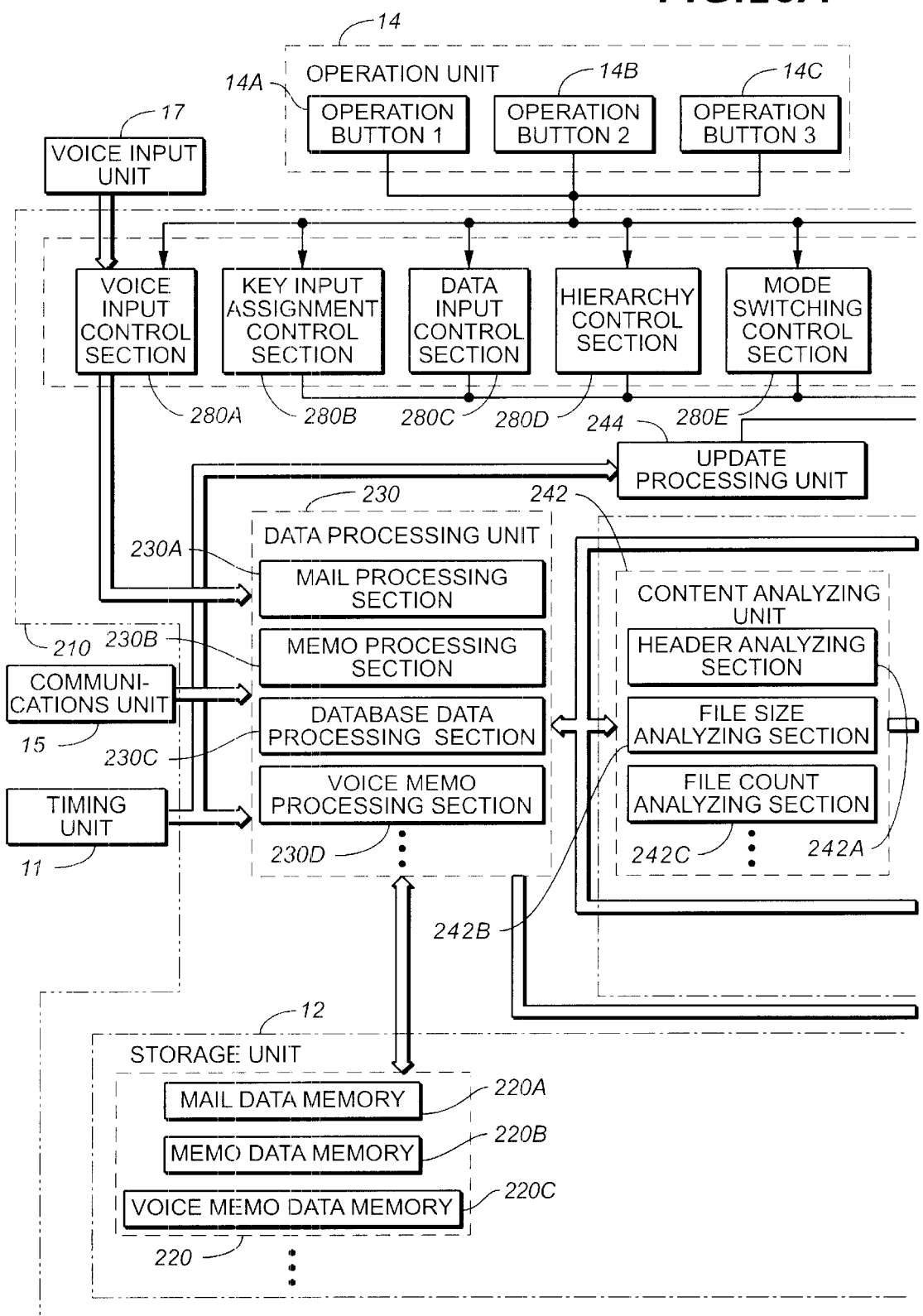
FIG._5A

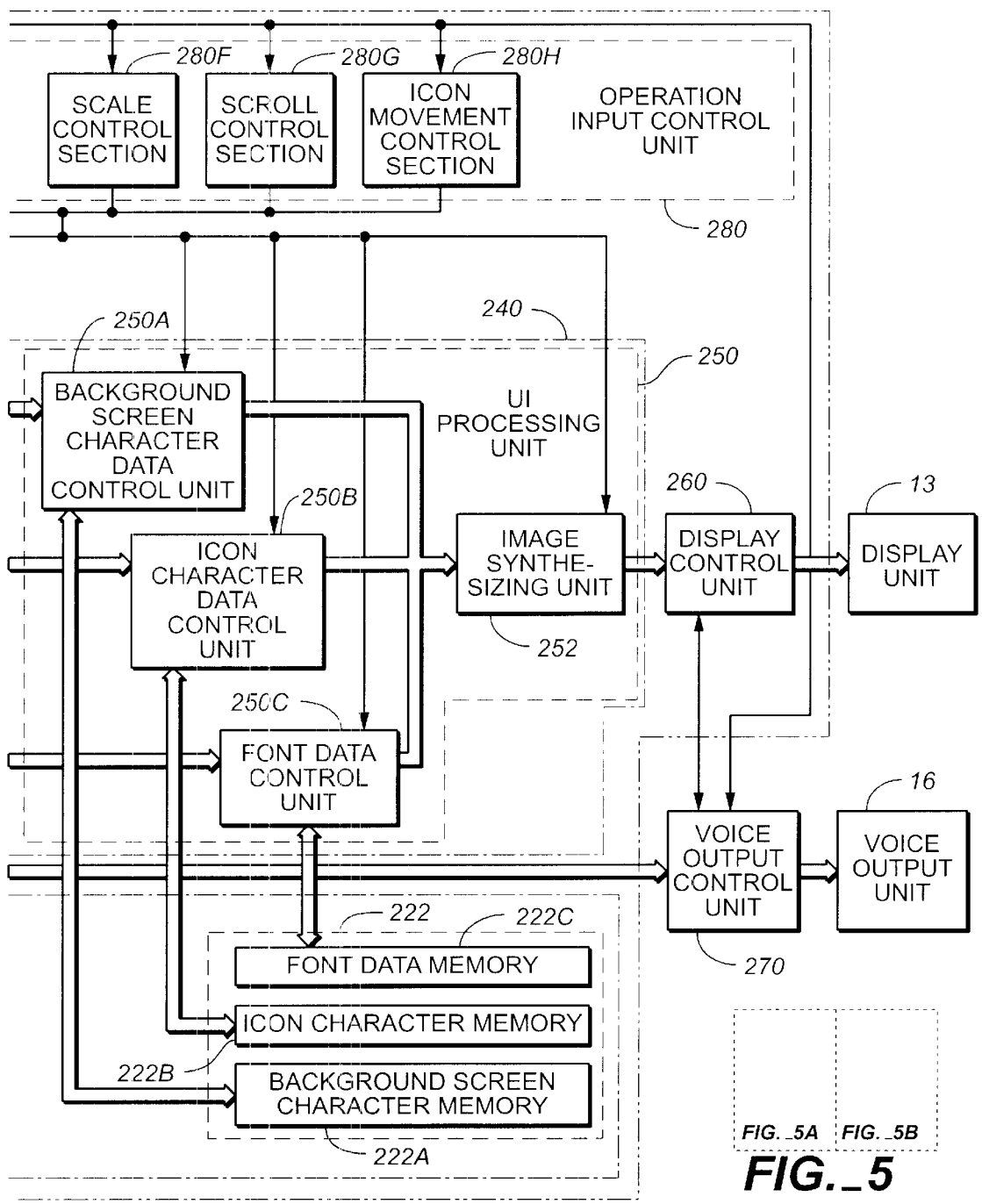
FIG._5B
FIG._5

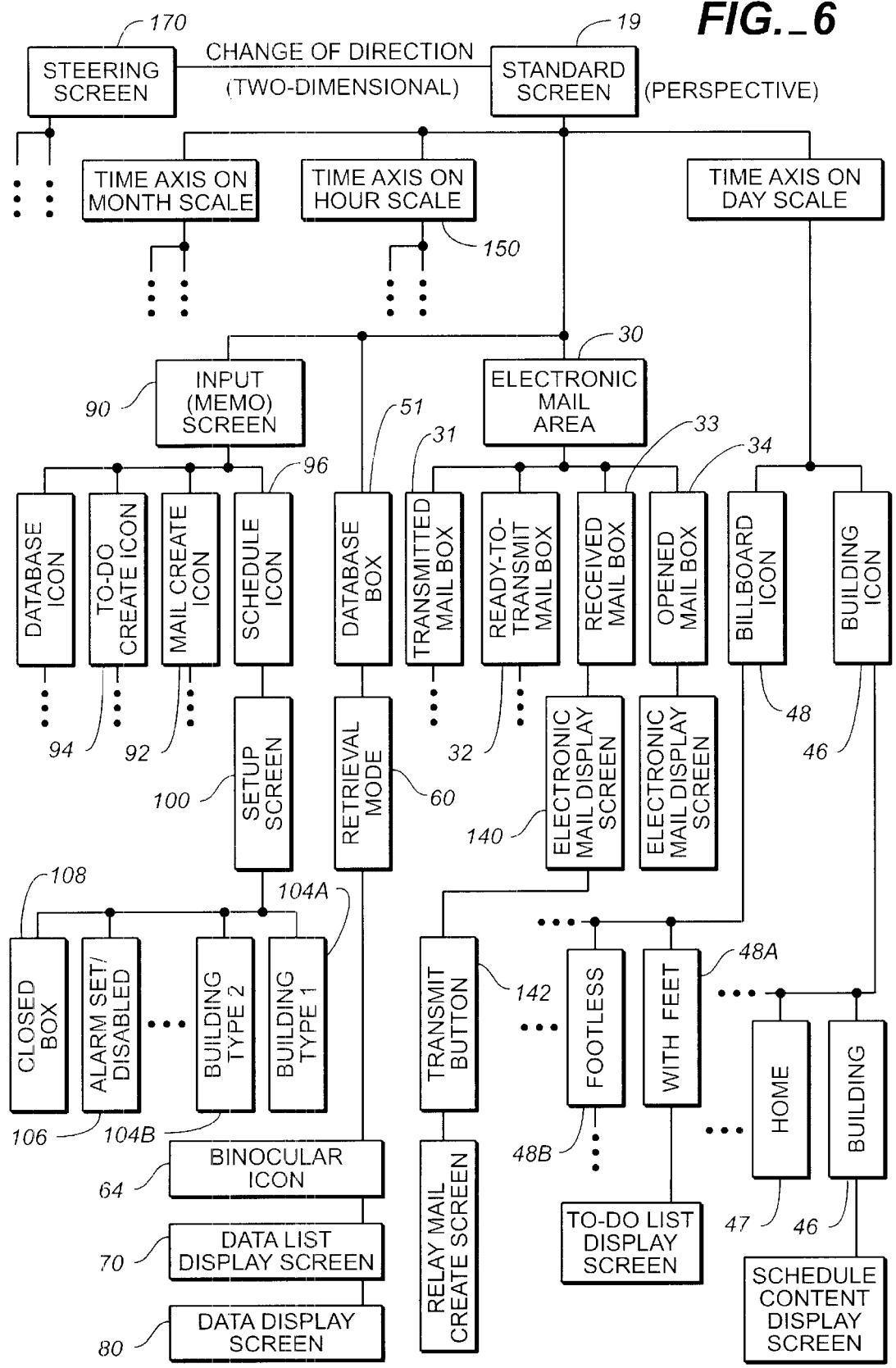
FIG._6

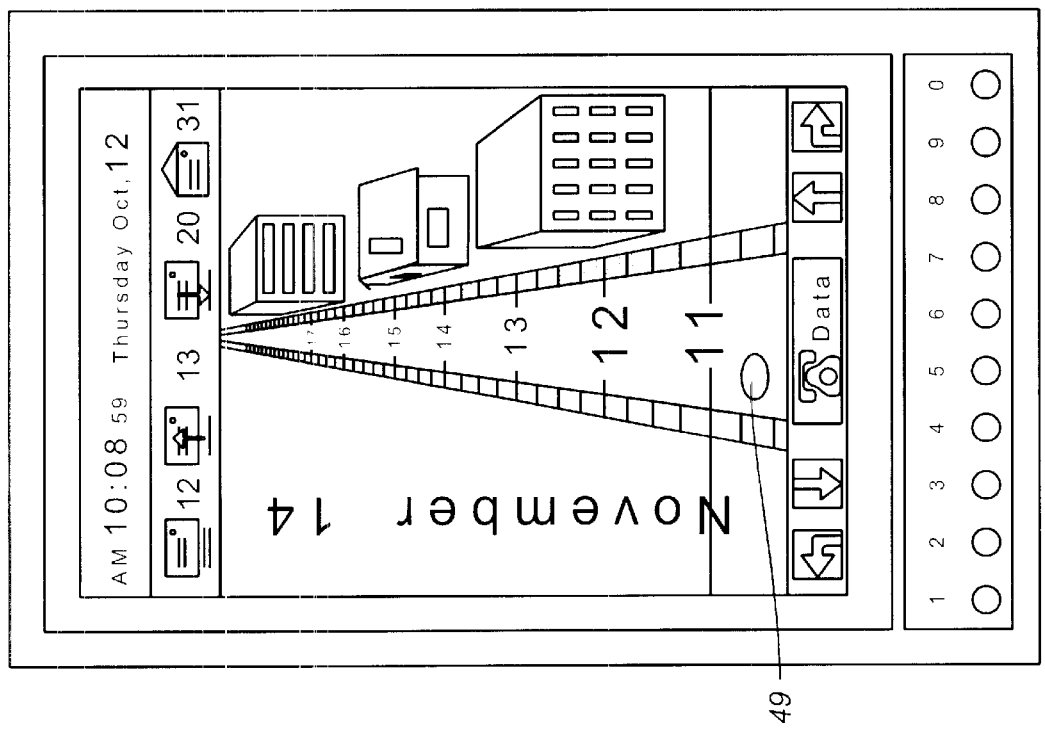
FIG._7B
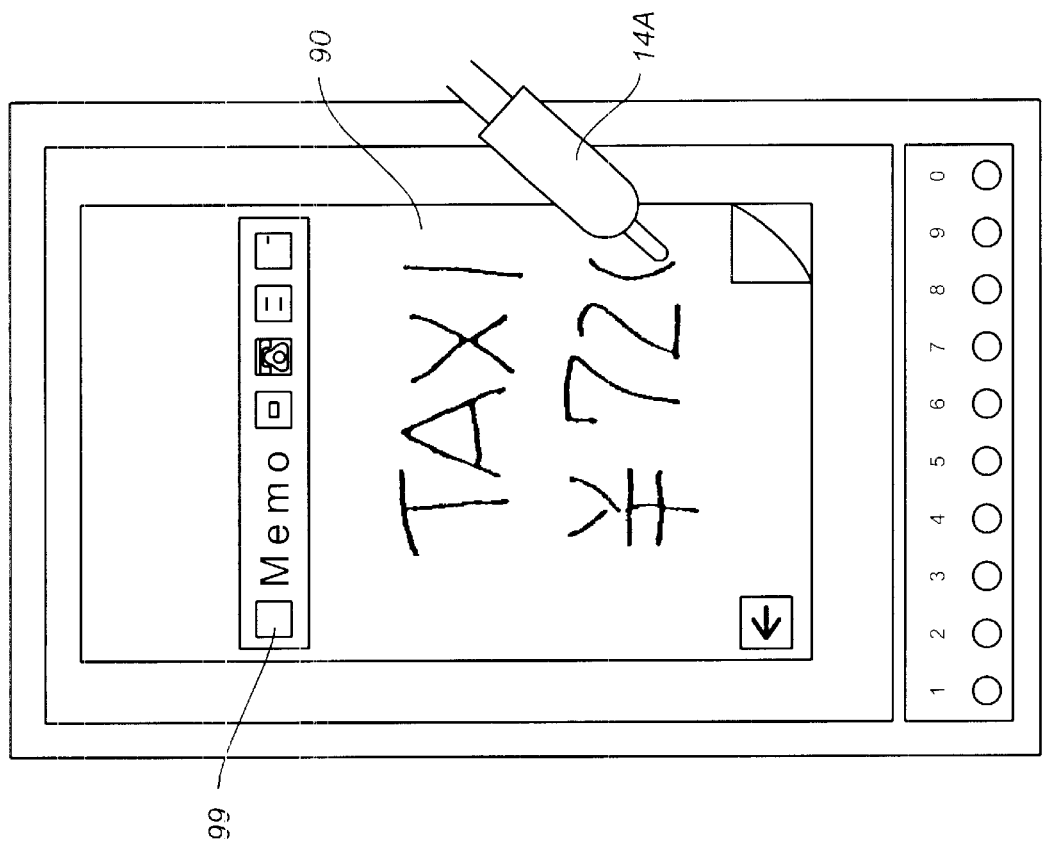
FIG._7A

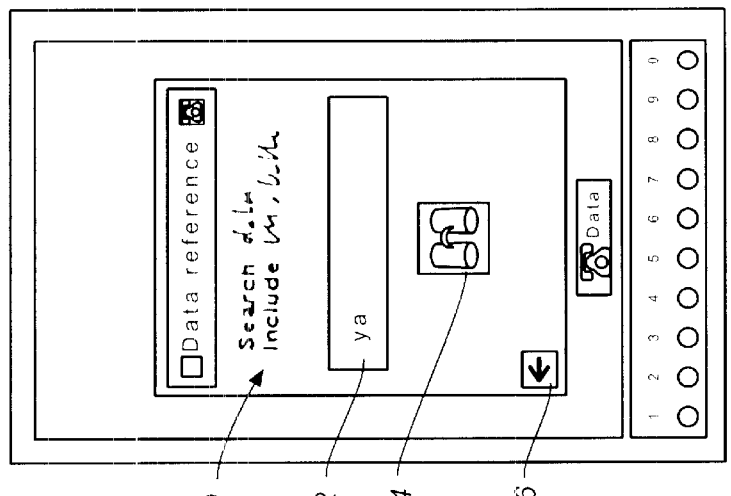
FIG._8C
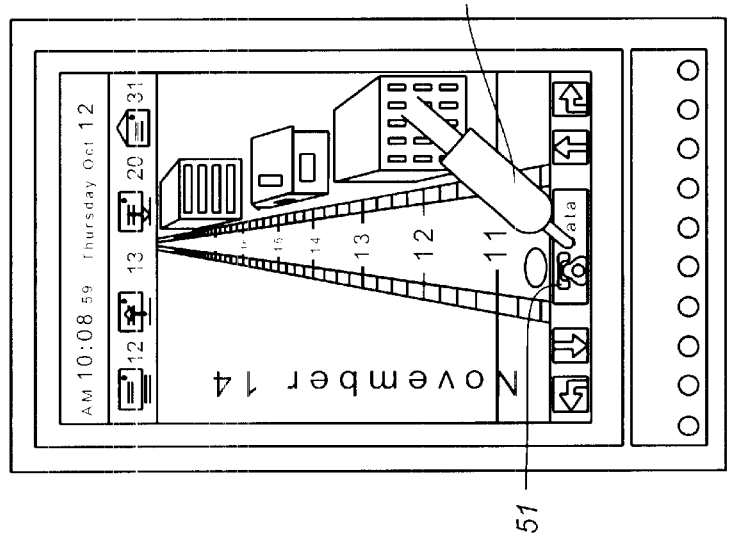
FIG._8B
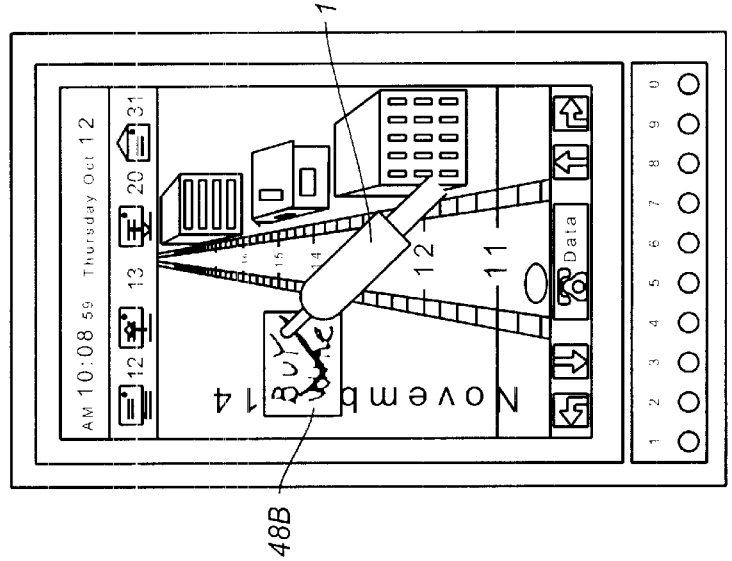
FIG._8A

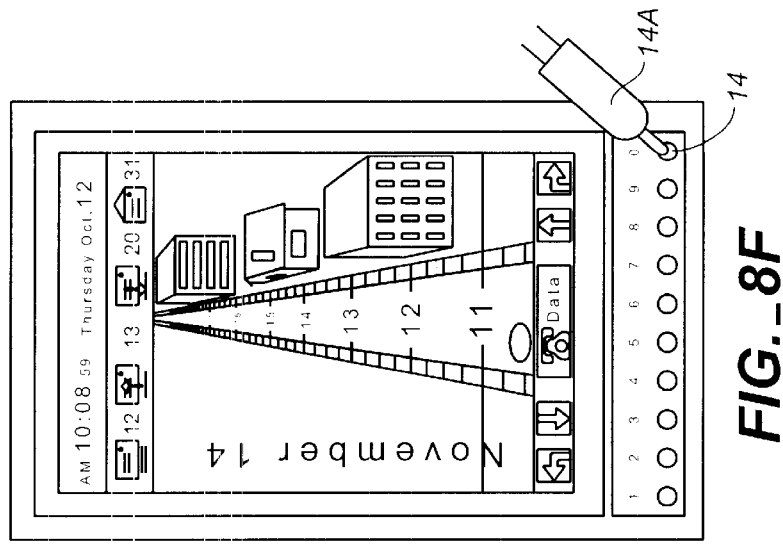
*FIG._8F*
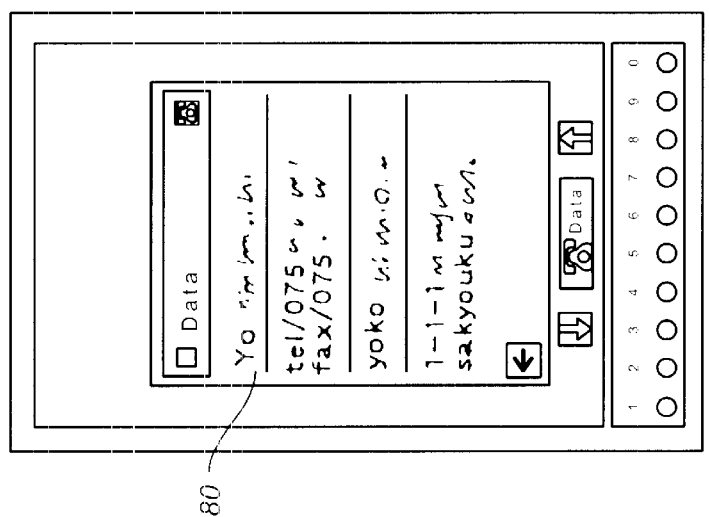
*FIG._8E*
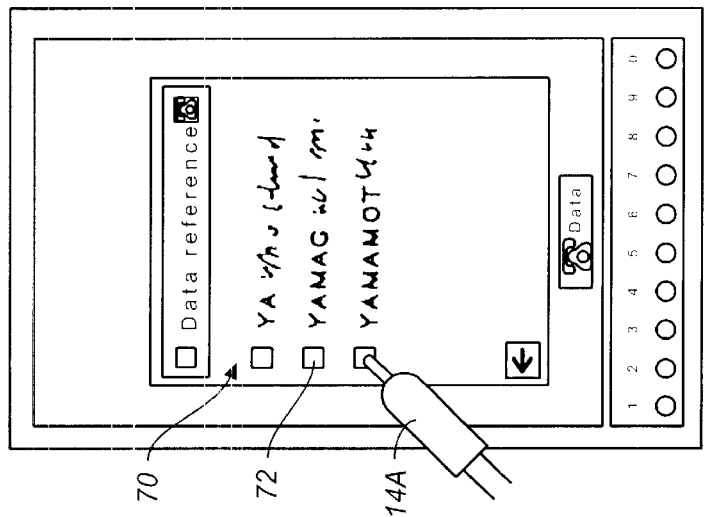
*FIG._8D*

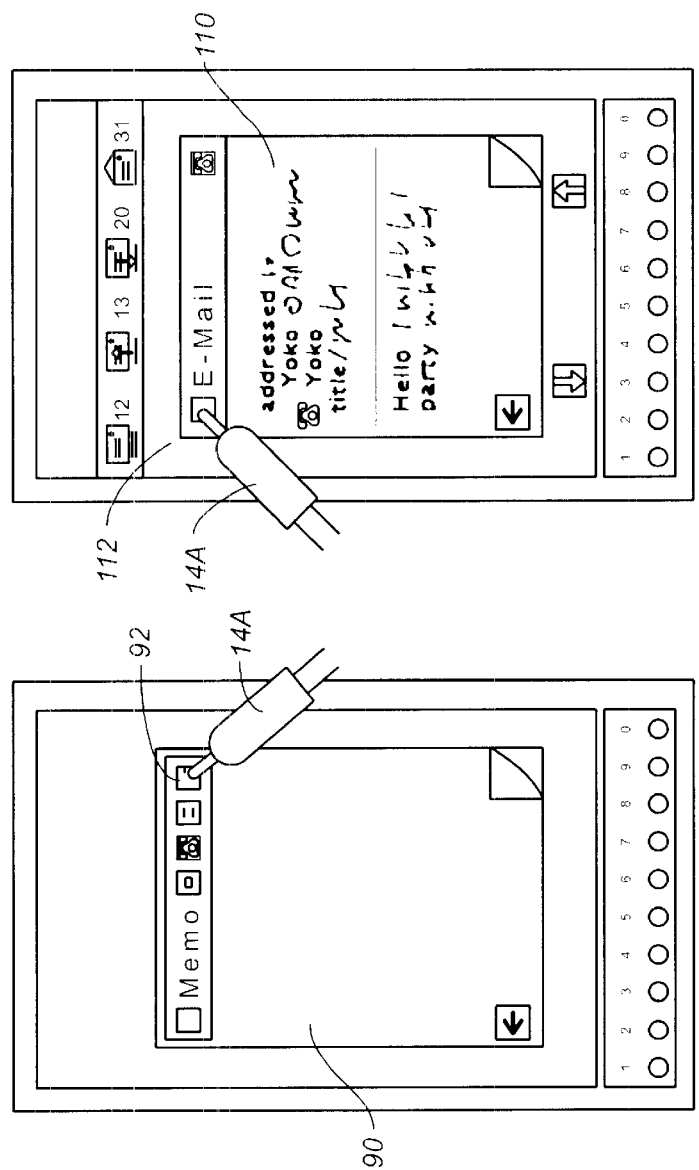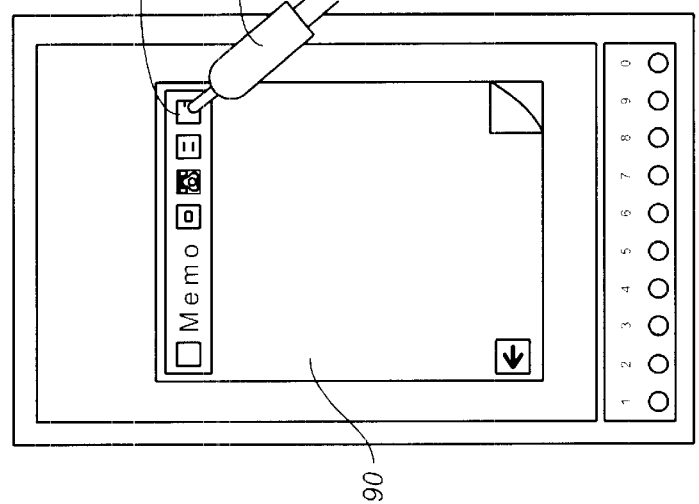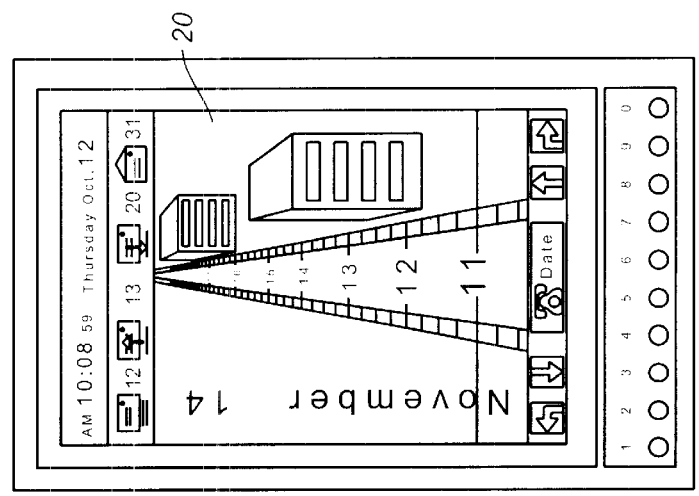
FIG._9C   FIG._9B   FIG._9A

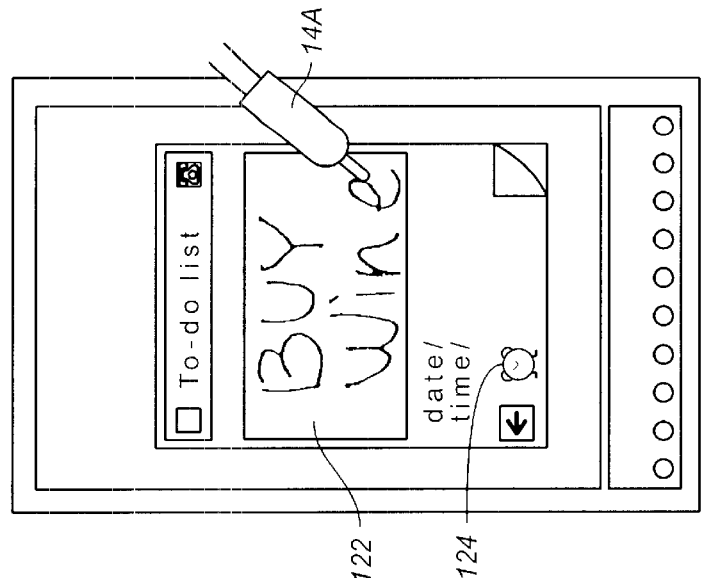
FIG._9F
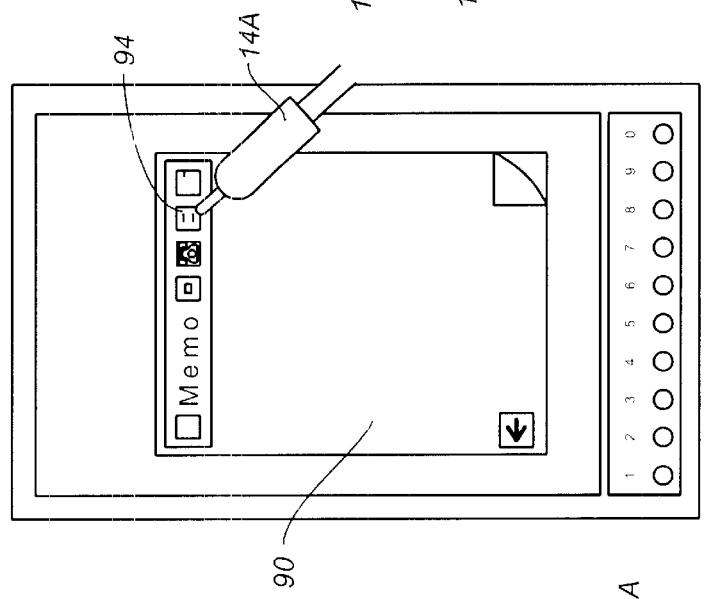
FIG._9E
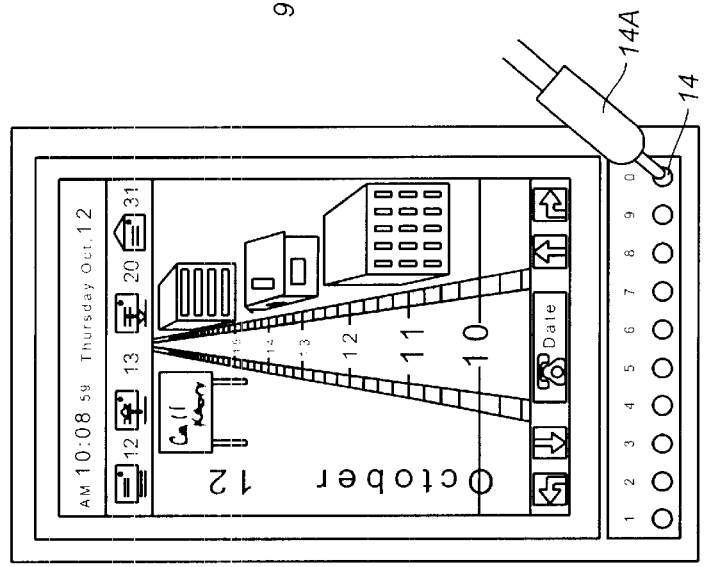
FIG._9D

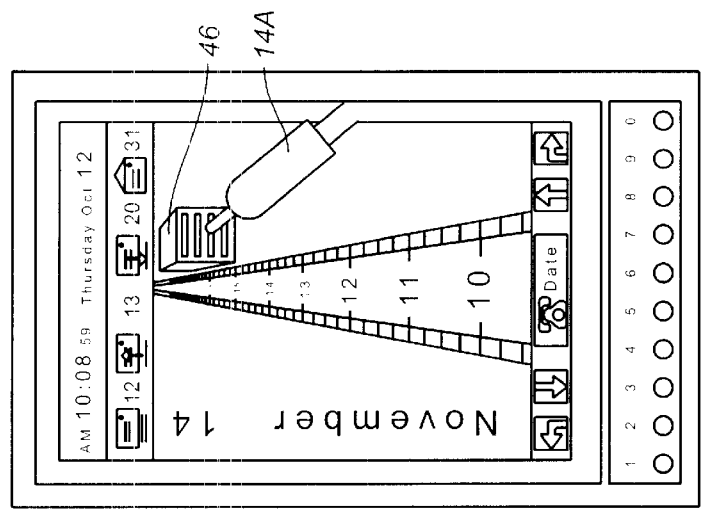
FIG._10C
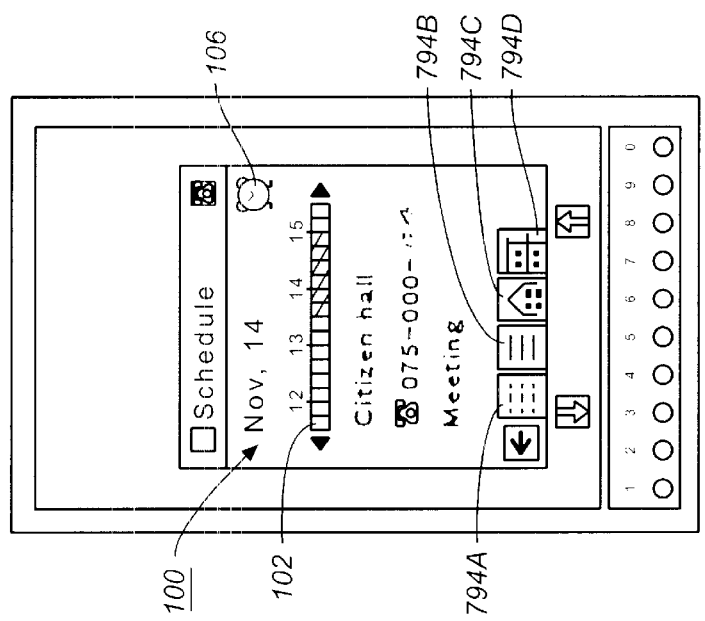
FIG._10B
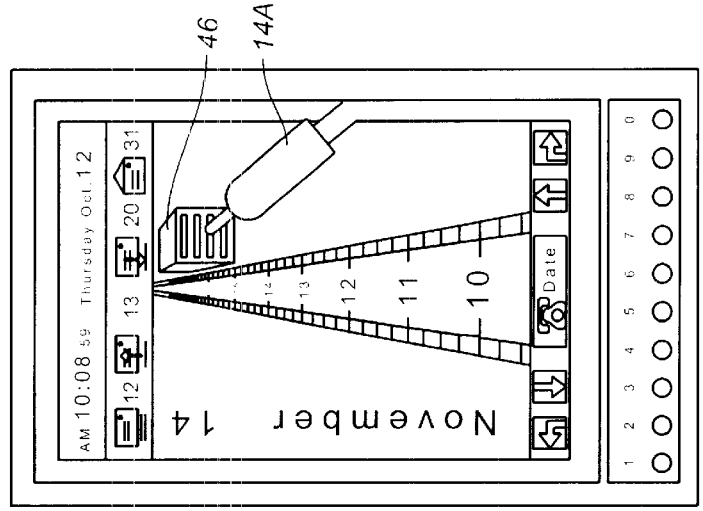
FIG._10A

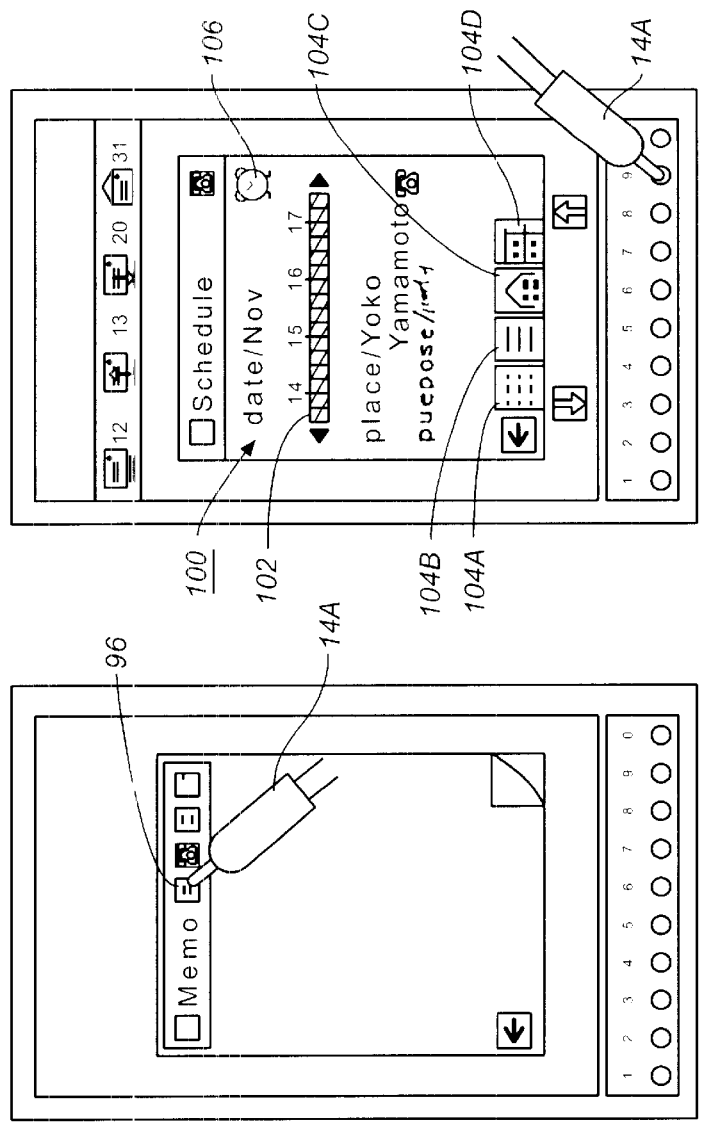
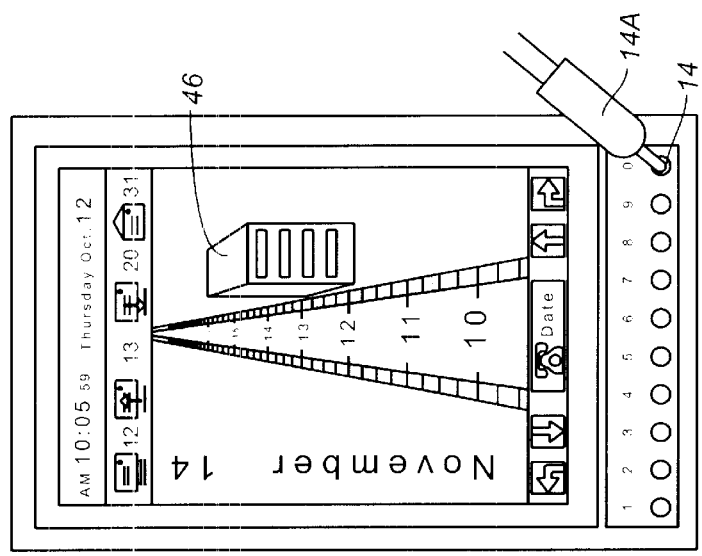
FIG._10F
FIG._10E
FIG._10D

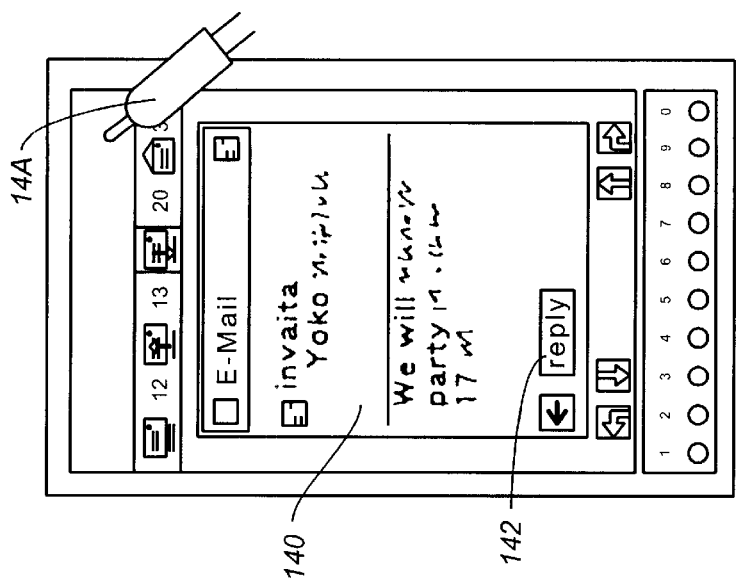
FIG._11C
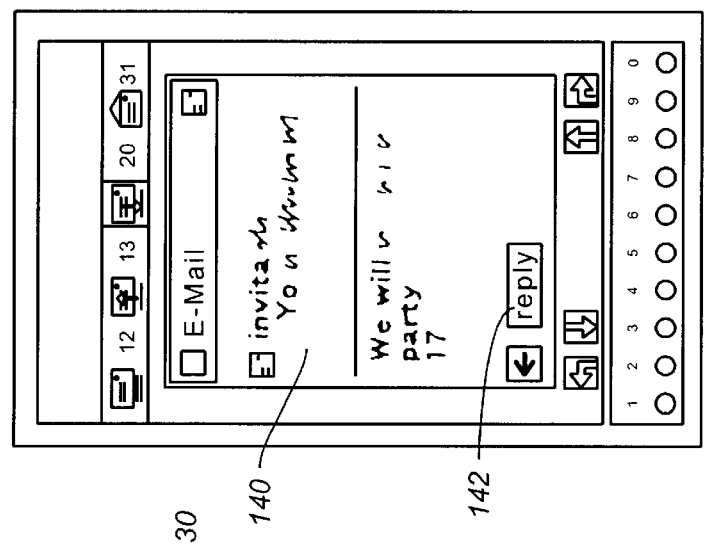
FIG._11B
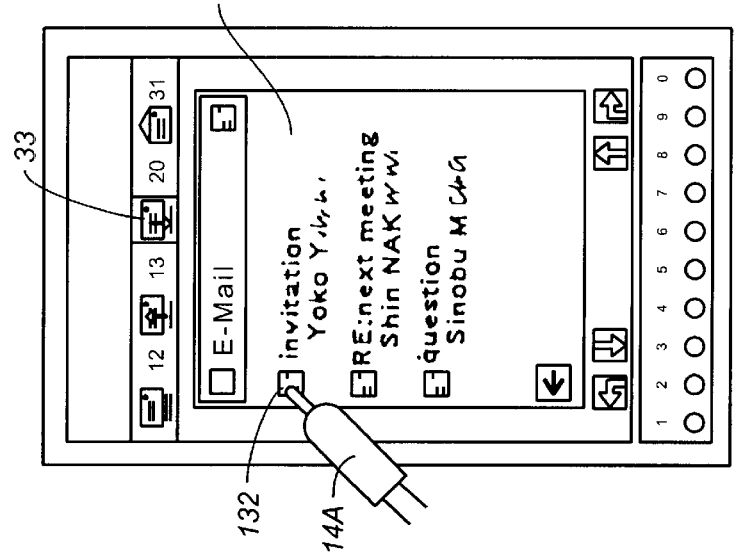
FIG._11A

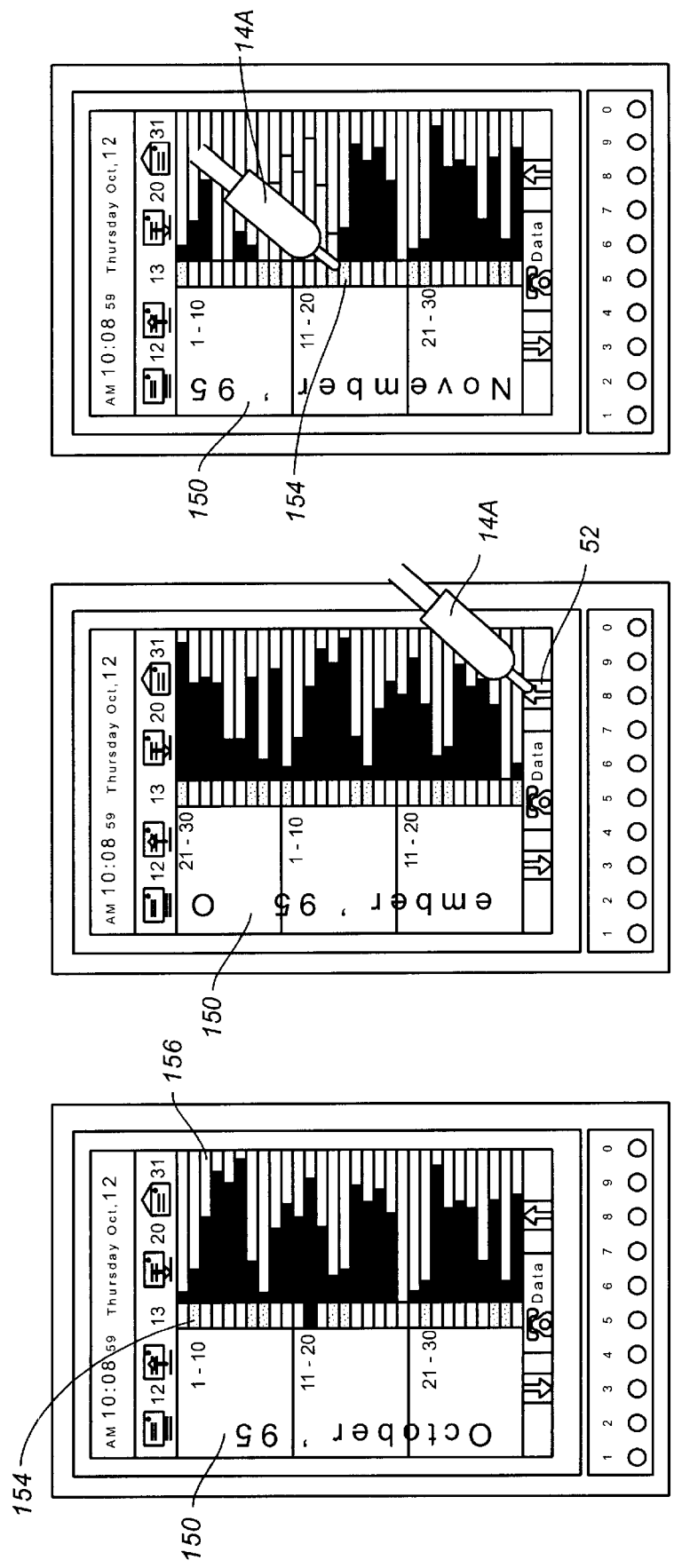

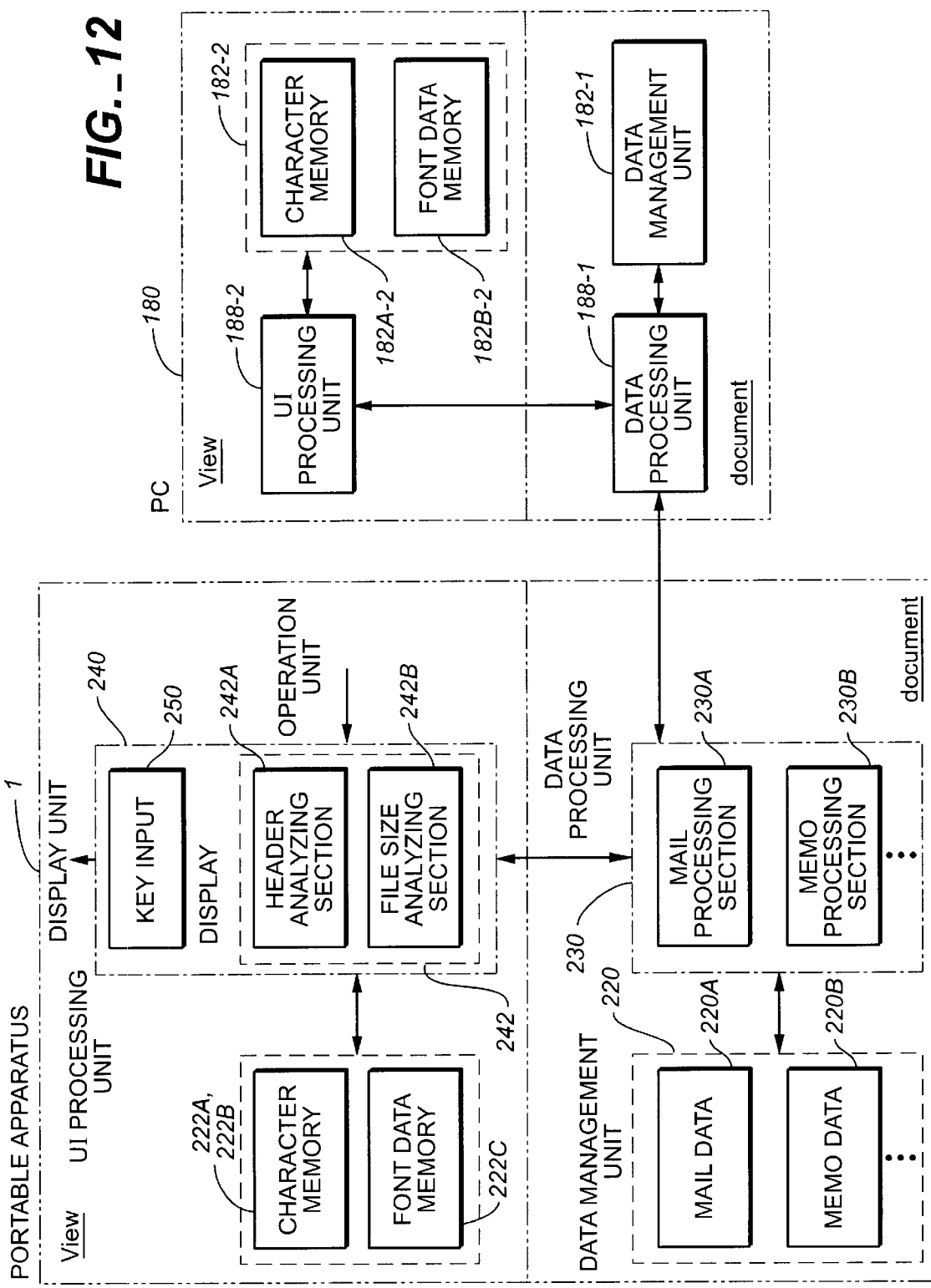
FIG._12

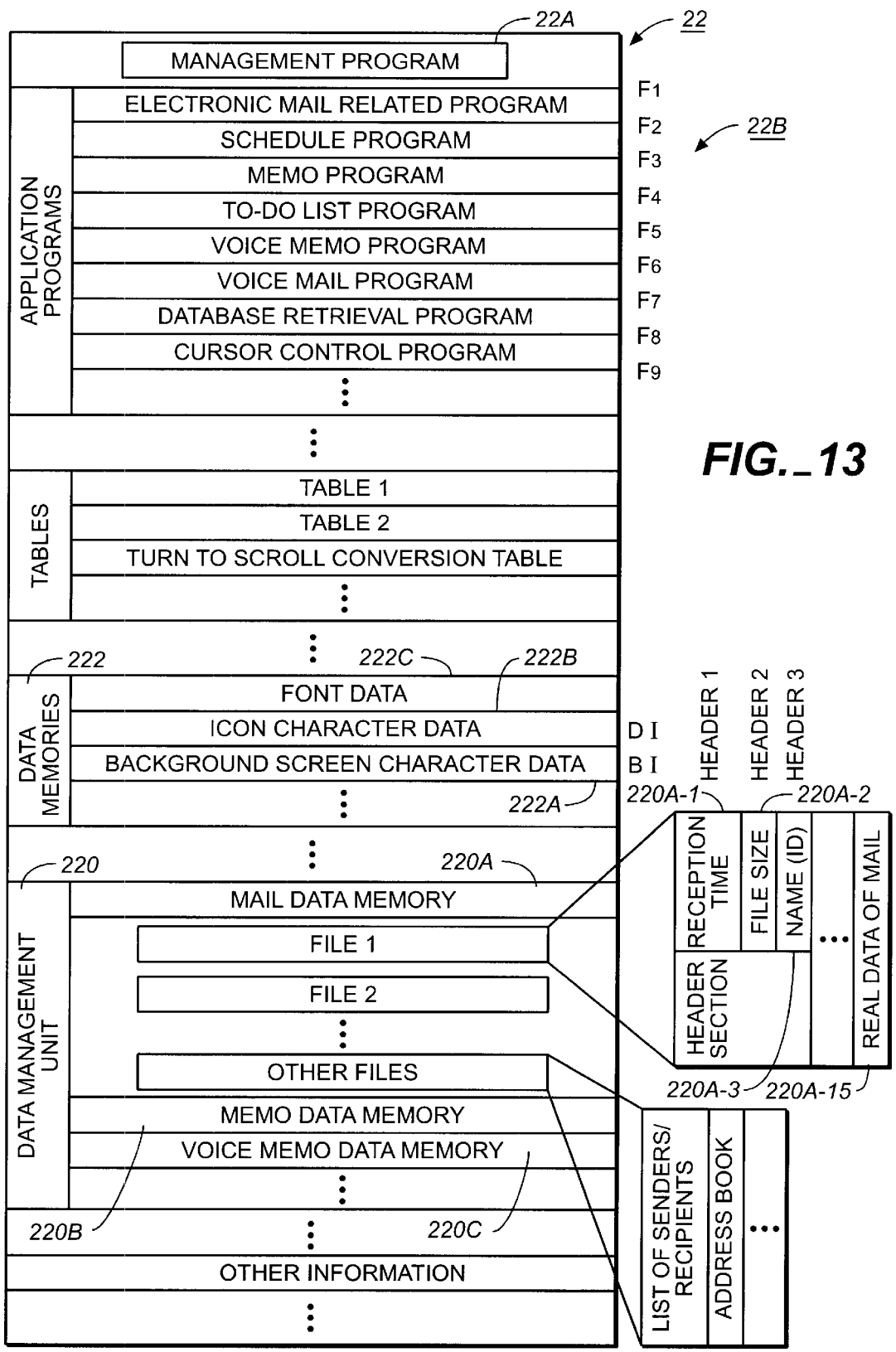
FIG._13

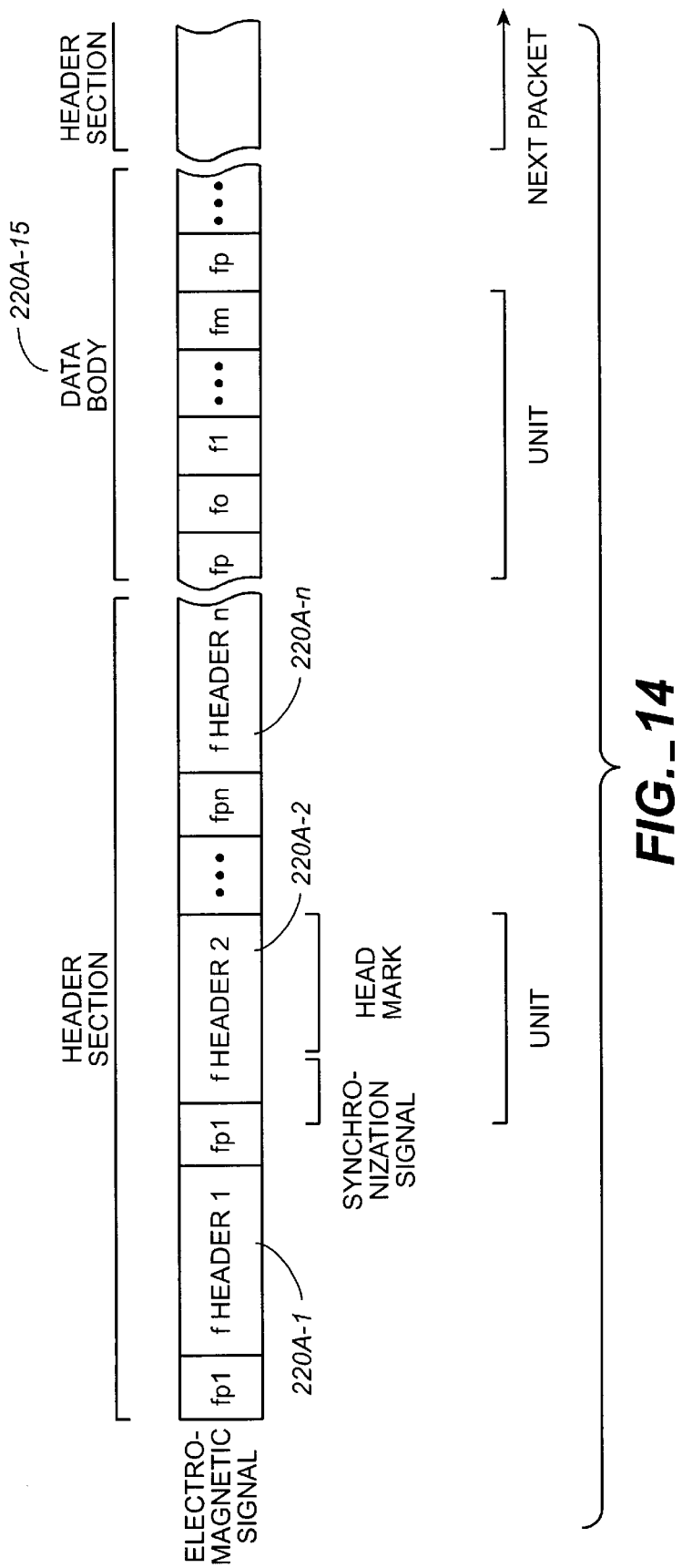
FIG._14

Table 1

| FUNCTION NAME | ICON CHARACTER DATA POINTER | FUNCTION PROGRAM POINTER |
|---|---|---|
| ELECTRONIC MAIL | DI1 | F1 |
| ELECTRONIC MAIL | DI2 | F1 |
| ELECTRONIC MAIL | DI3 | F1 |
| ELECTRONIC MAIL | DI4 | F1 |
| DATABASE | DI5 | F7 |
| MODE SWITCHING | DI6 | Nu11 |
| MODE SWITCHING | DI7 | Nu11 |
| MODE SWITCHING | DI8 | Nu11 |
| MODE SWITCHING | DI9 | Nu11 |
| SCHEDULE | DI10 | F2 |
| SCHEDULE | DI11 | F2 |
| SCHEDULE | DI12 | F2 |
| SCHEDULE | DI13 | F2 |
| SCHEDULE | DI14 | F2 |
| MEMO | MANHOLE  DI15 | F3 |
| TO-DO-LIST | DI16 | F4 |
| TO-DO-LIST | DI17 | F4 |
| ⋮ | ⋮ | ⋮ |

*FIG._15A*

Table 2

| MANU NAME | MENU FORMAT | BACKGROUND SCREEN CHARACTER POINTER | ICON LAYOUT |
|---|---|---|---|
| WATCH / CLOCK MODE | ENTIRE SCREEN | BI2 | |
| COMMUNICATION MODE | ENTIRE SCREEN | BI3 | ELECTRONIC MAIL(X1,Y1)... |
| SCHEDULE MODE | ENTIRE SCREEN | BI4 | MANHOLE(Xm,Xm)... |
| TO-DO LIST MODE | ENTIRE SCREEN | BI5 | TO-DO LIST(Xs,Ys)... |
| SCHEDULE LIST MODE | ENTIRE SCREEN | BI6 | SCHEDULE(Xt,Yt)... |
| SIDE VIEW MODE | ENTIRE SCREEN | BI8 | SCHEDULE( , )... |
| BIRD'S EYE-VIEW MODE | ENTIRE SCREEN | BI9 | SCHEDULE( , ) TO-DO LIST( , )... |
| DATABASE MODE | | BI7 | DATABASE(Xu,Yu)... |
| ... | ... | ... | ... |

*FIG._15B*

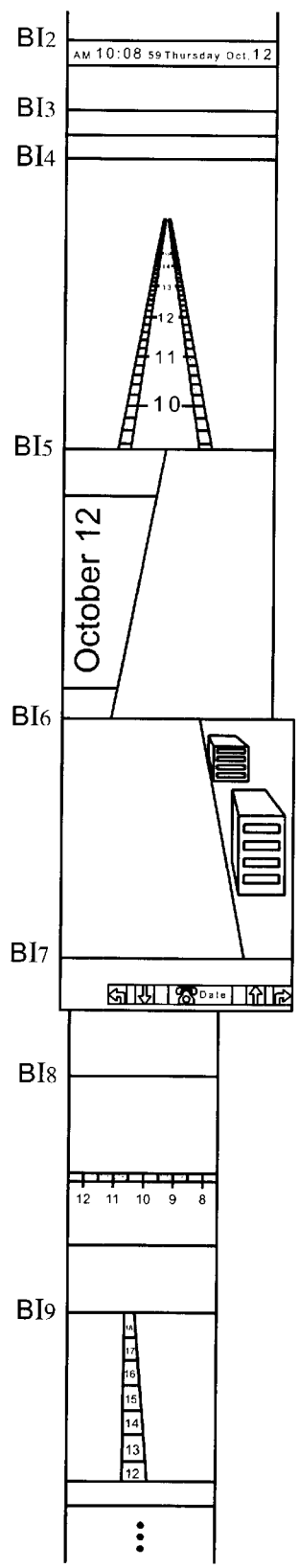 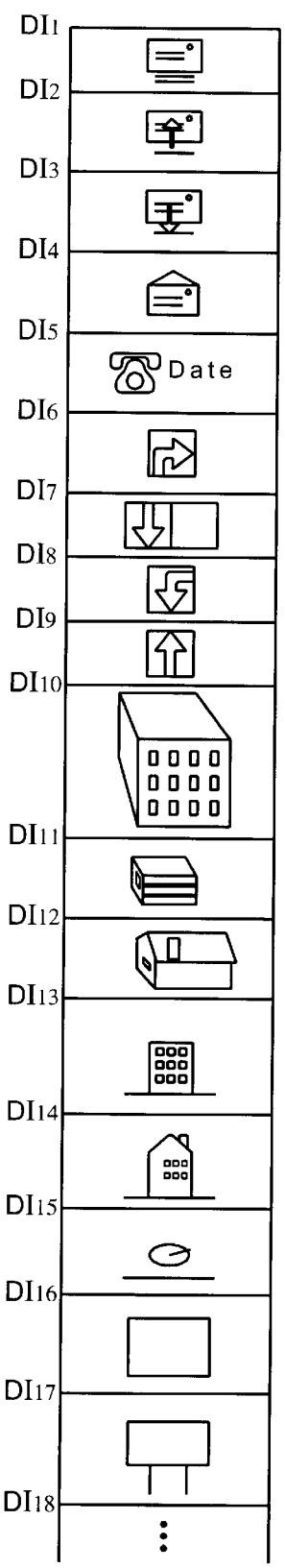
FIG._16A  FIG._16B

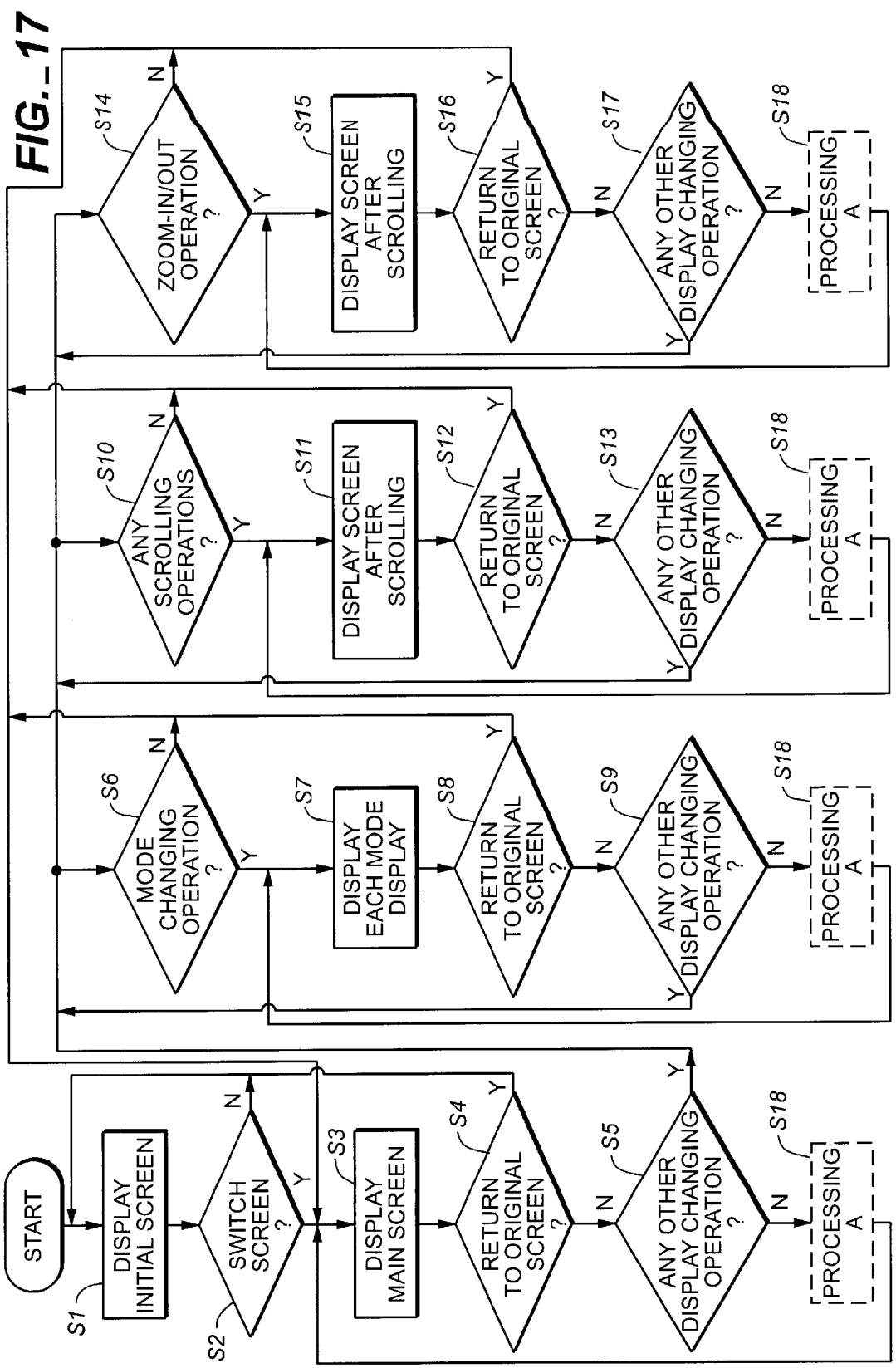

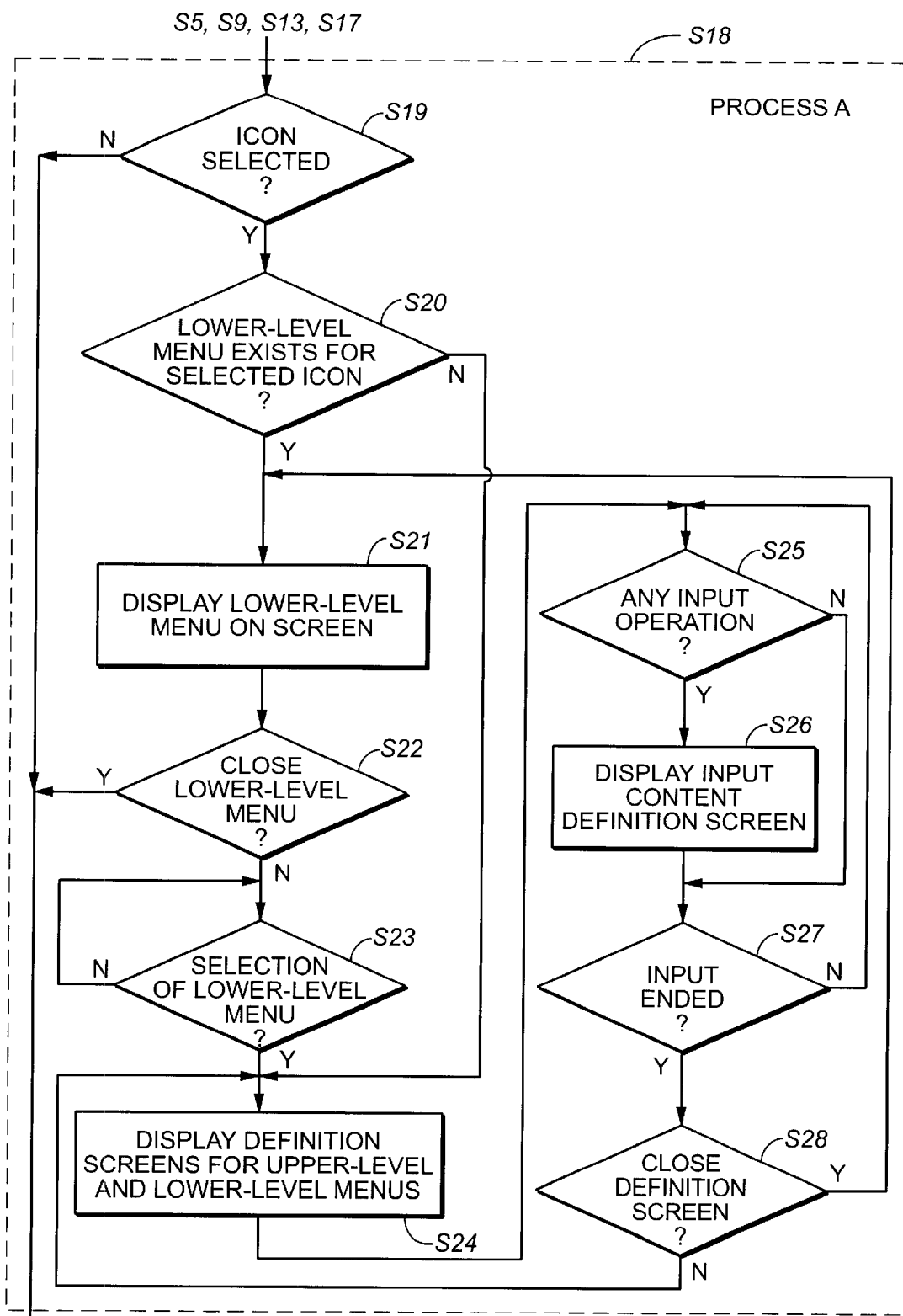
FIG._18

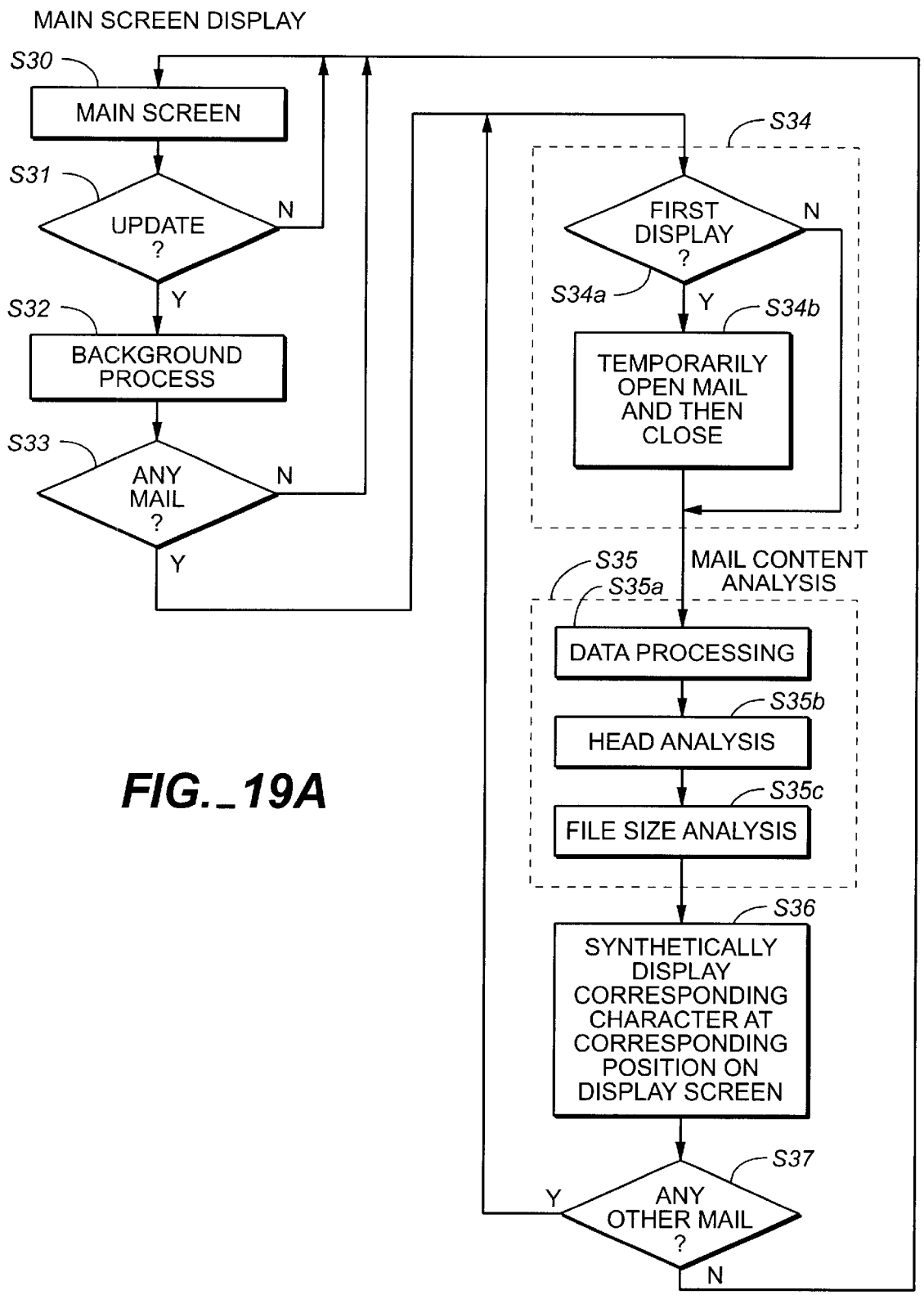
FIG._19A

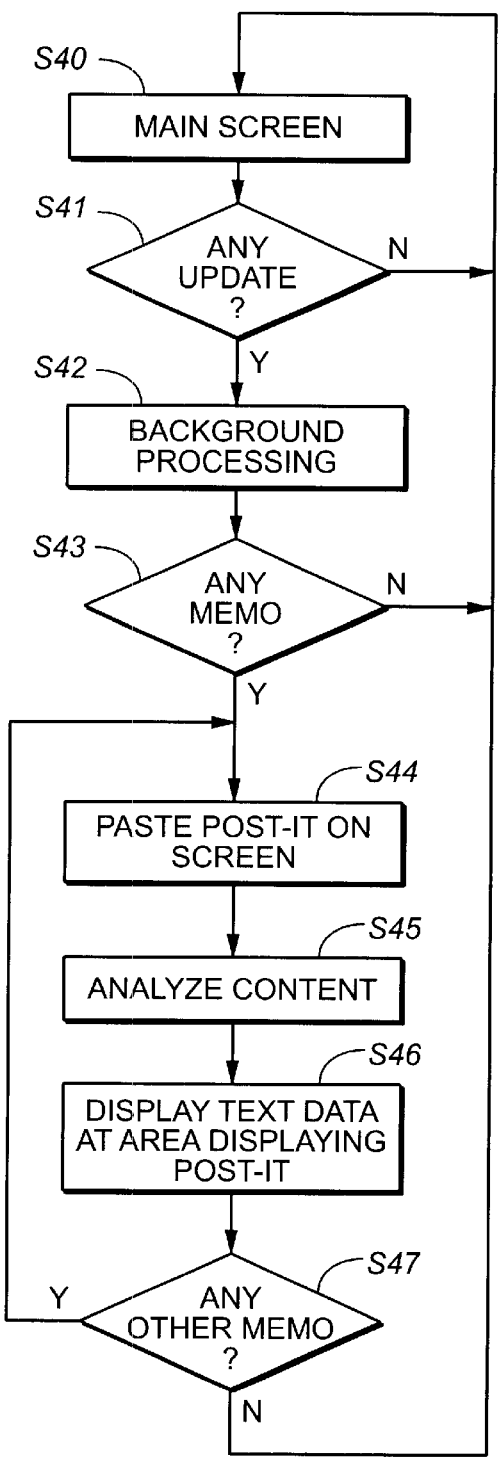
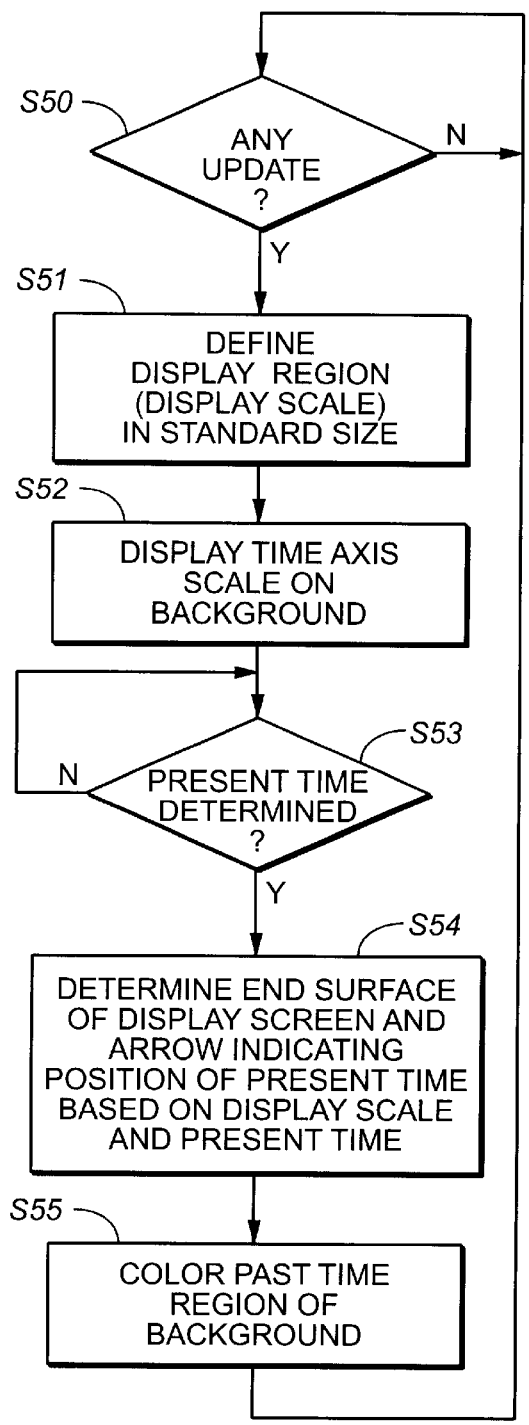
FIG._19B        FIG._20A

BACKGROUND PROCESSING AFTER SYNTHETIC DISPLAY OF CORRESPONDING CHARACTER
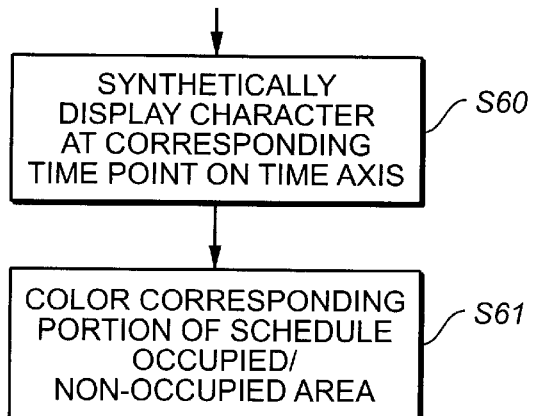
FIG._20B
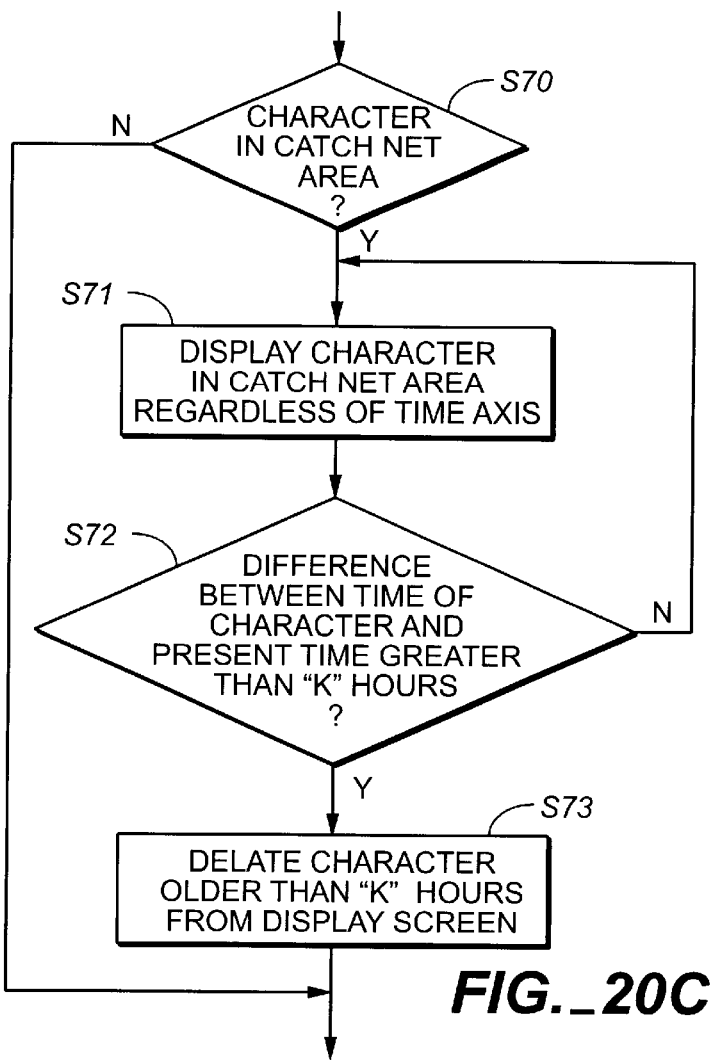
FIG._20C

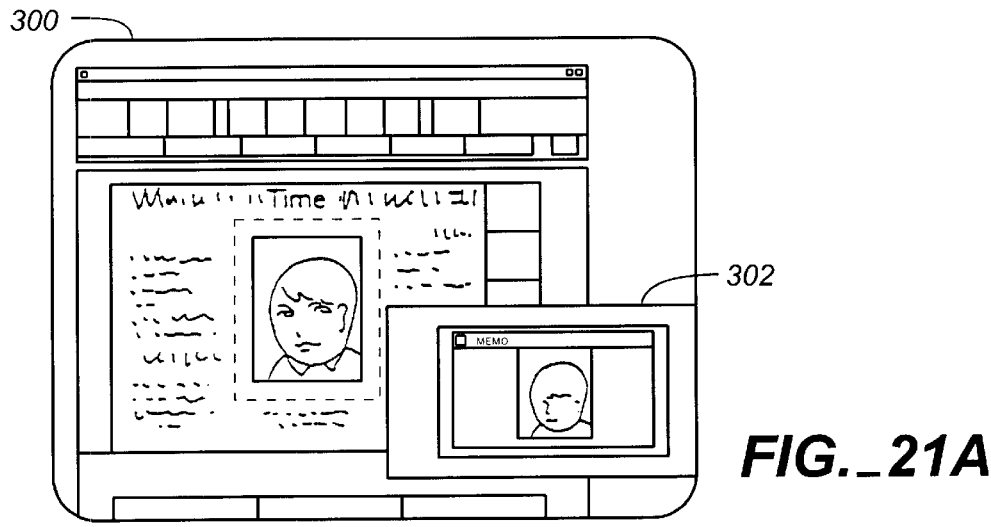
FIG._21A
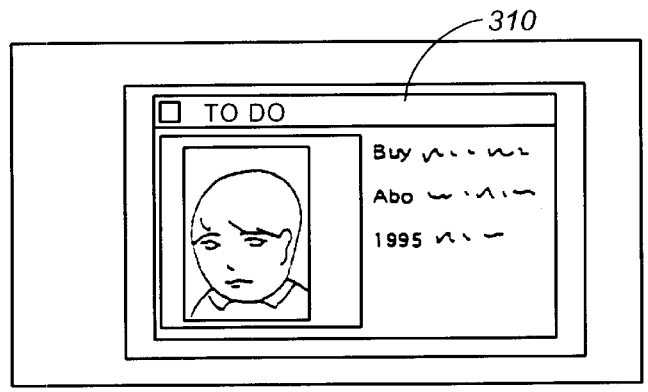
FIG._21B
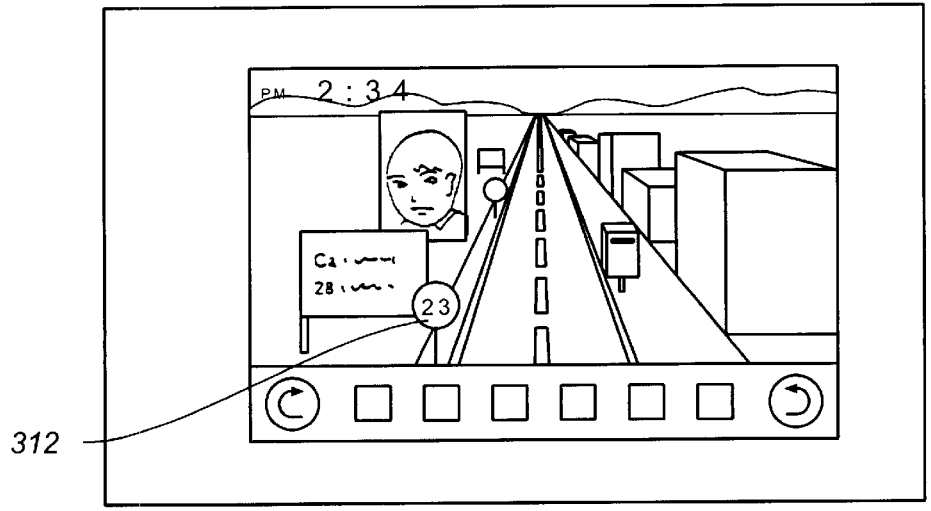
FIG._21C

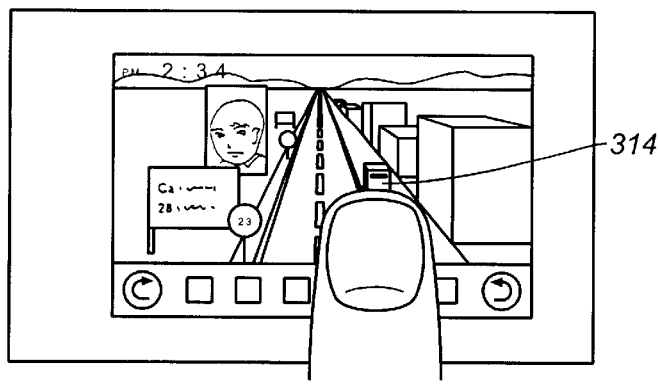
*FIG._22A*
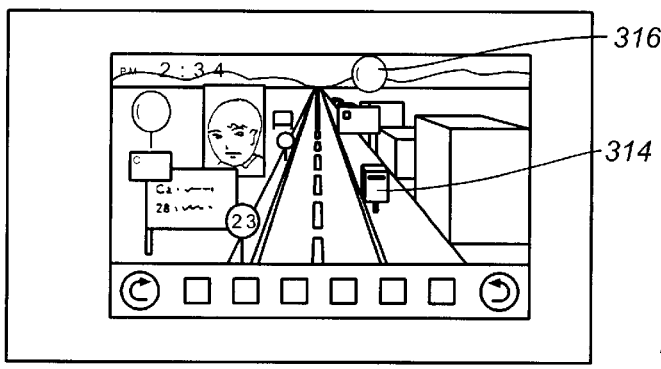
*FIG._22B*
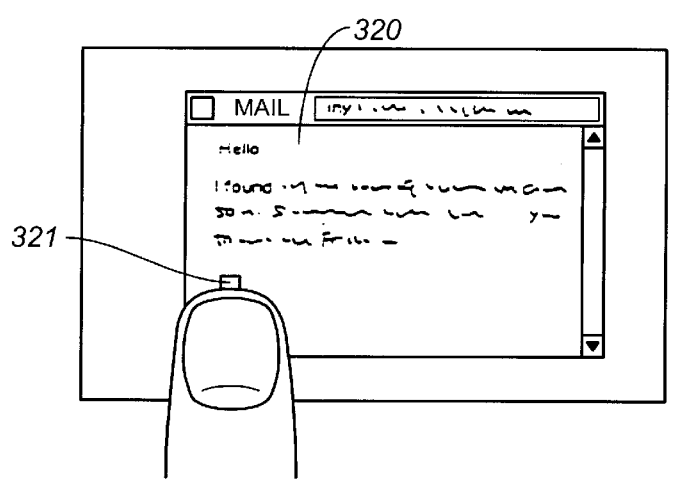
*FIG._22C*
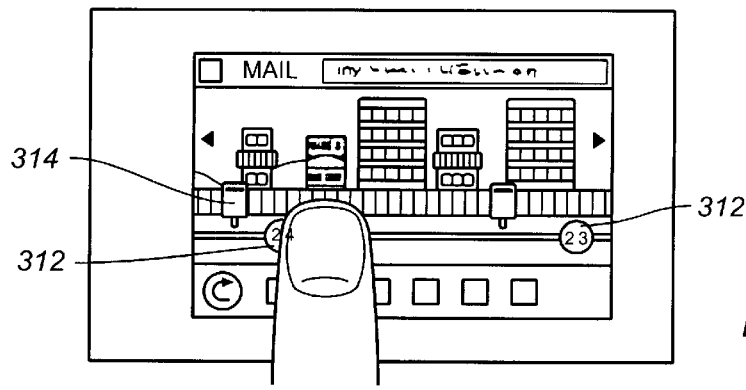
*FIG._22D*

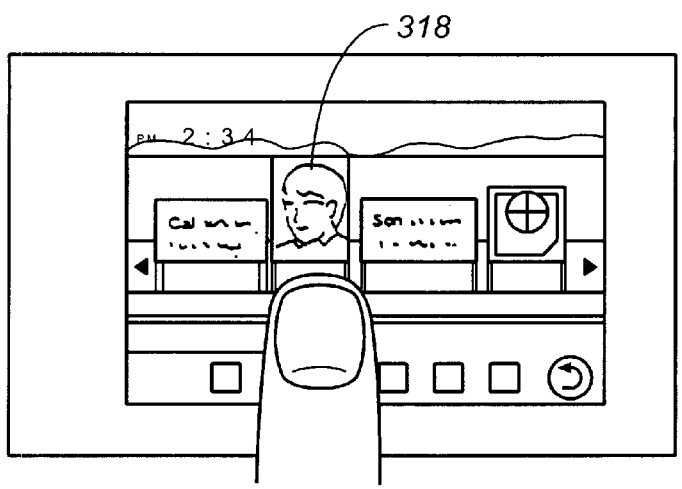
FIG._23A
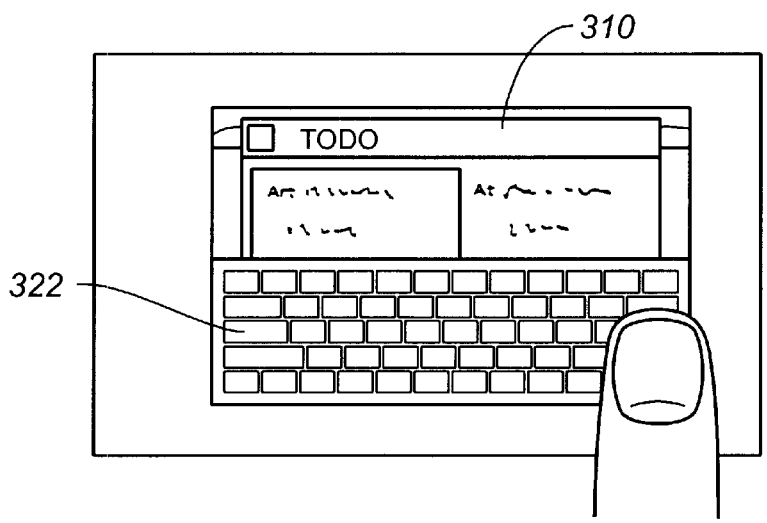
FIG._23B
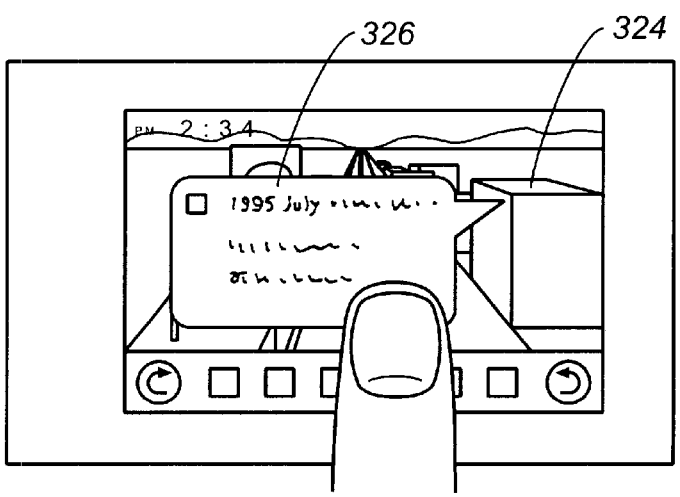
FIG._23C

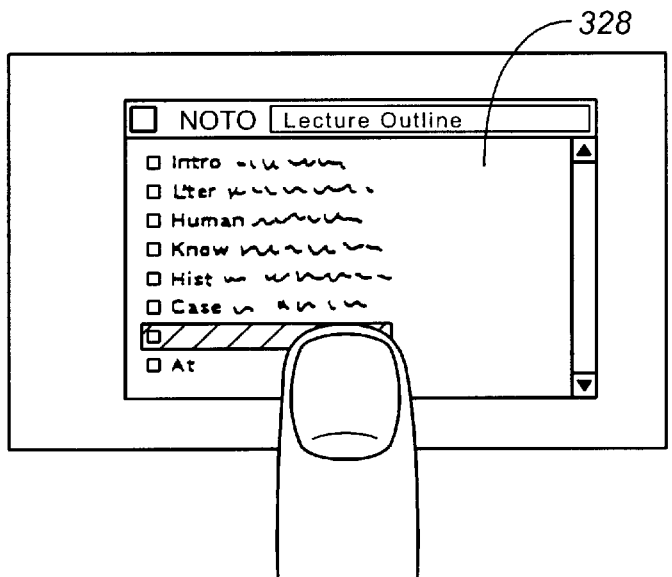
FIG._24A
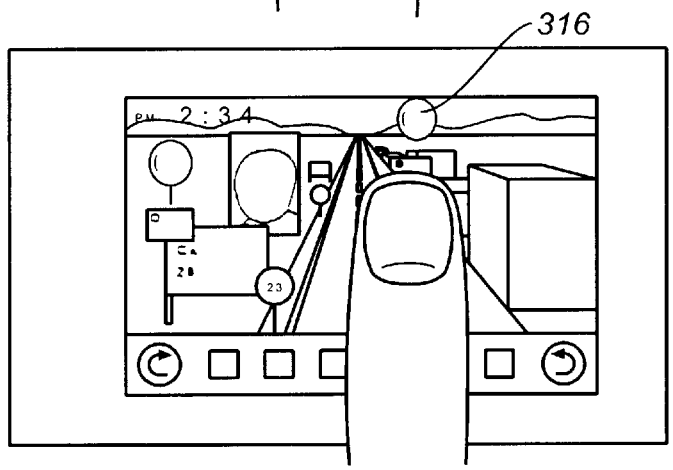
FIG._24B
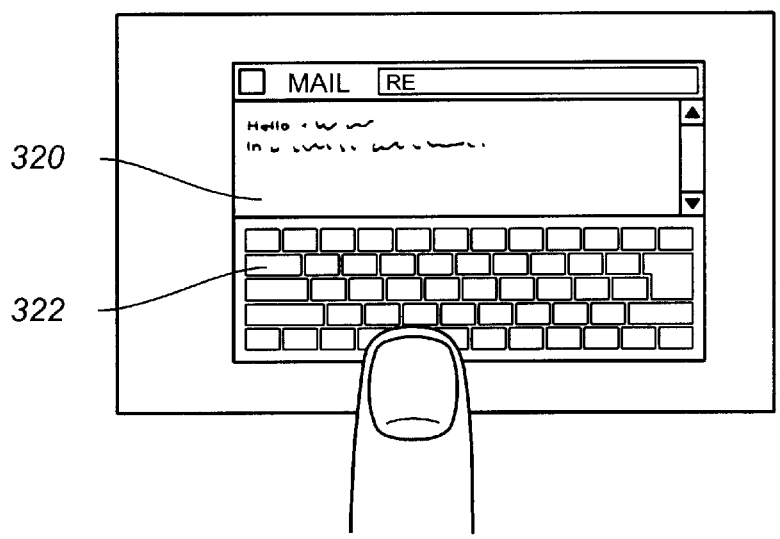
FIG._24C

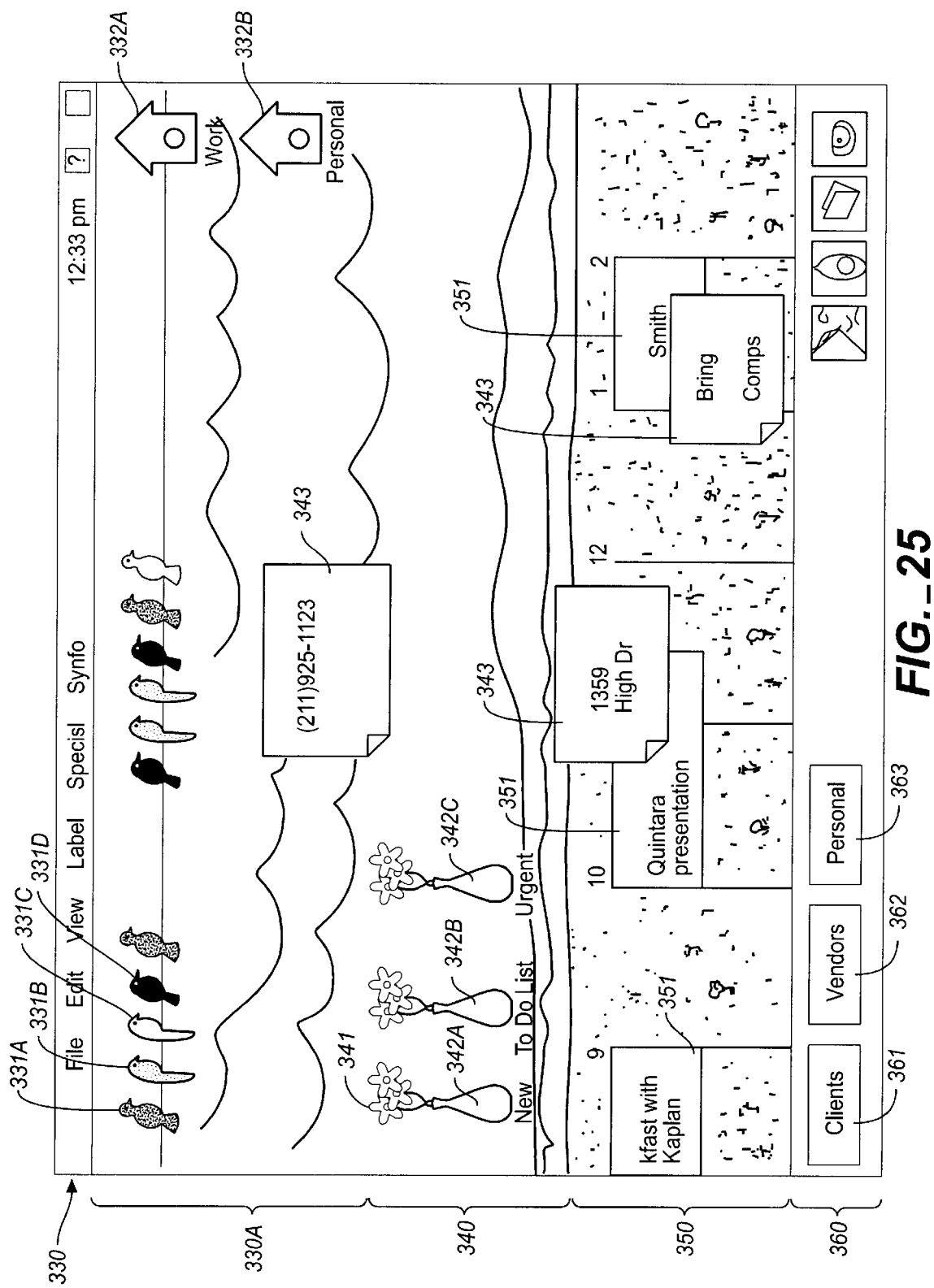
FIG._25

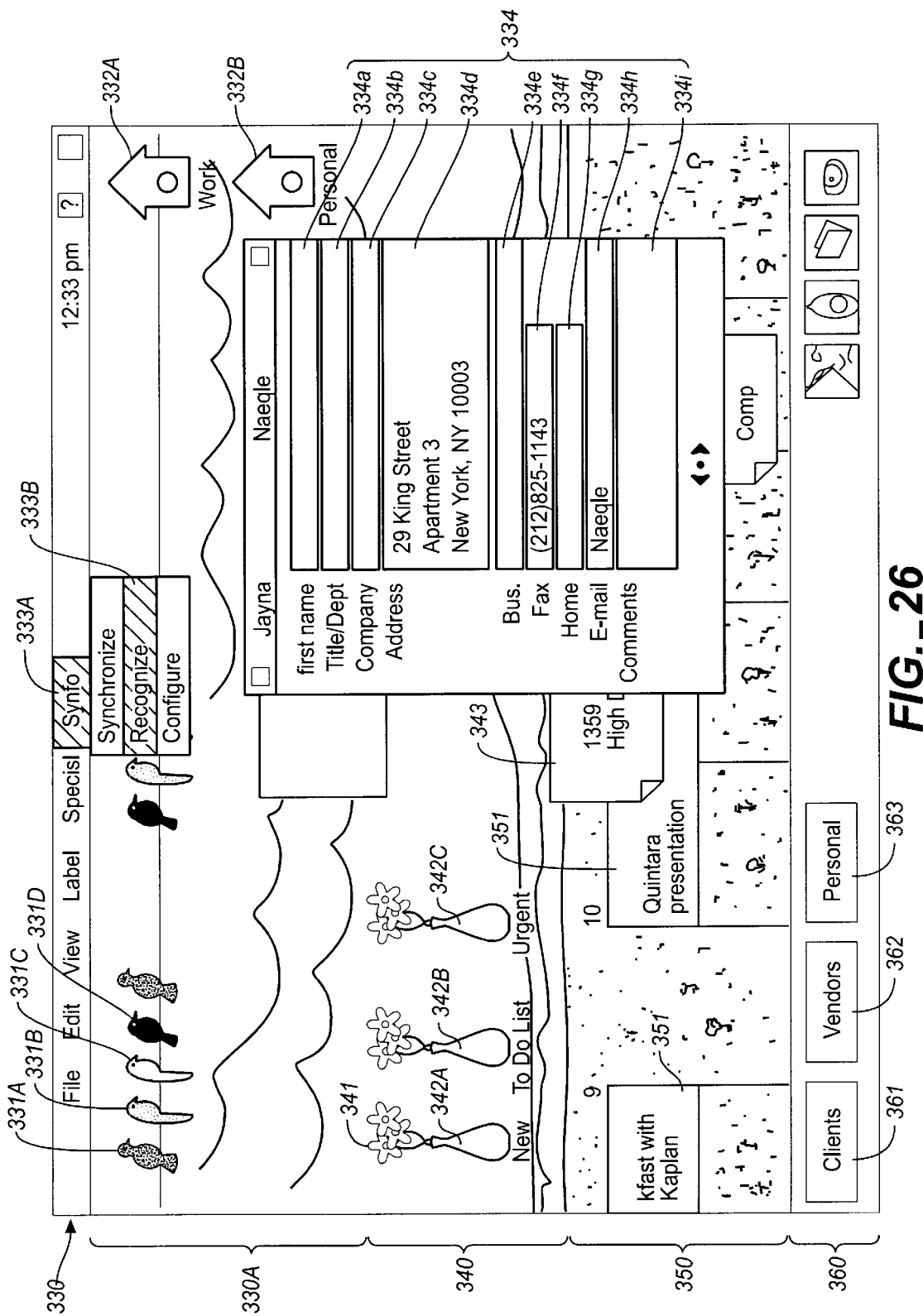
FIG._26

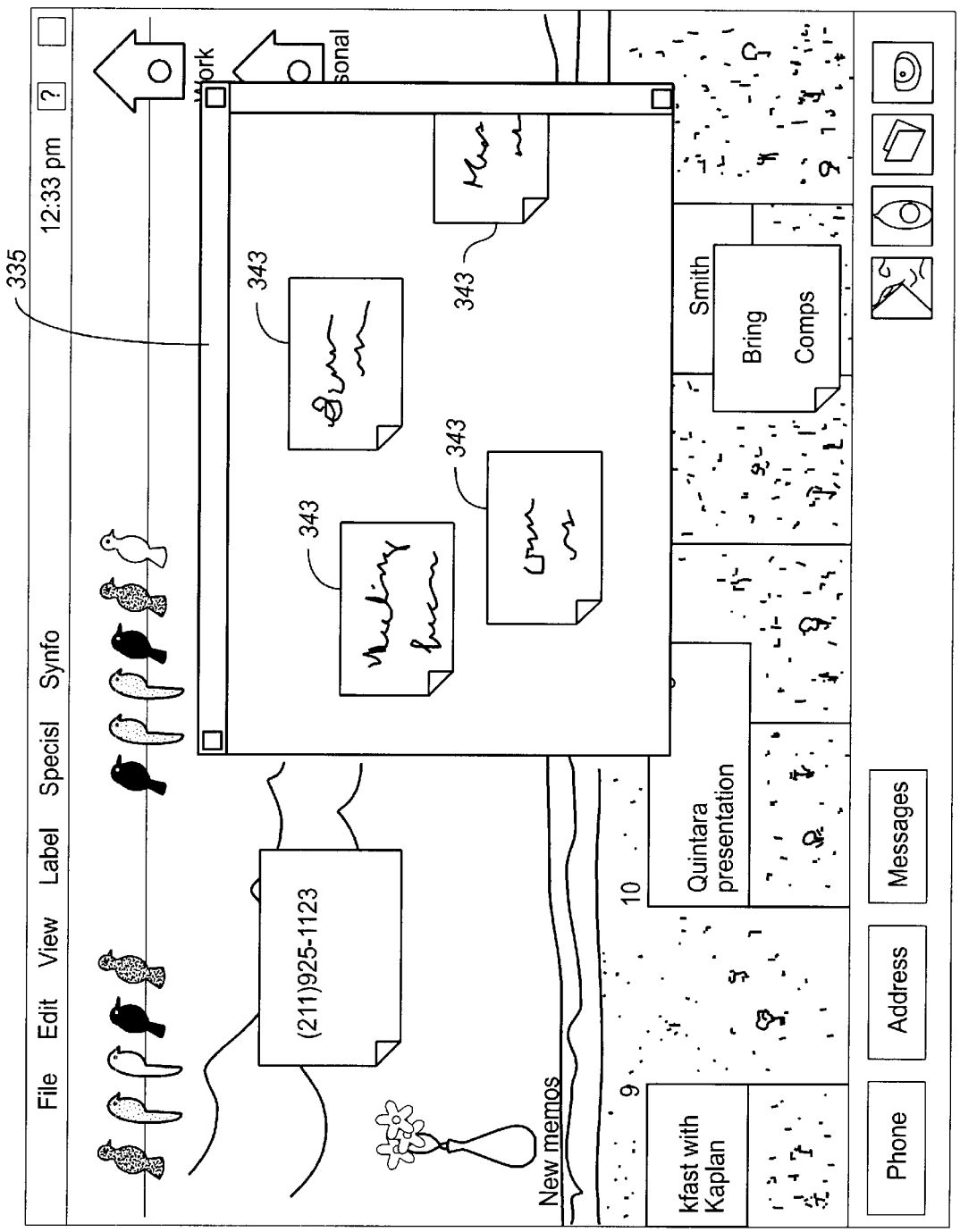
FIG._27

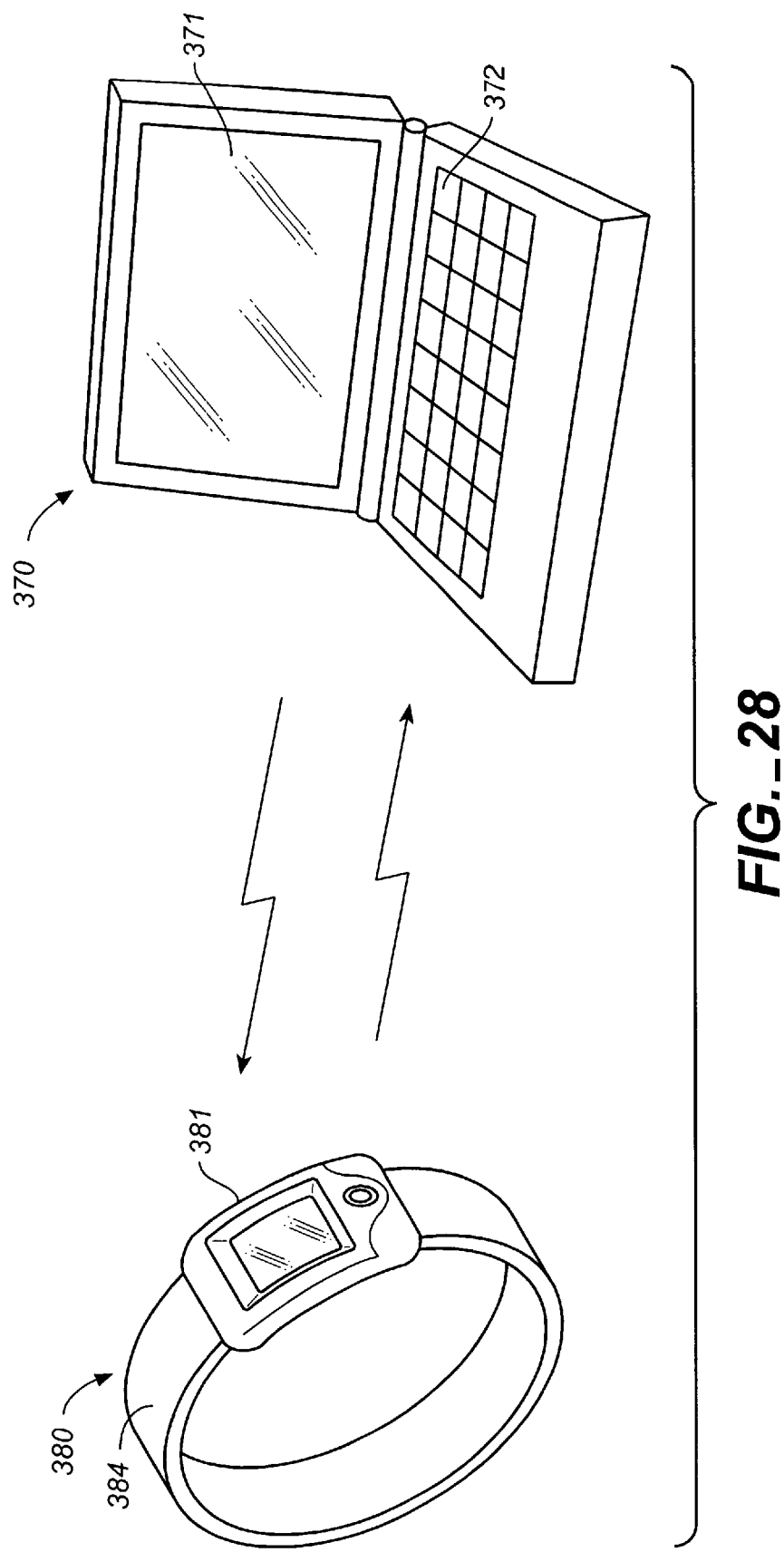
FIG._28

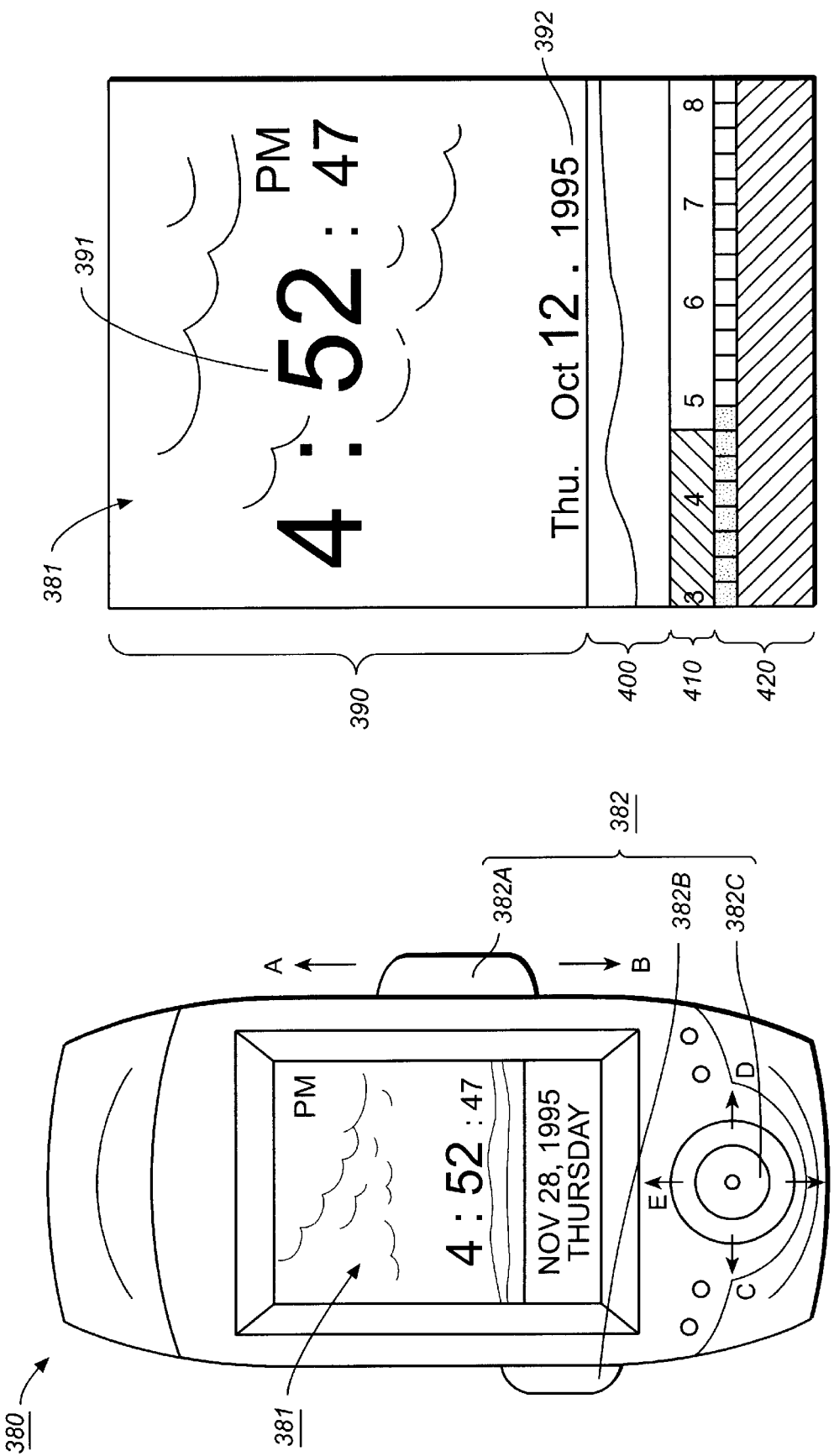

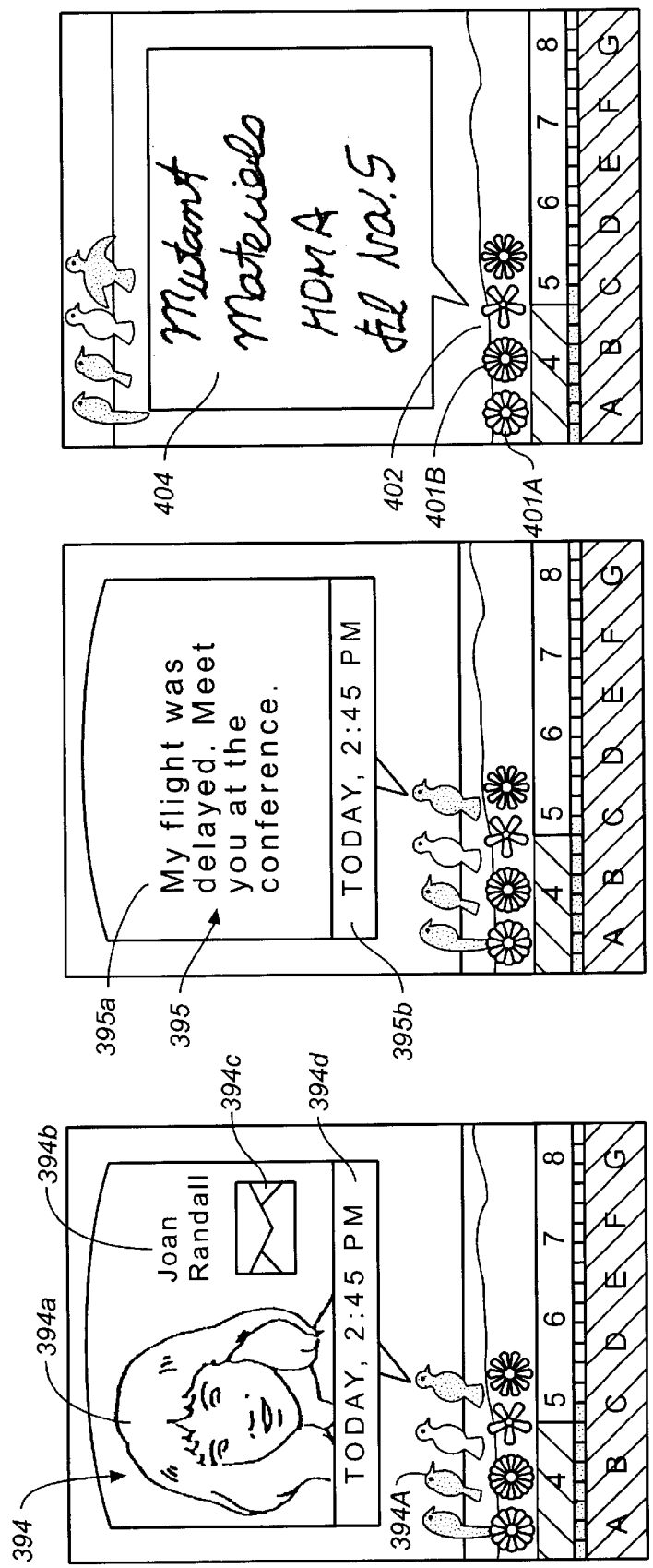

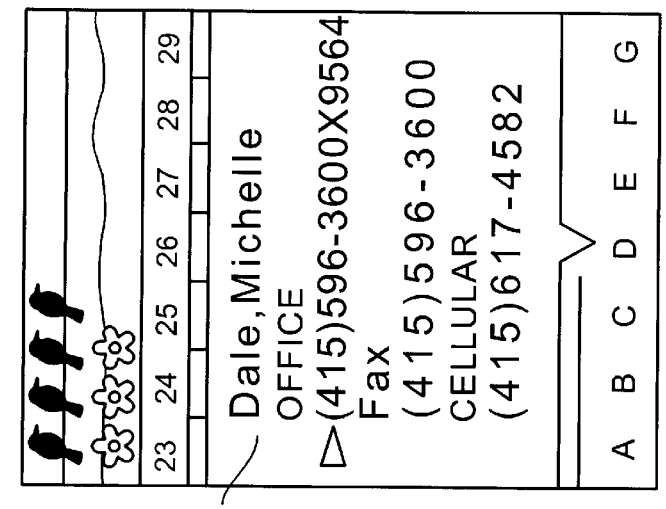
FIG._31F
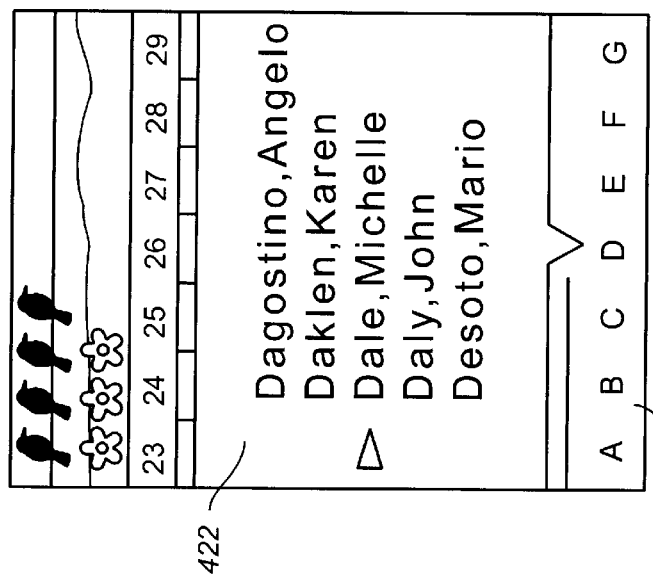
FIG._31E
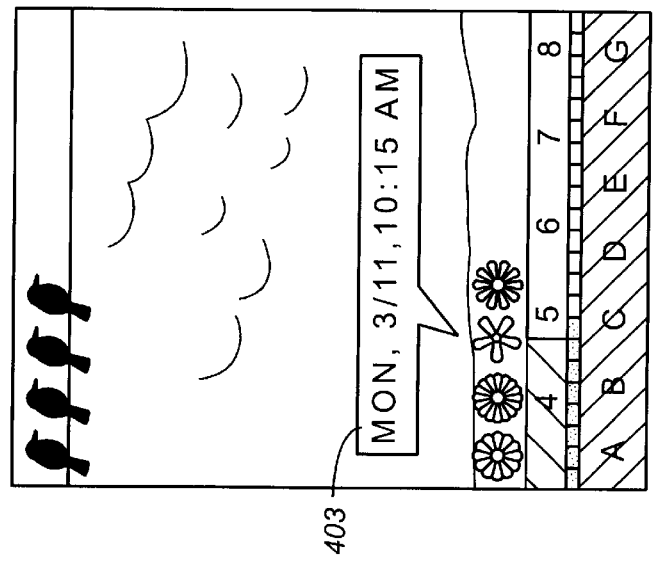
FIG._31D

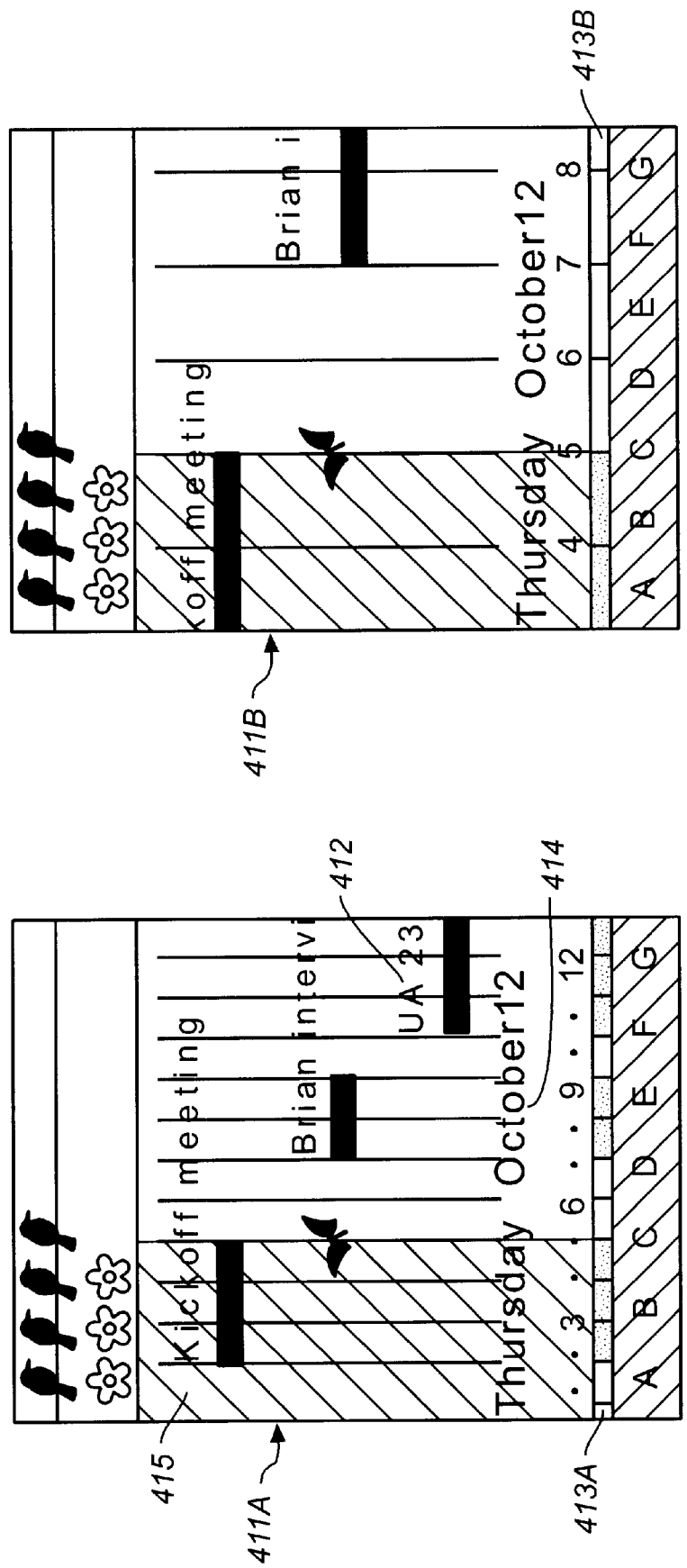
FIG._32B
FIG._32A

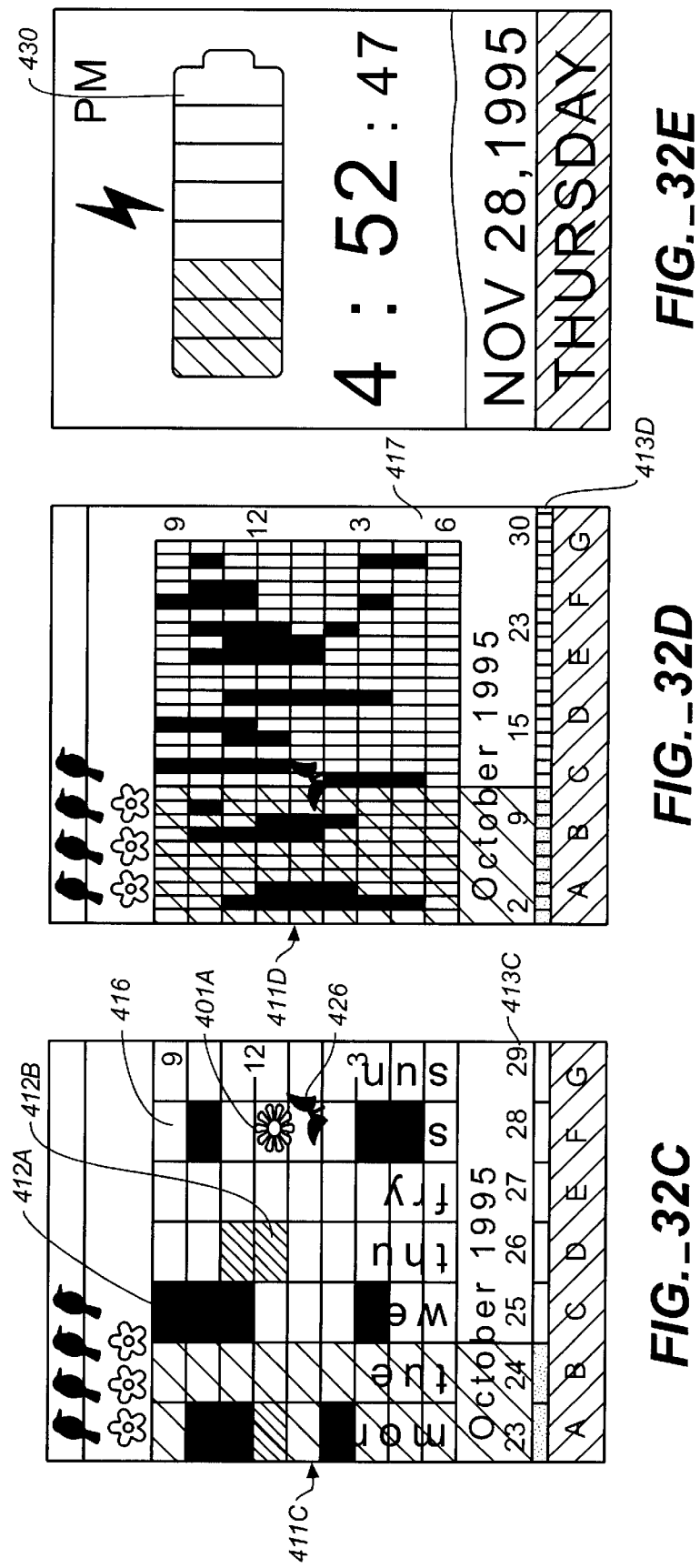

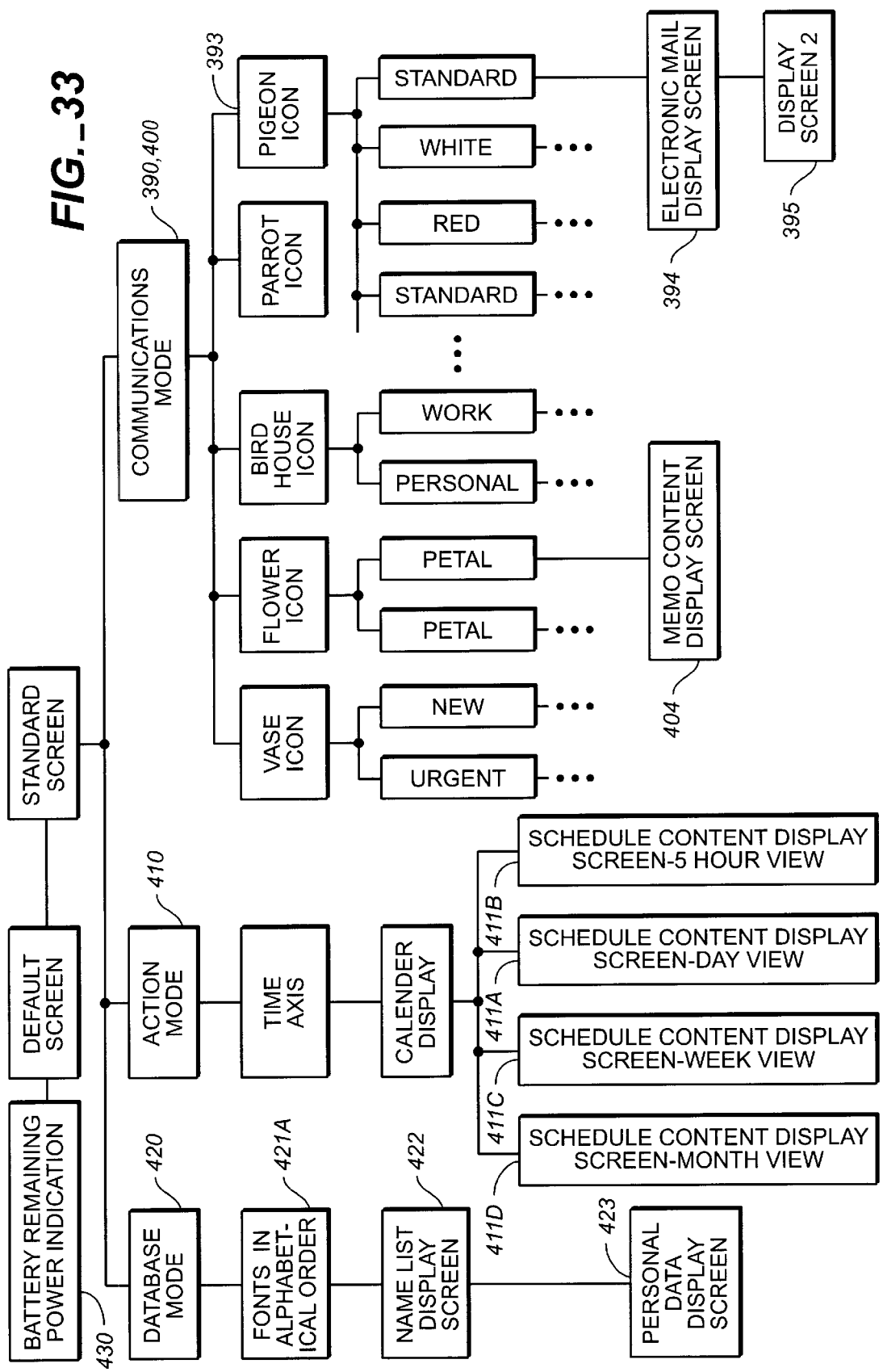

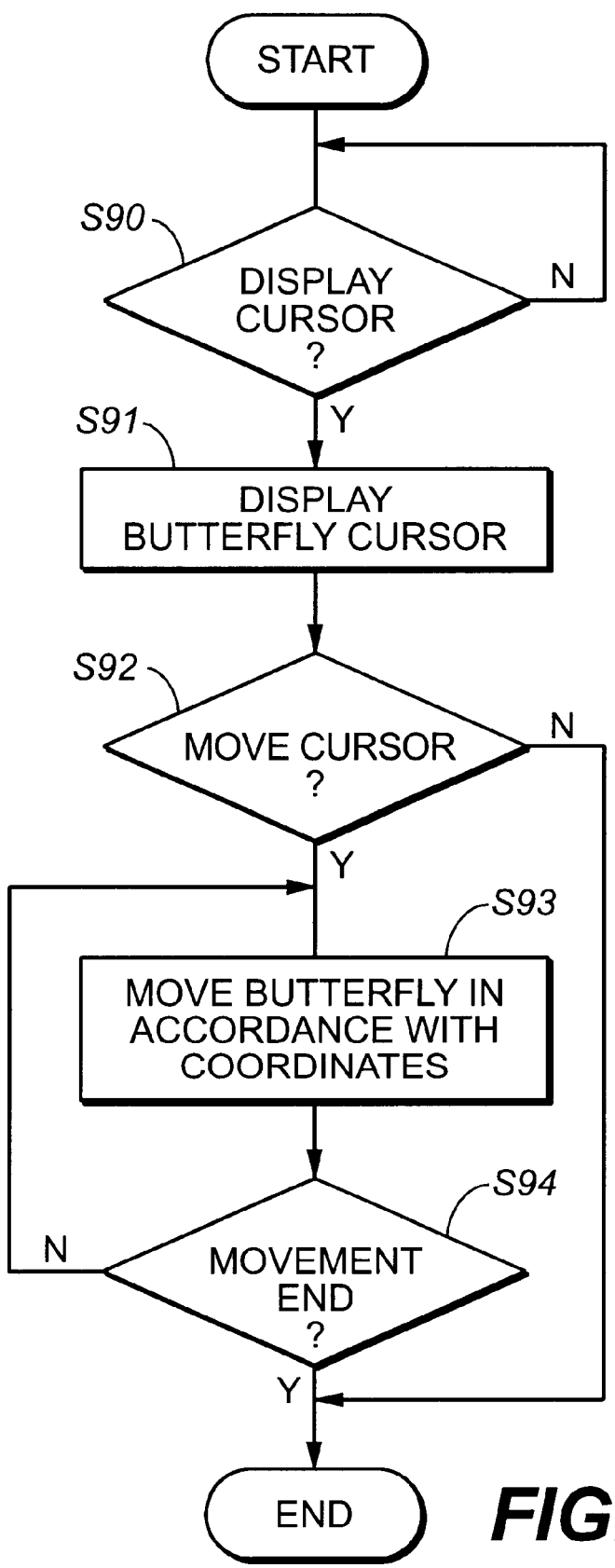
FIG._34

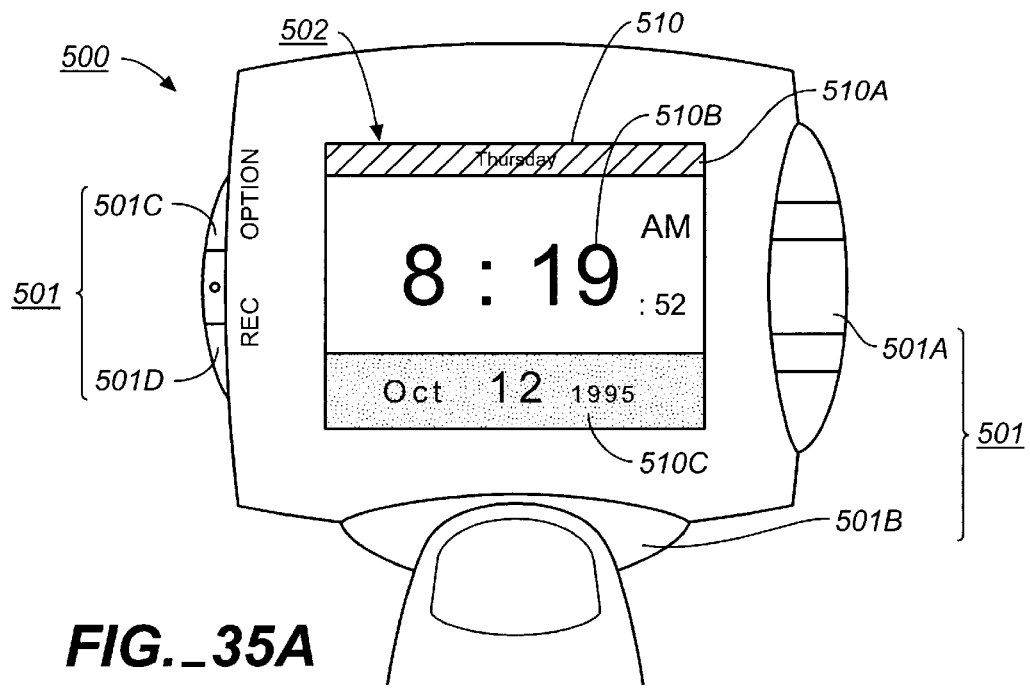
FIG._35A
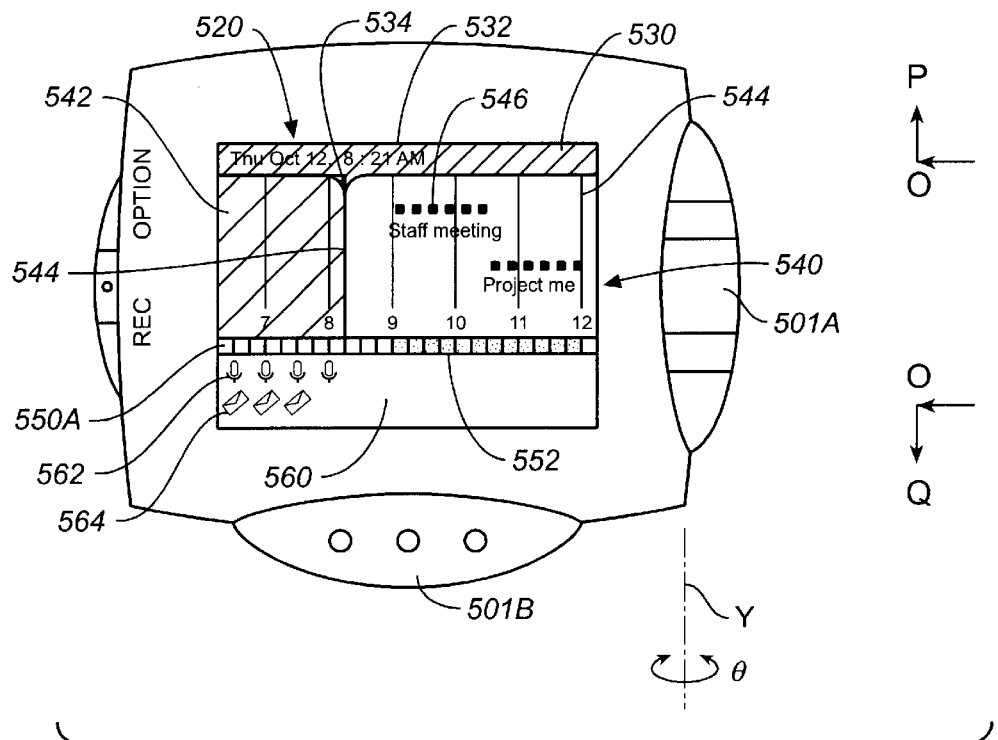
FIG._35B

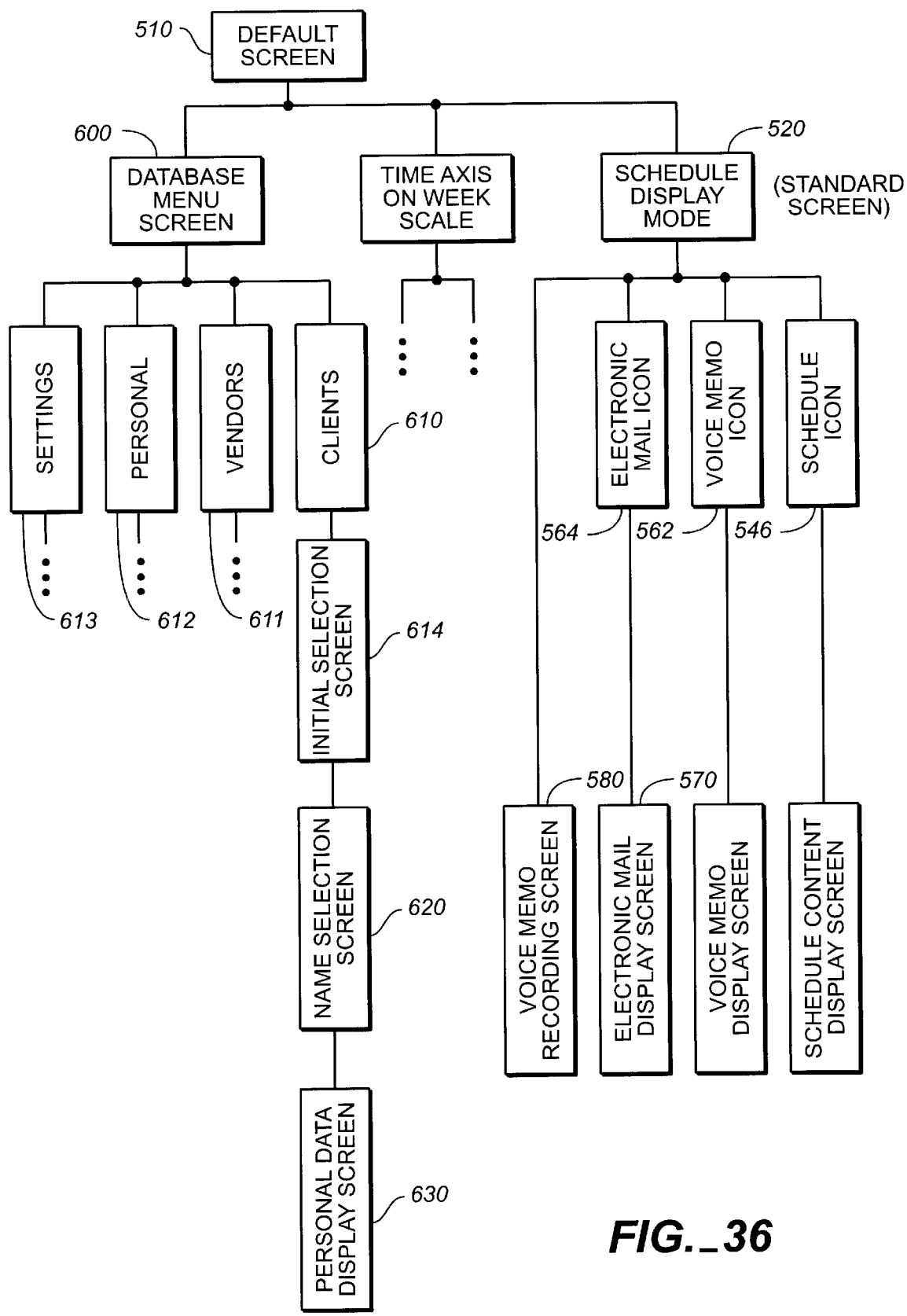
FIG._36

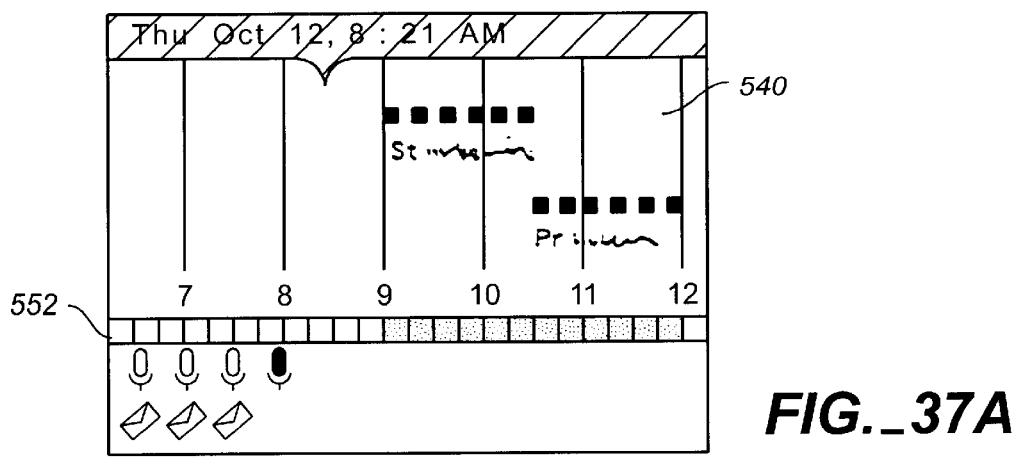
FIG._37A
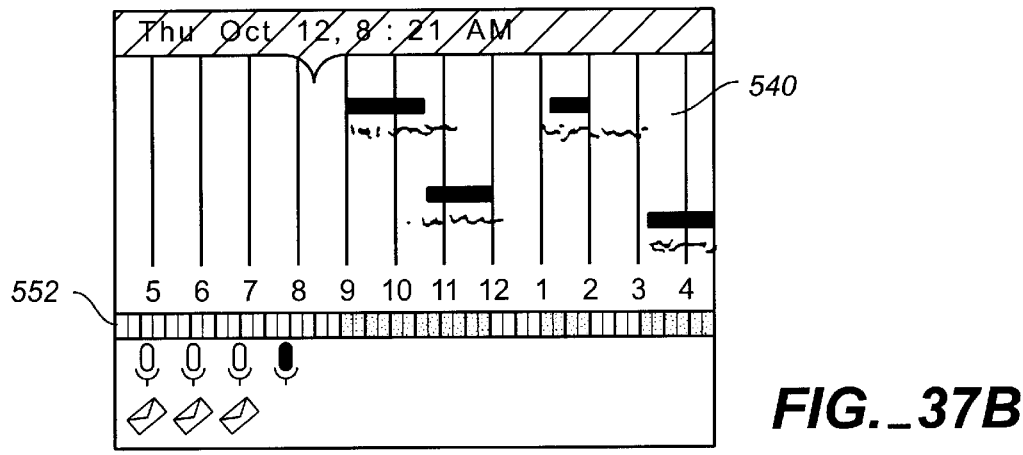
FIG._37B
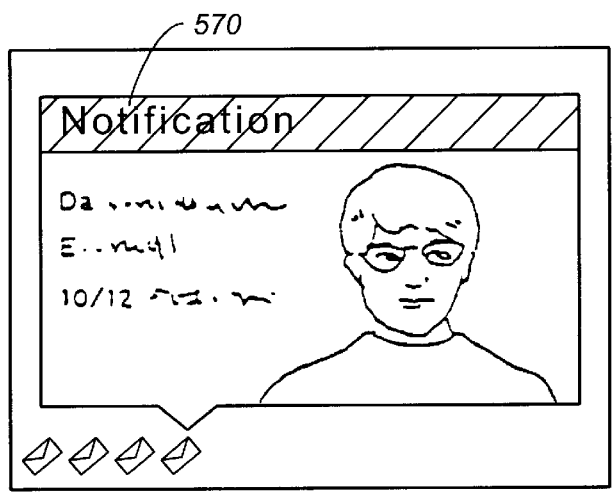
FIG._37C

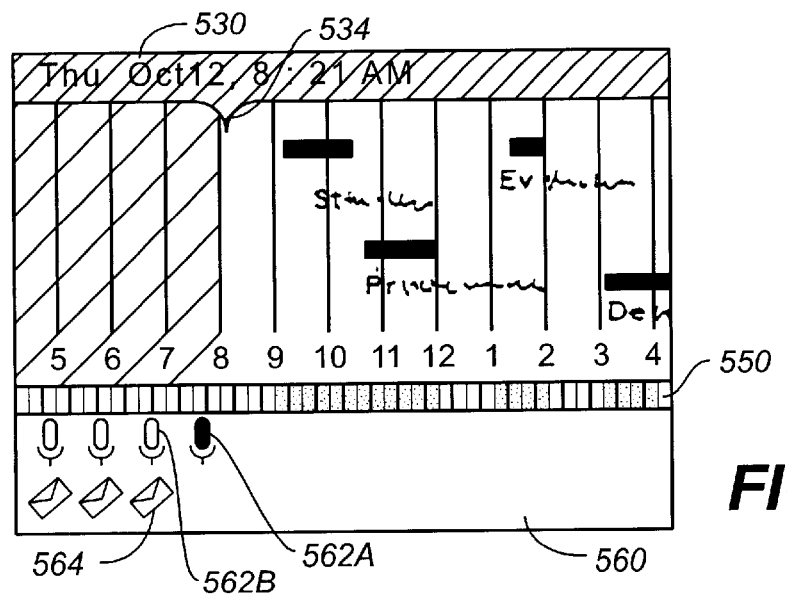
FIG._38A
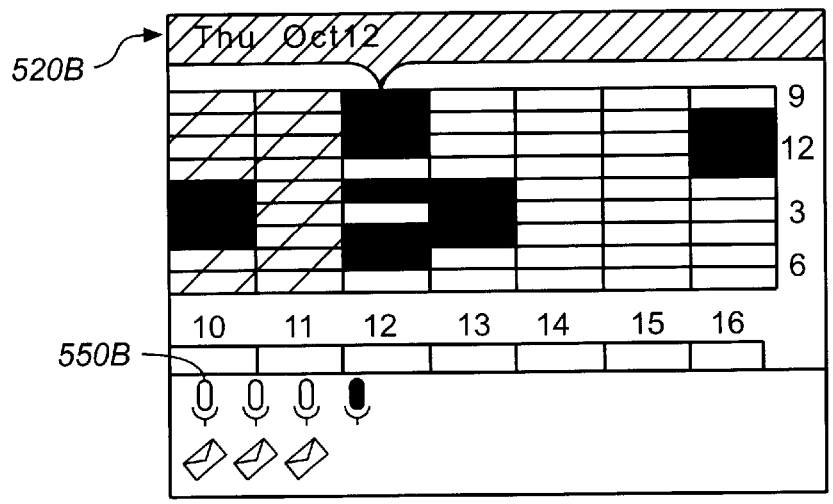
FIG._38B

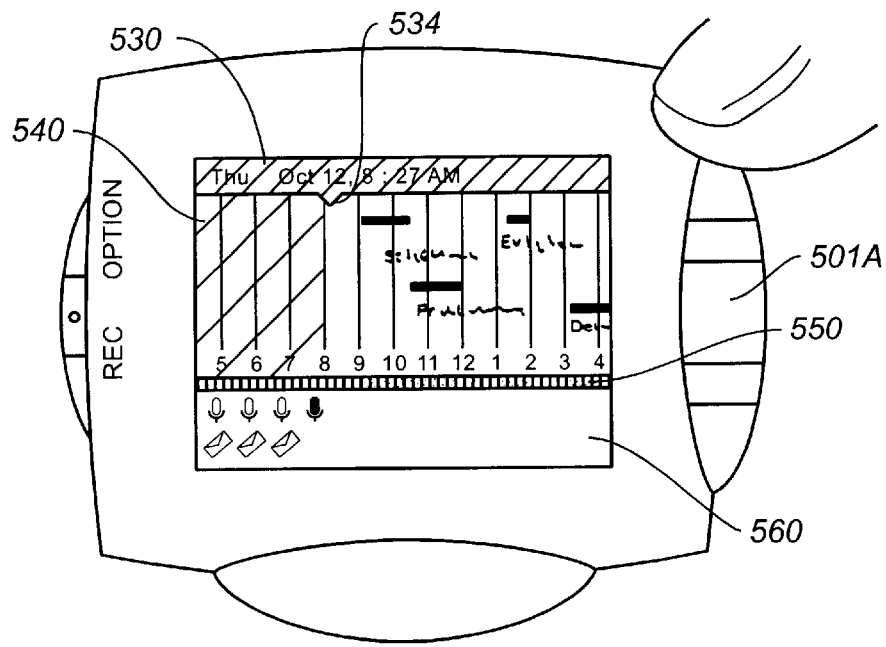
FIG._39A
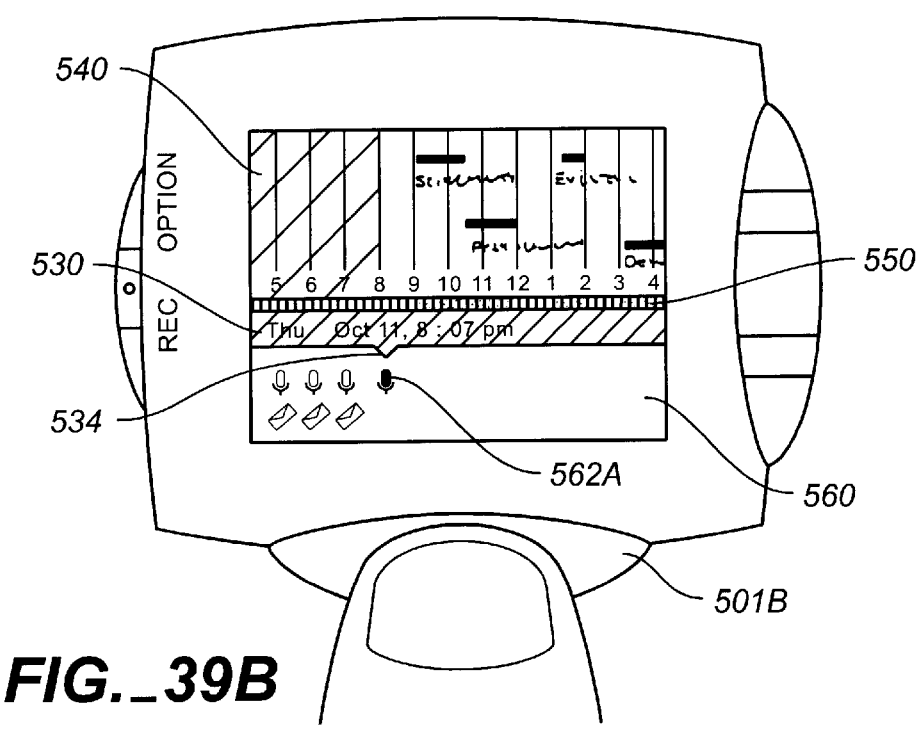
FIG._39B

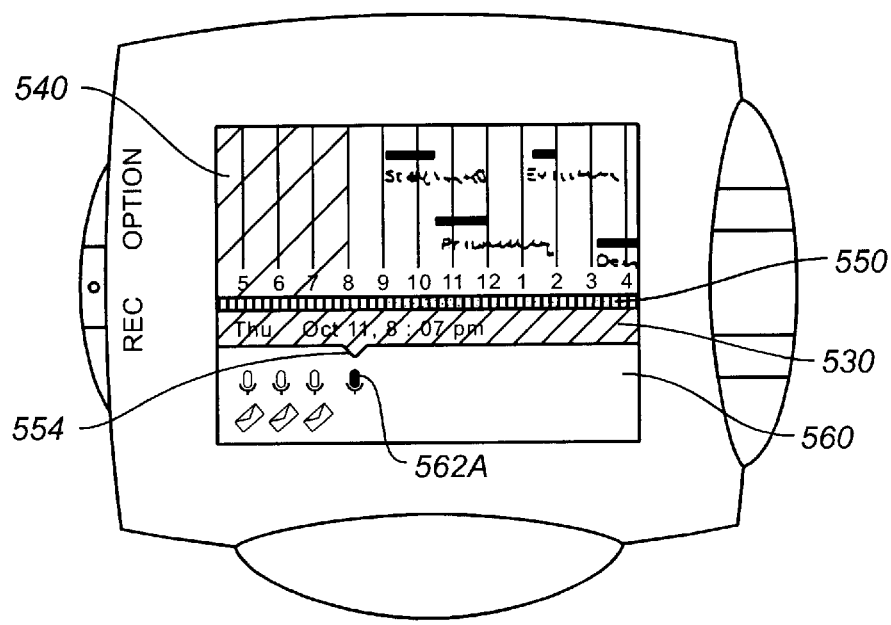
FIG._39C
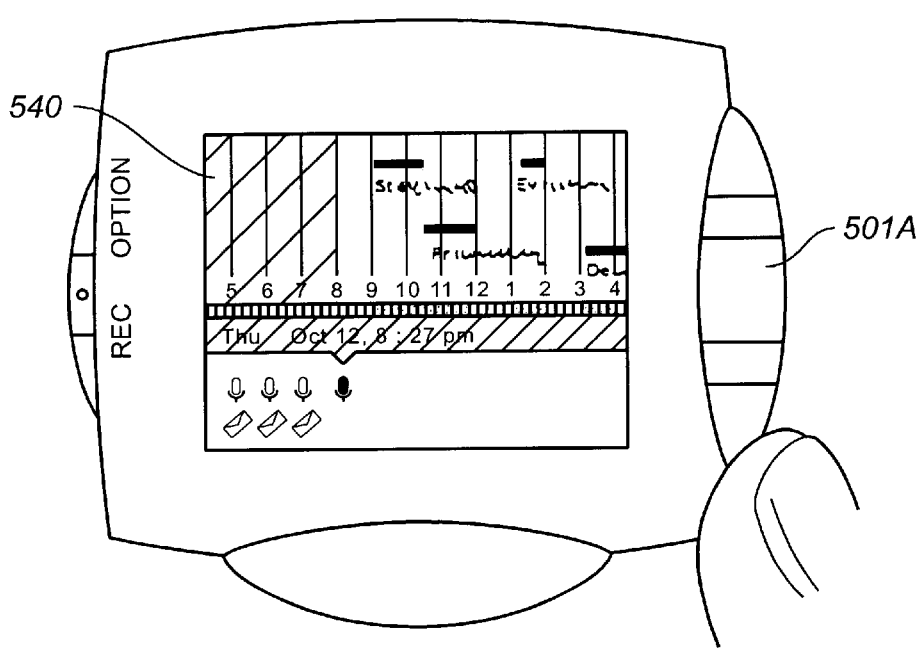
FIG._40A

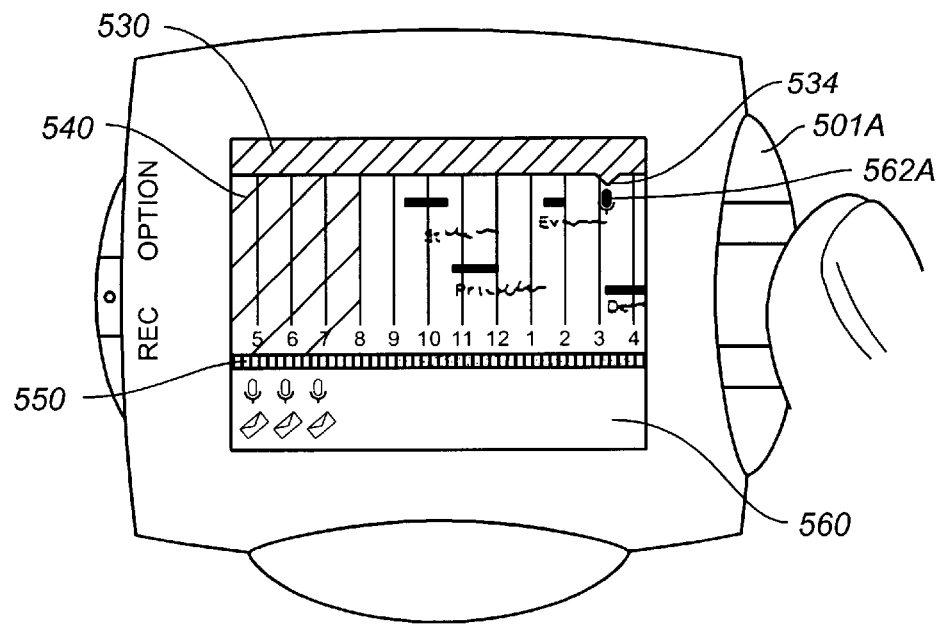
FIG._40B
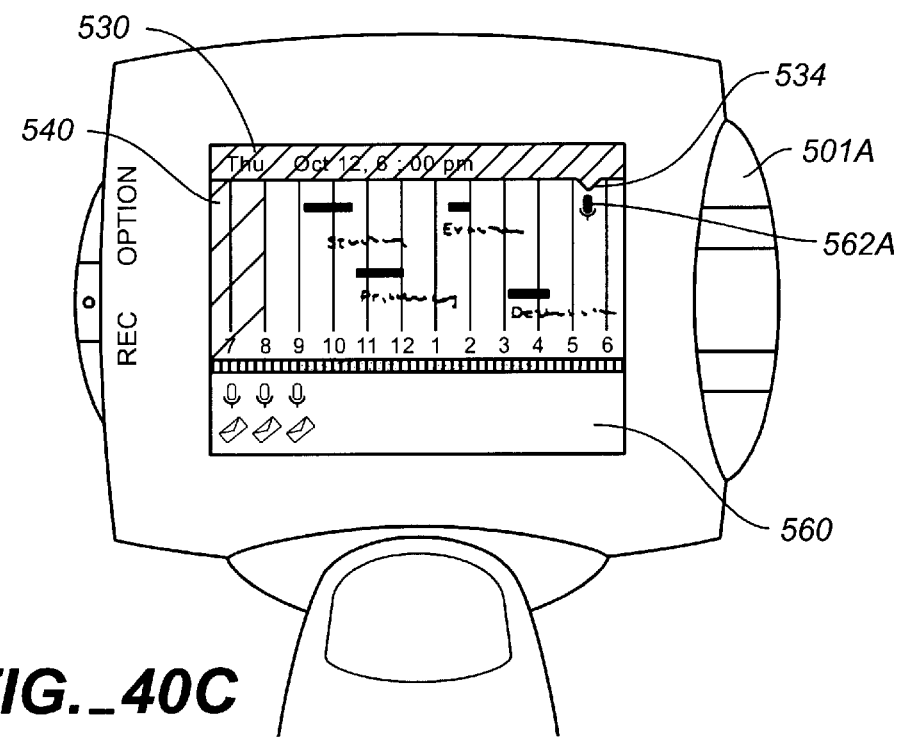
FIG._40C

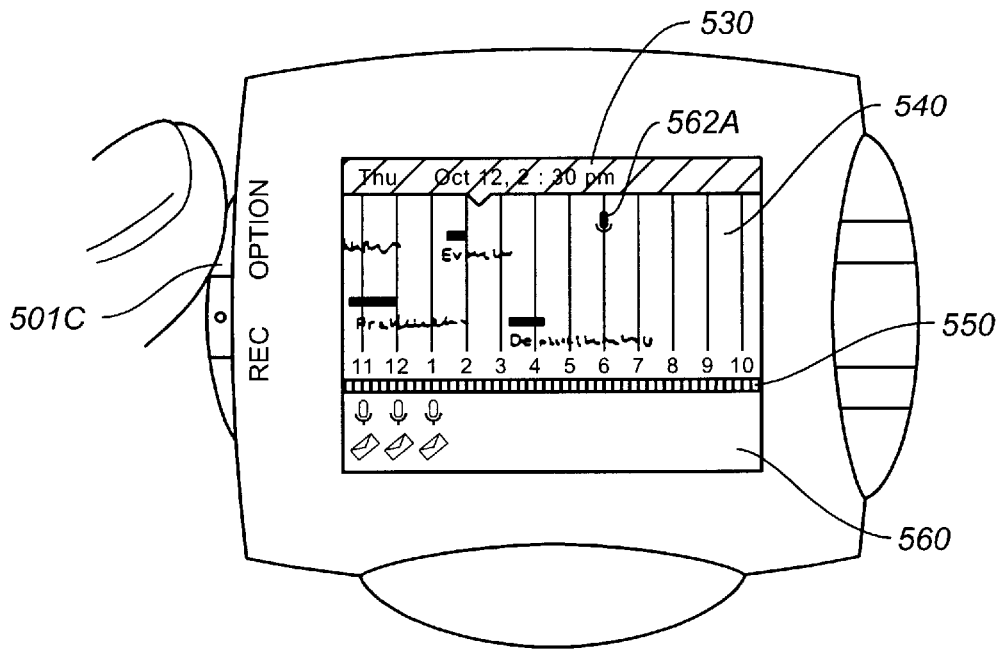
FIG._41A
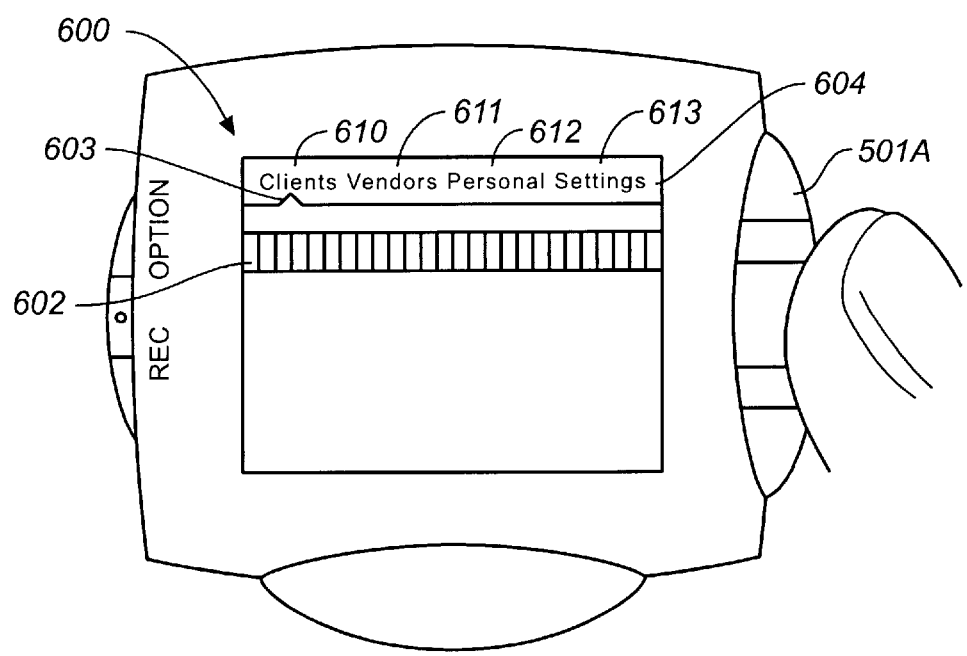
FIG._41B

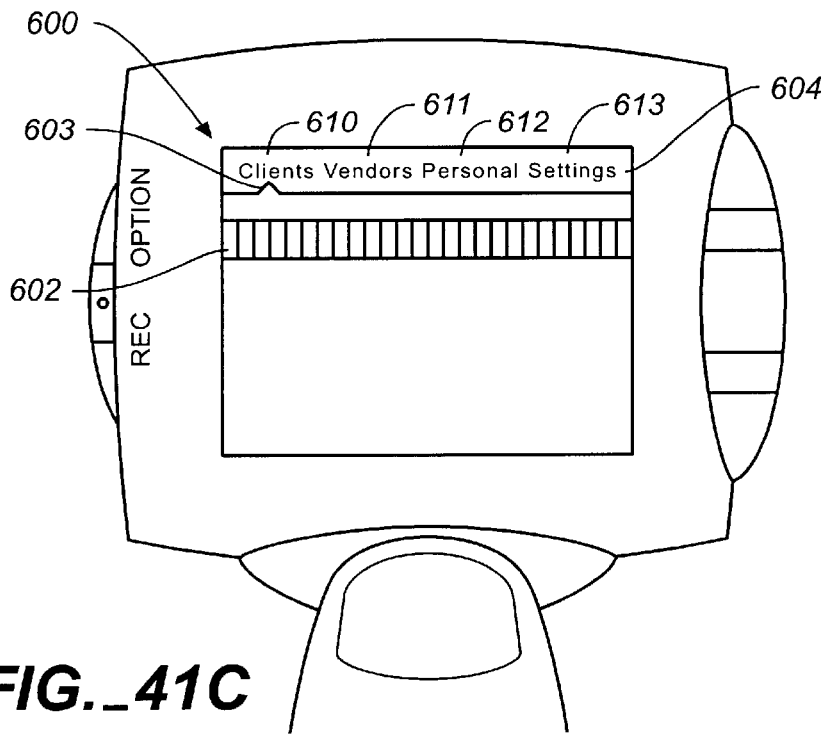
FIG._41C
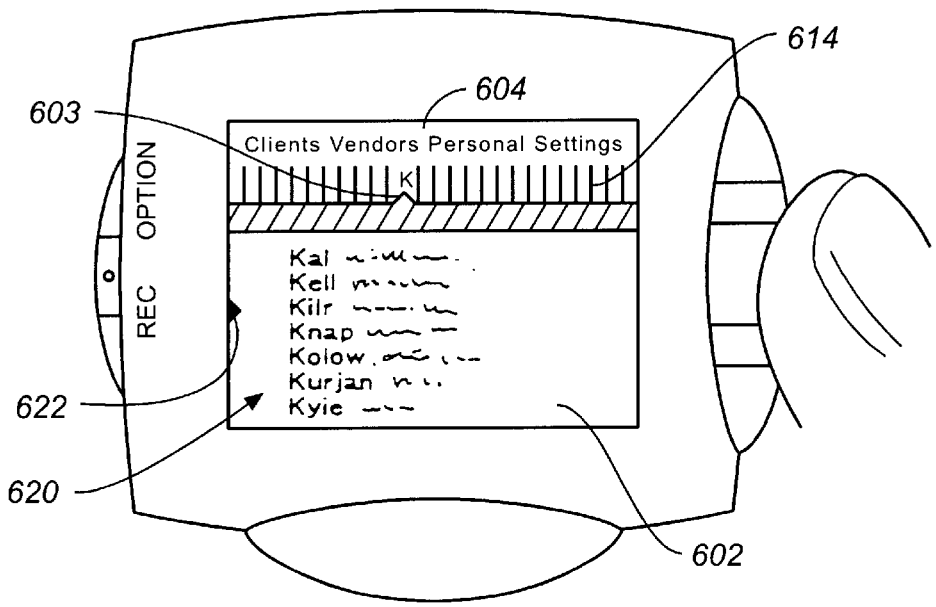
FIG._42A

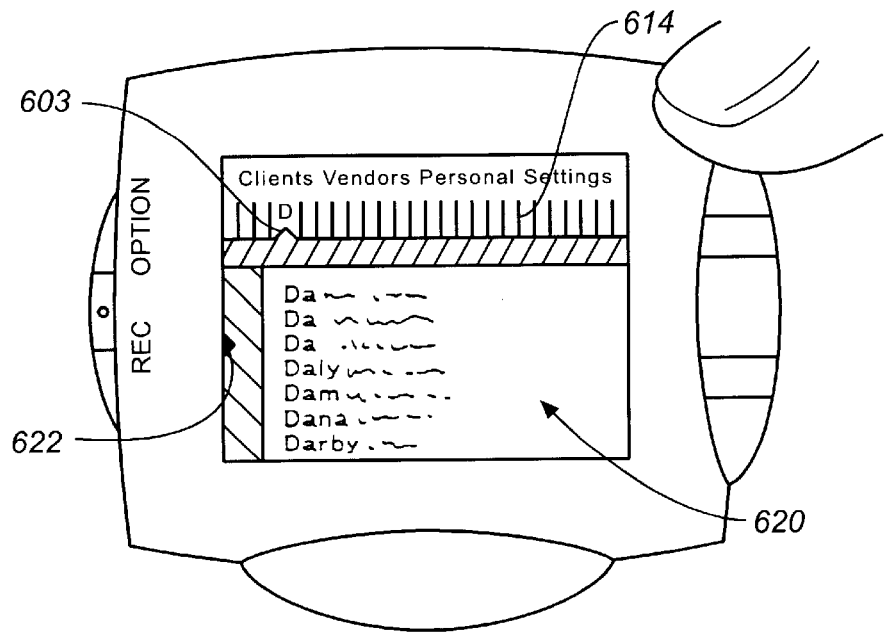
FIG._42B
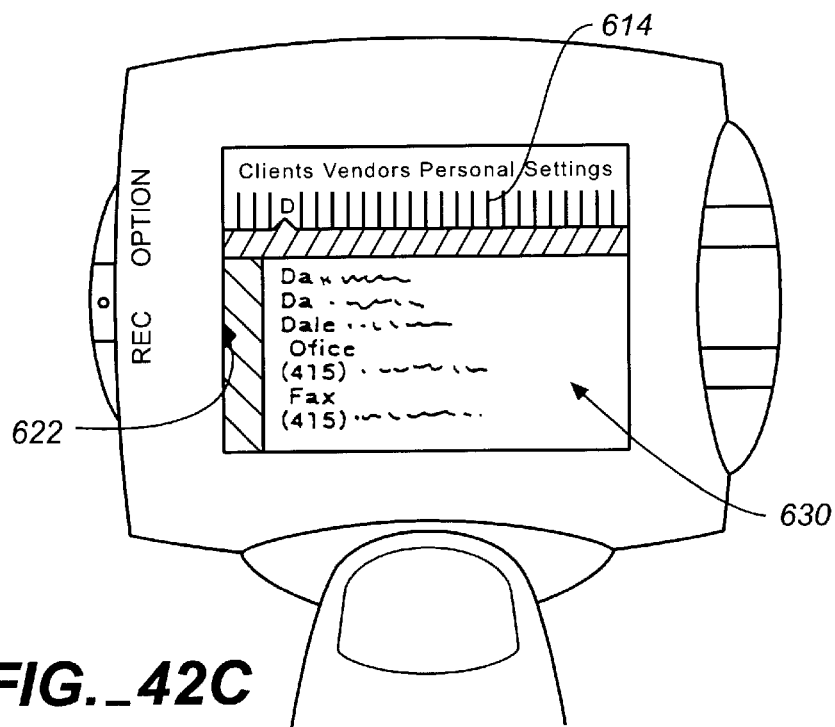
FIG._42C

FIG._43
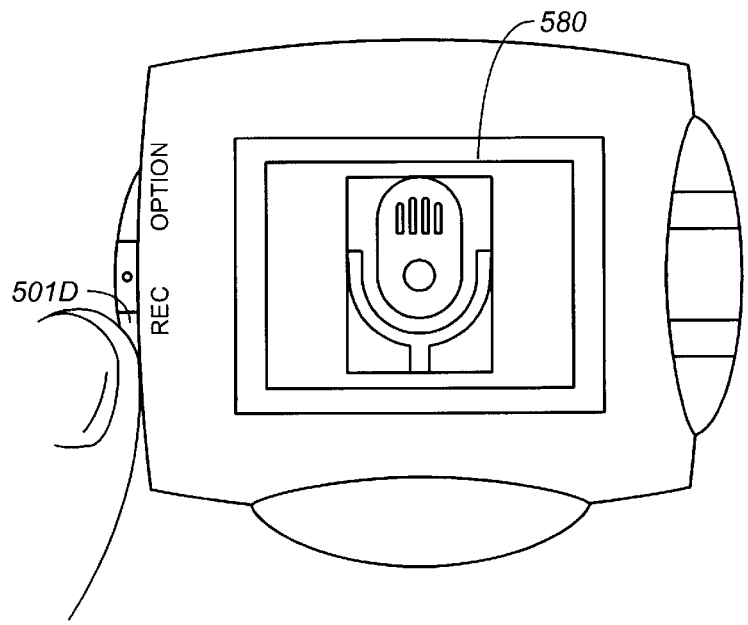
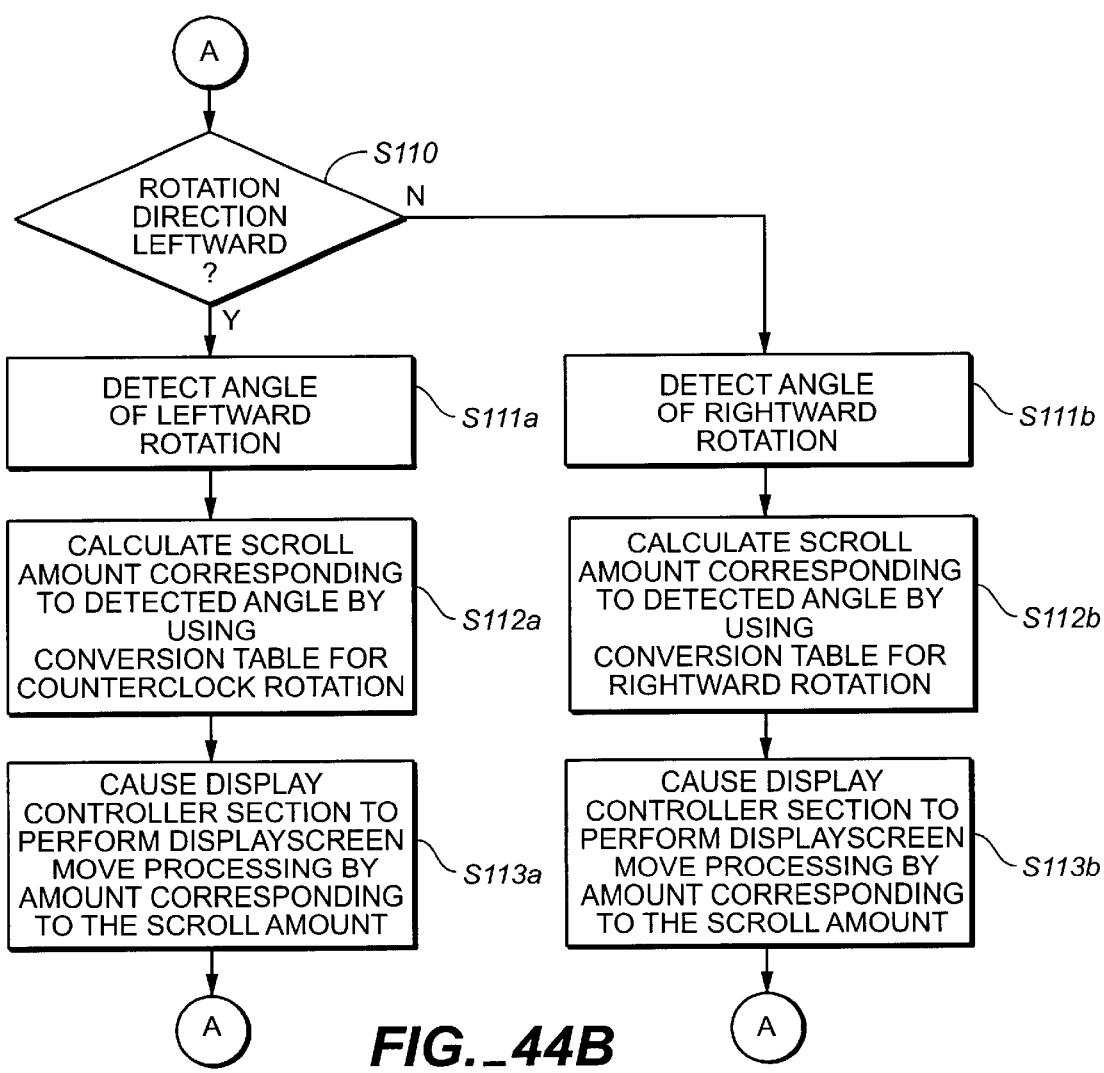
FIG._44B

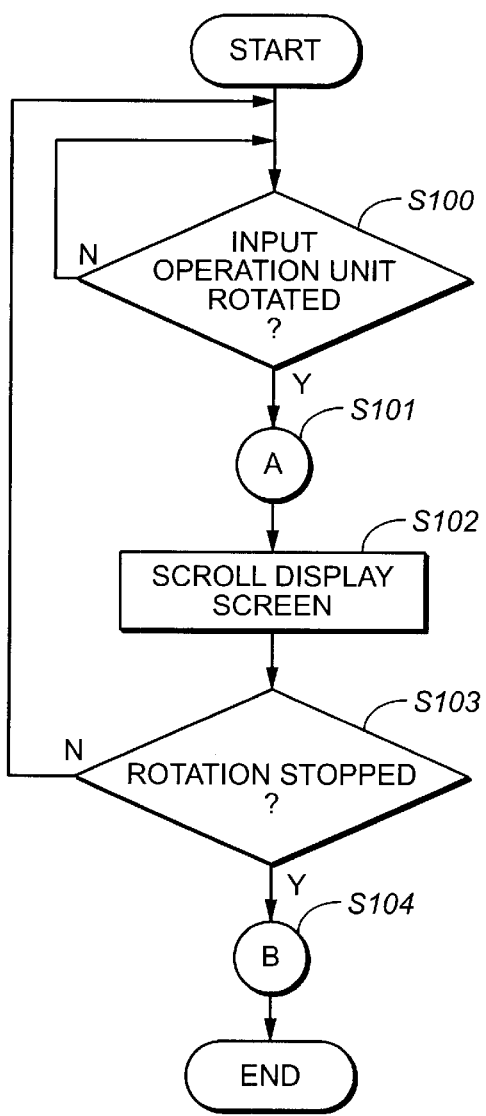
FIG._44A
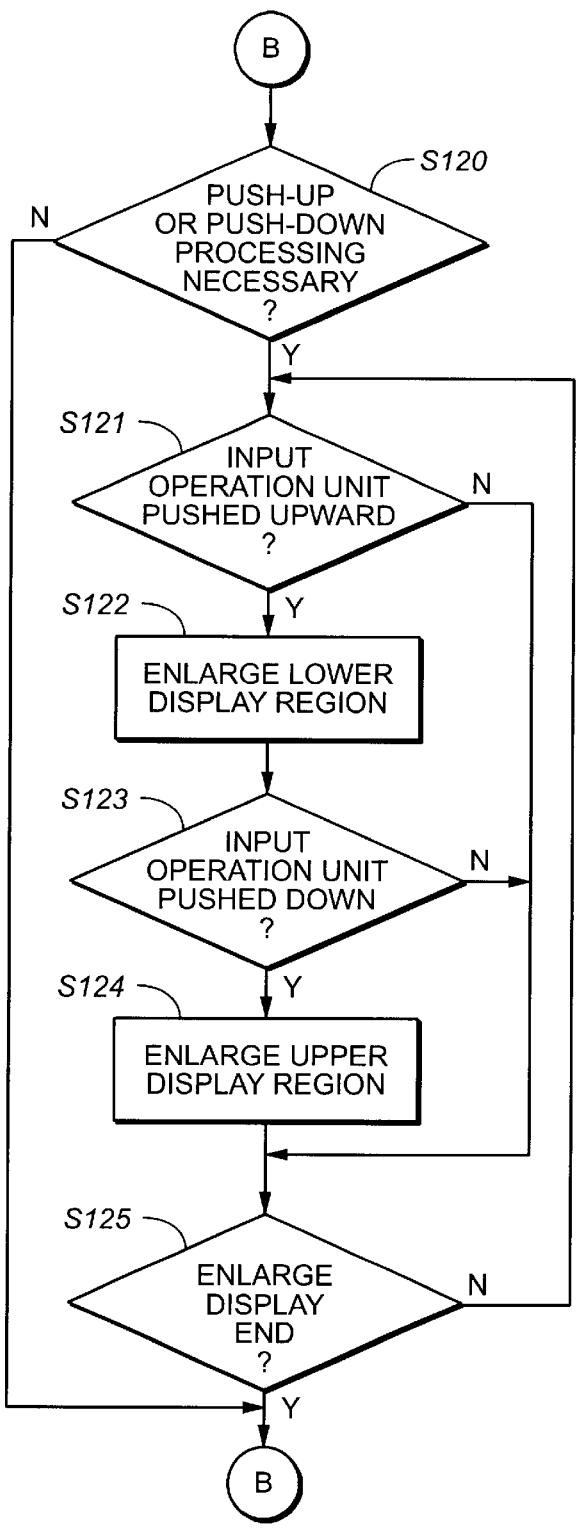
FIG._44C

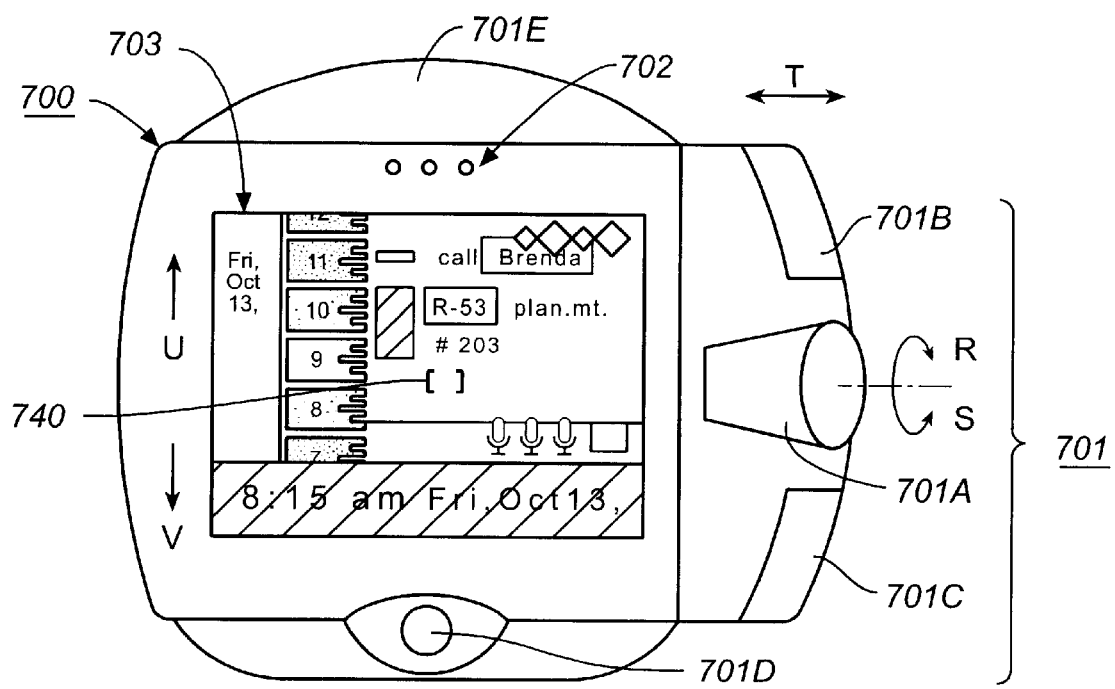
FIG._45A
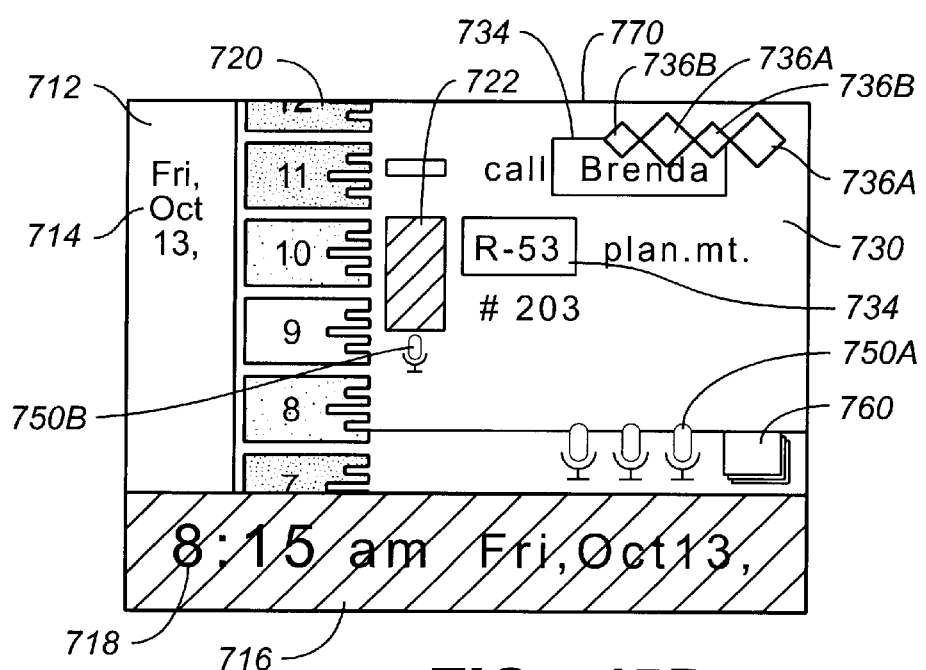
FIG._45B

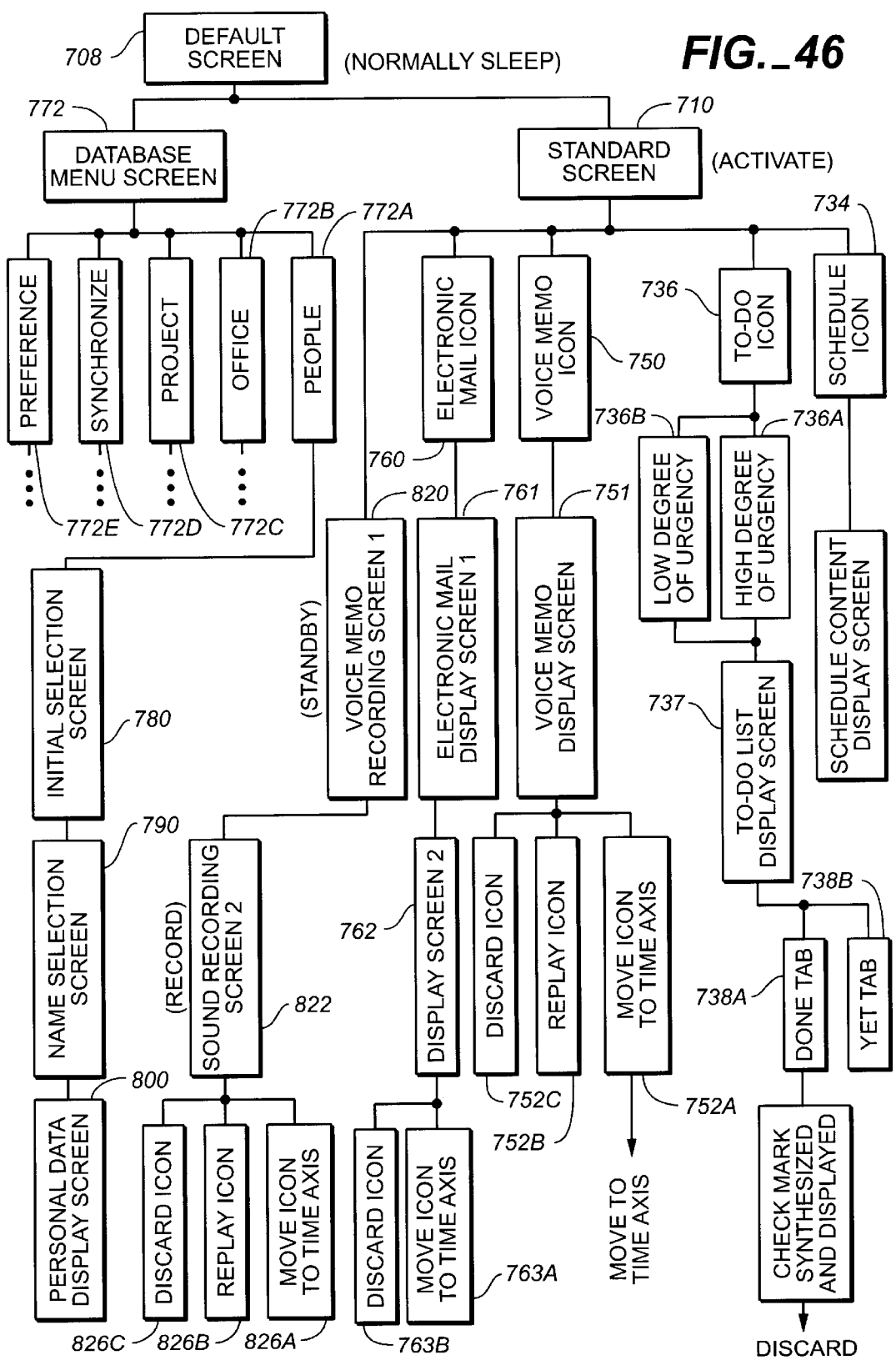
FIG._46

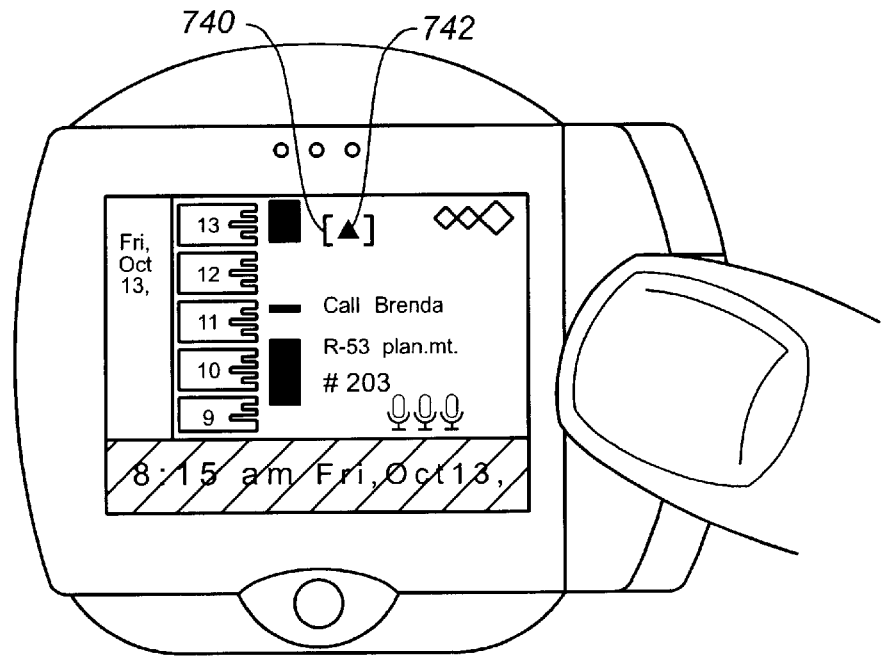
FIG._47
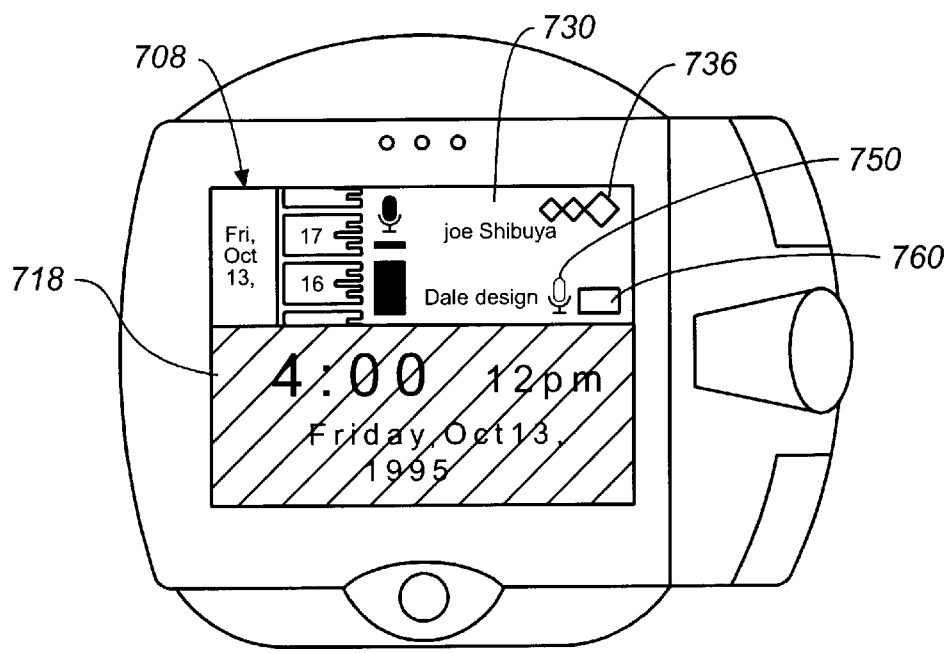
FIG._50

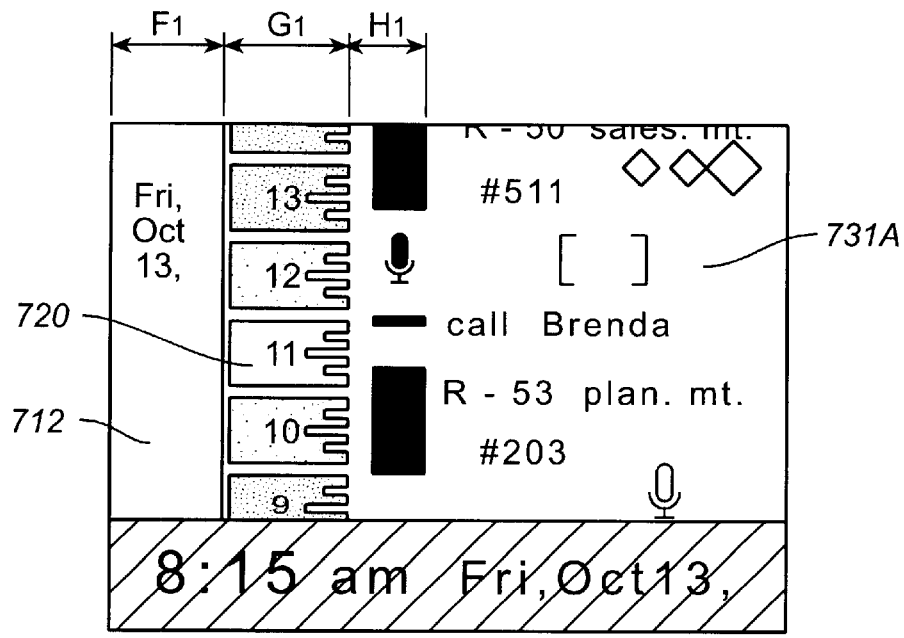
FIG._48A
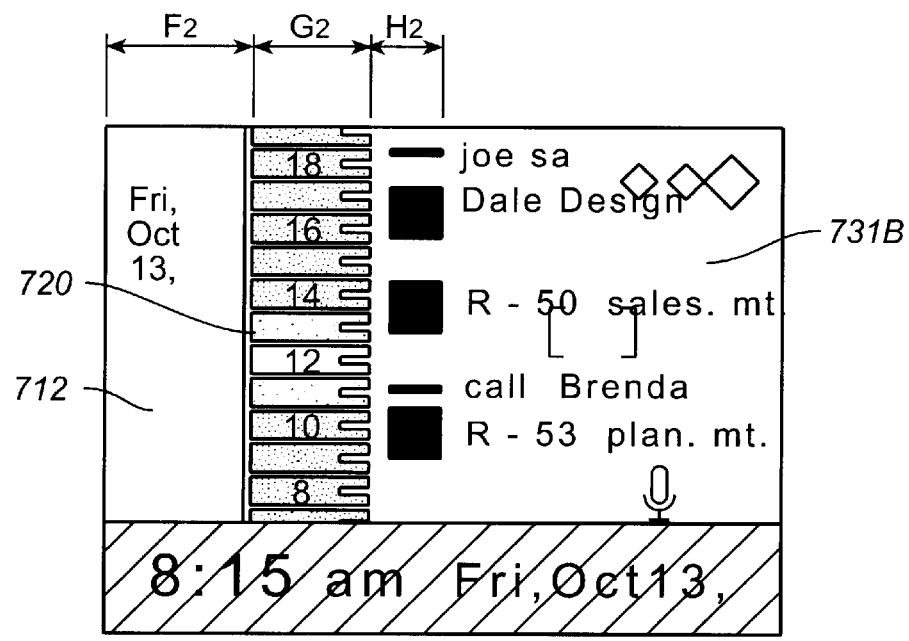
FIG._48B

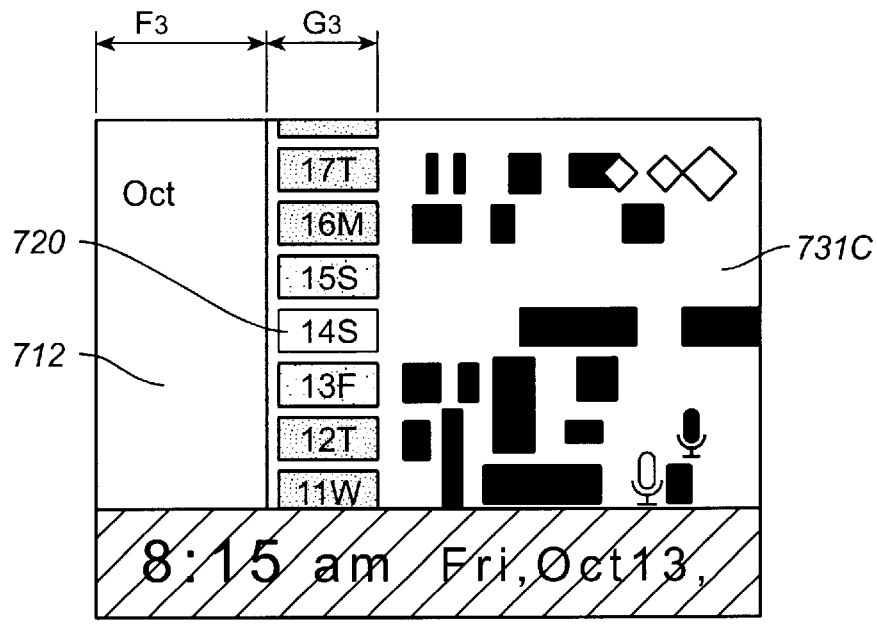
FIG._48C
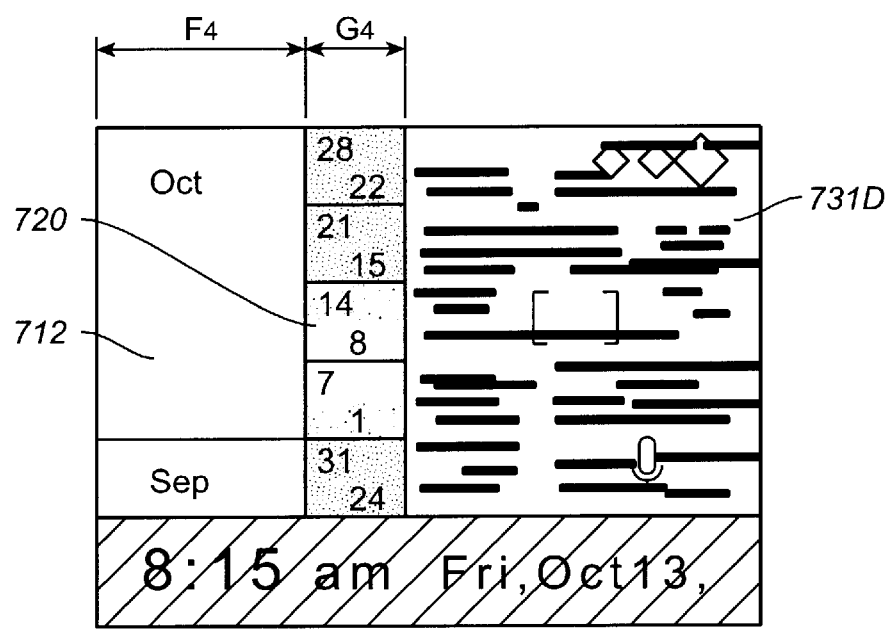
FIG._48D

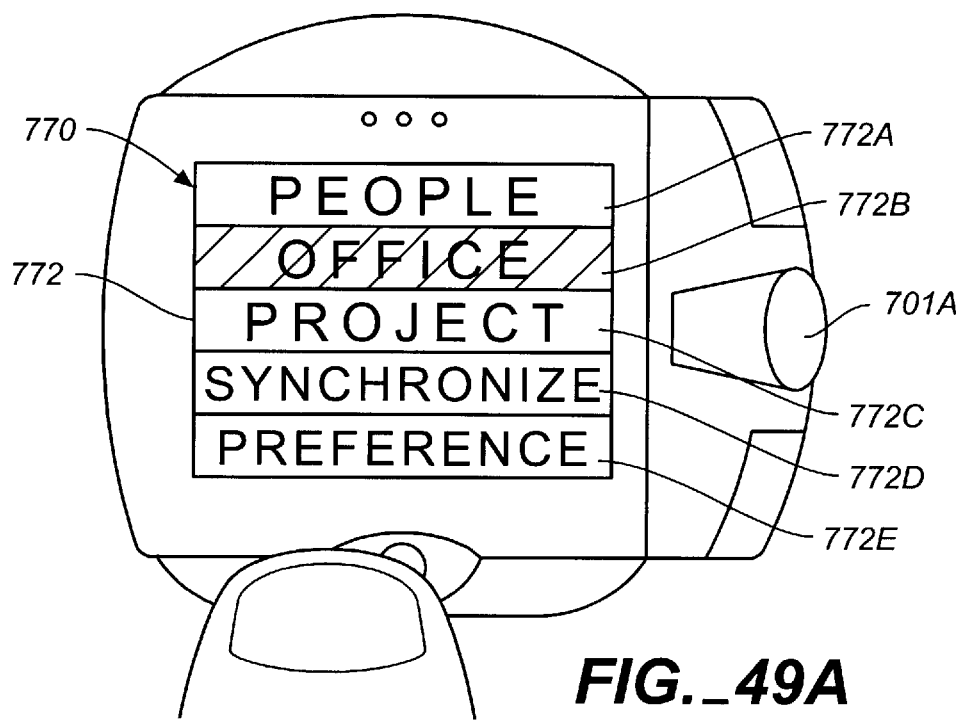
FIG._49A
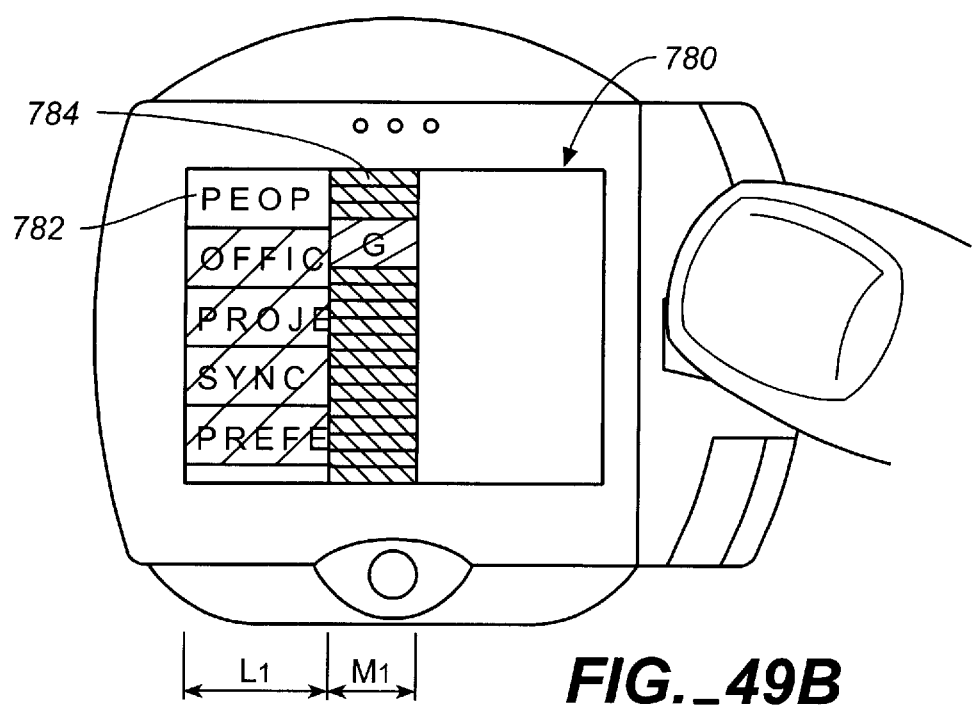
FIG._49B

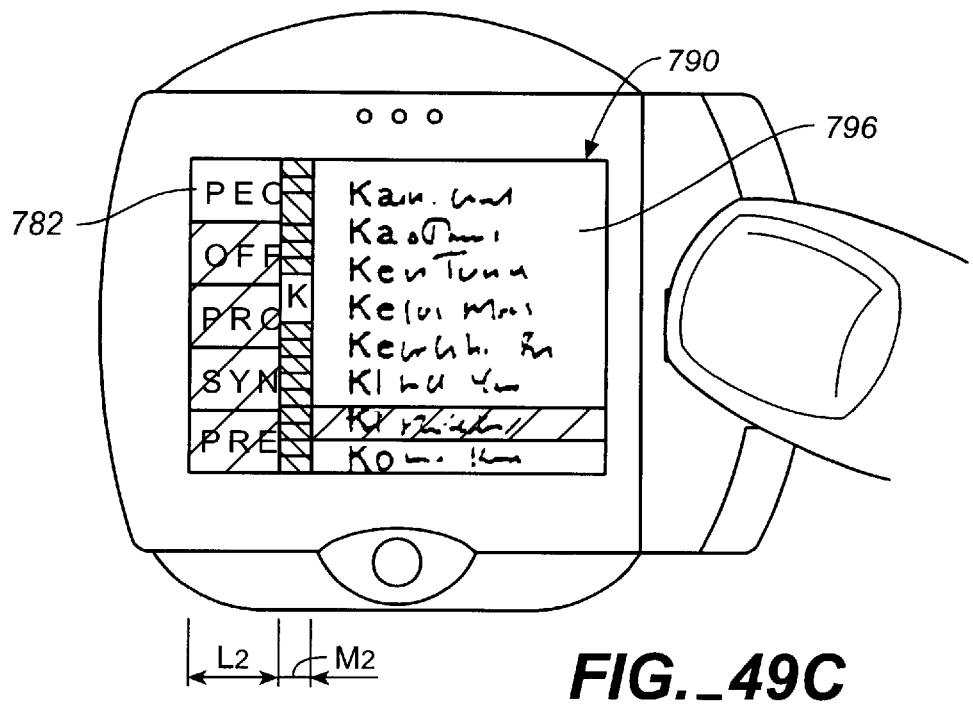
FIG._49C
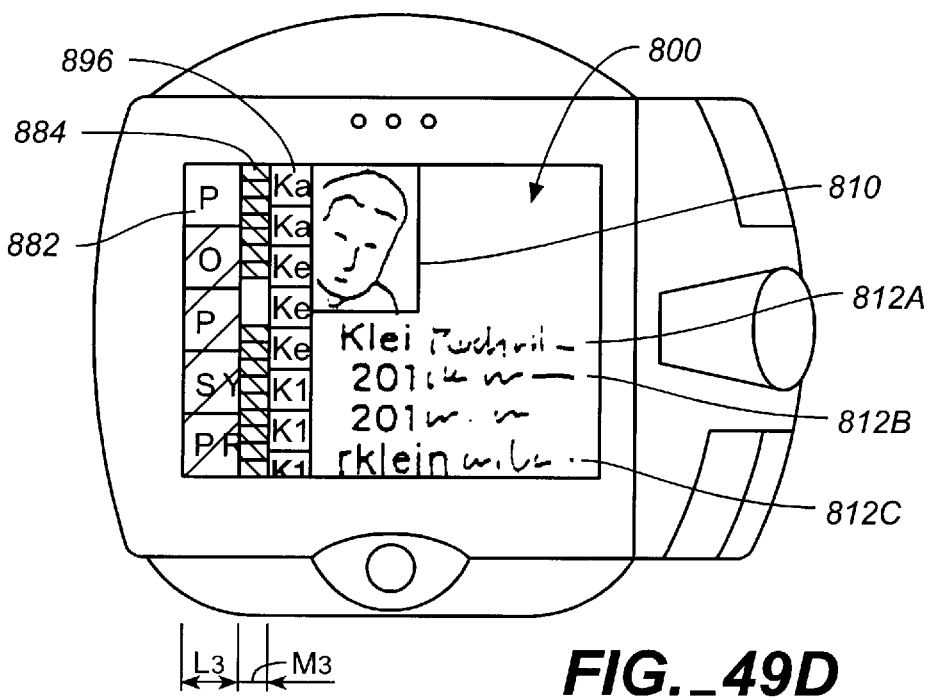
FIG._49D

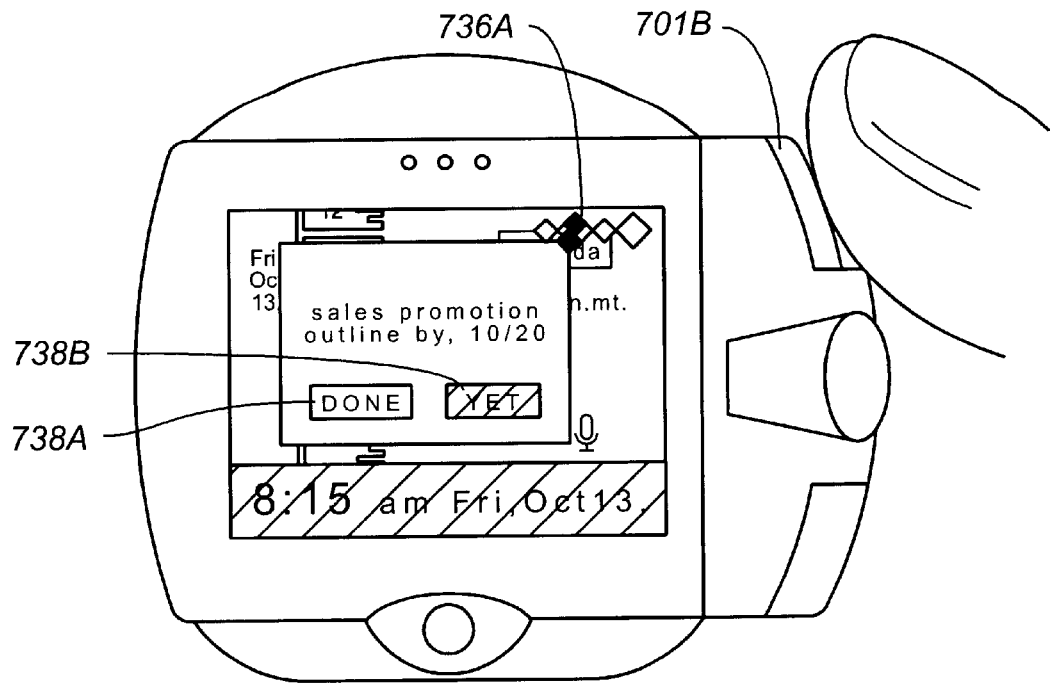
FIG._51A
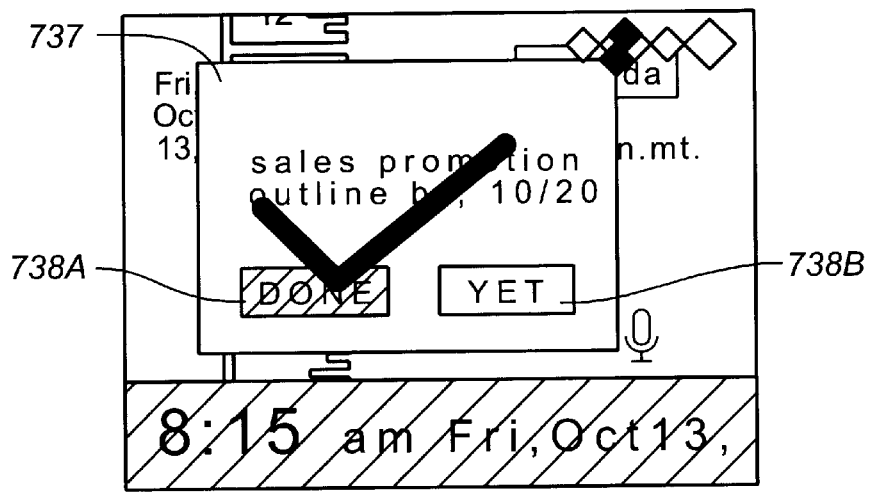
FIG._51B

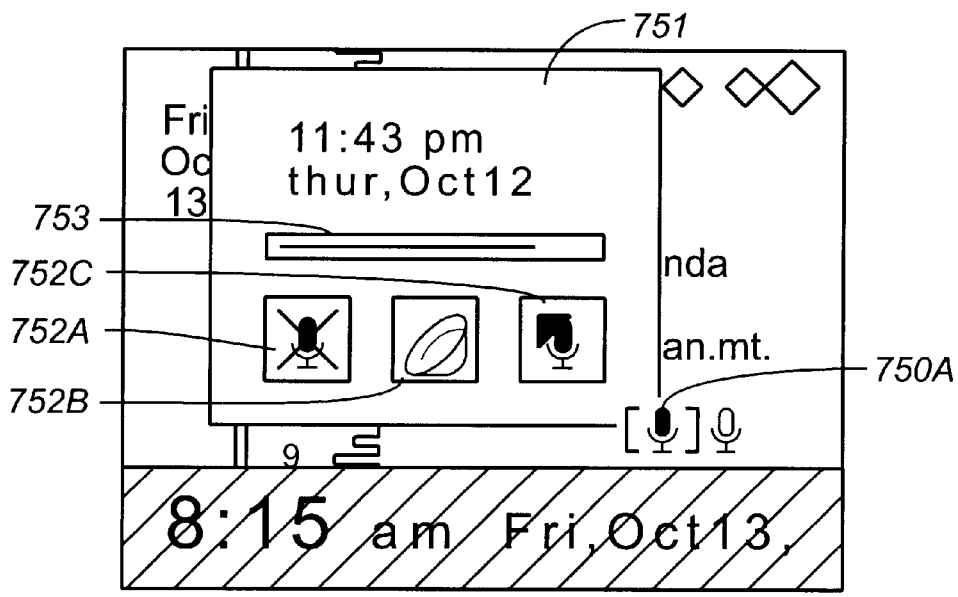
FIG._52A
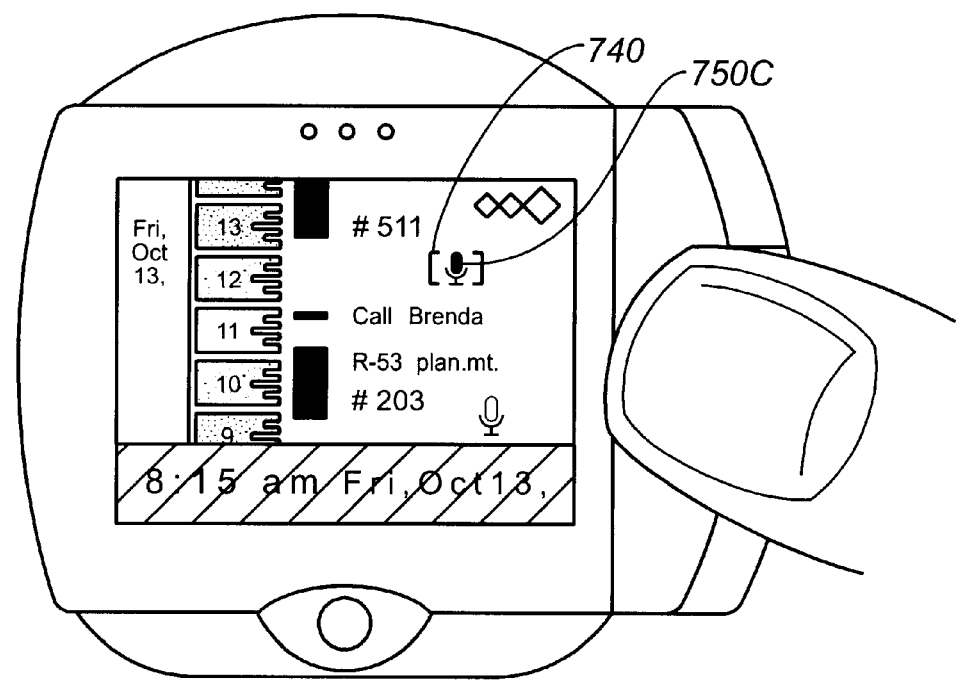
FIG._52B

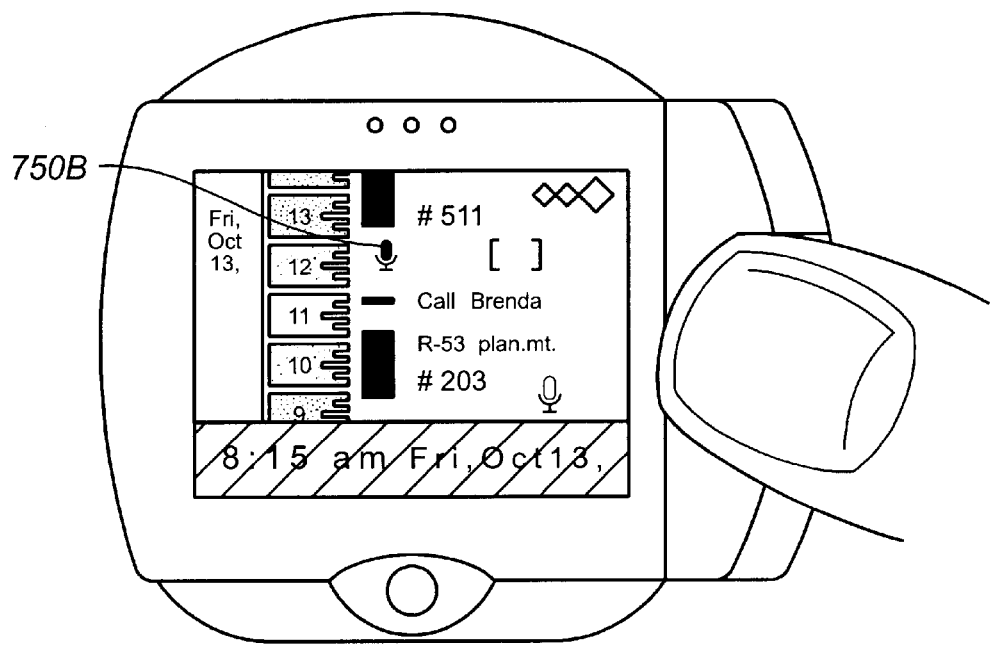
FIG._52C
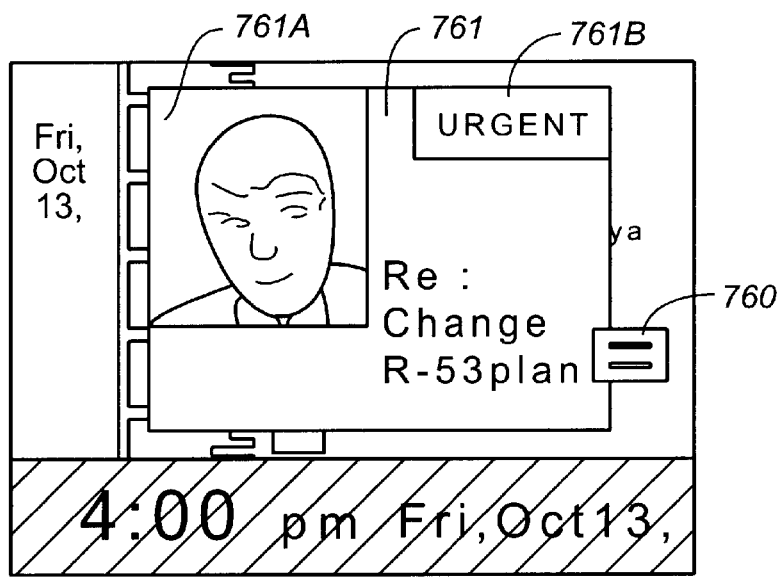
FIG._53A

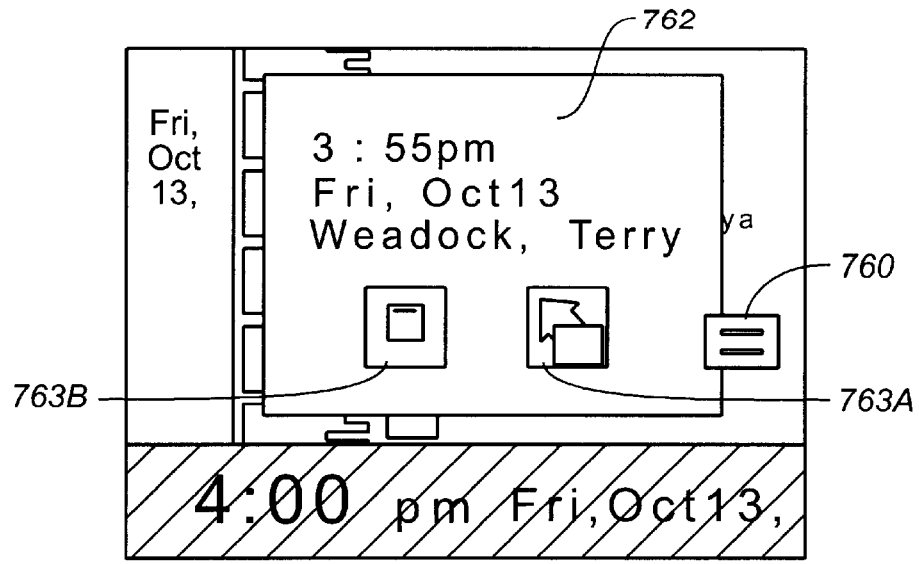
FIG._53B
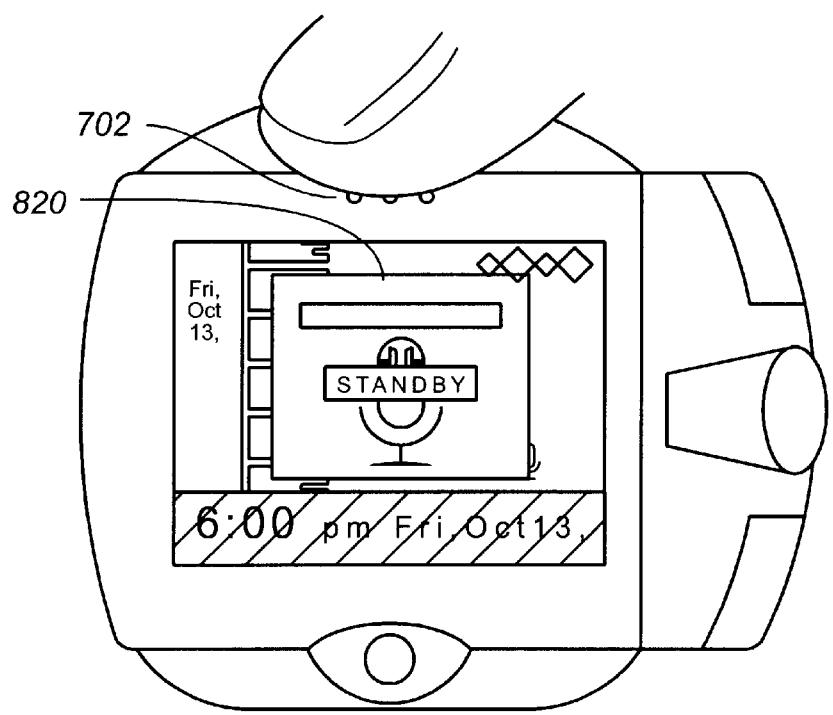
FIG._54A

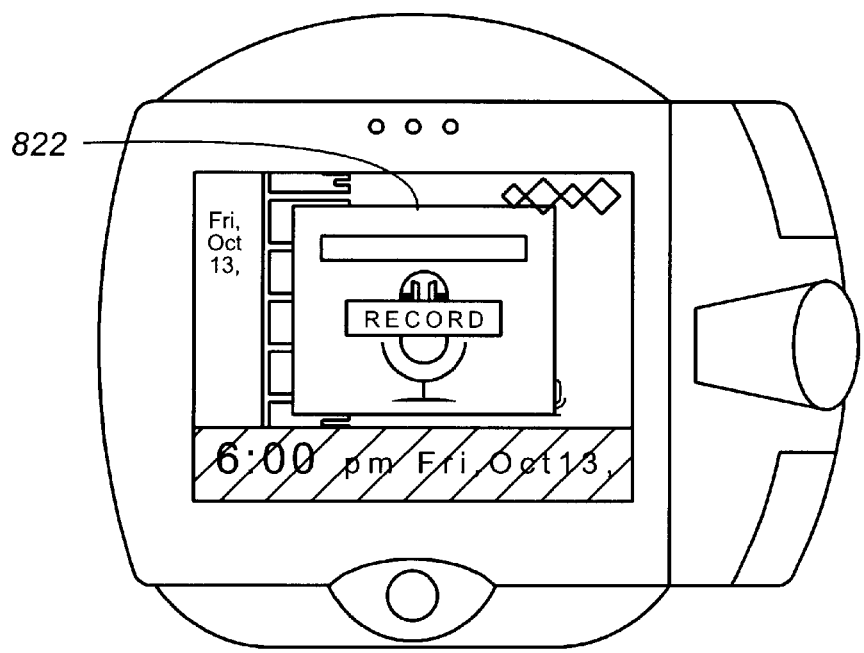
FIG._54B
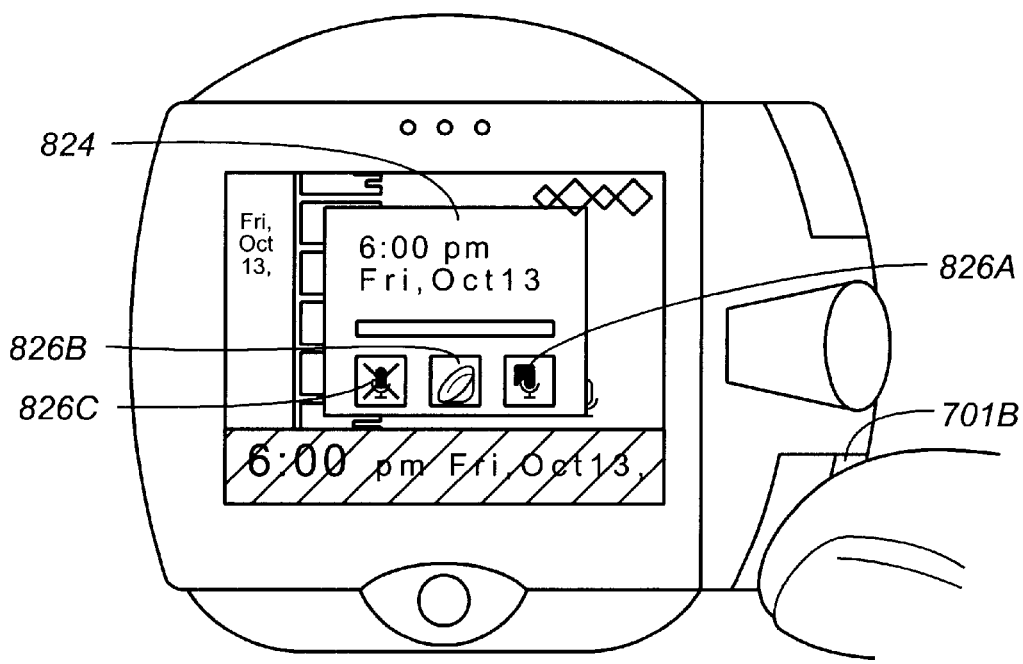
FIG._54C

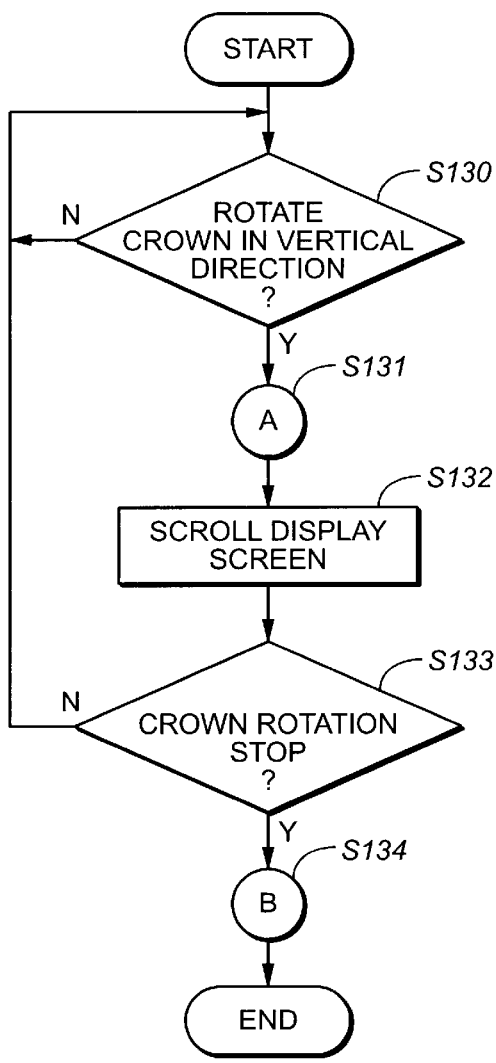
FIG._55A
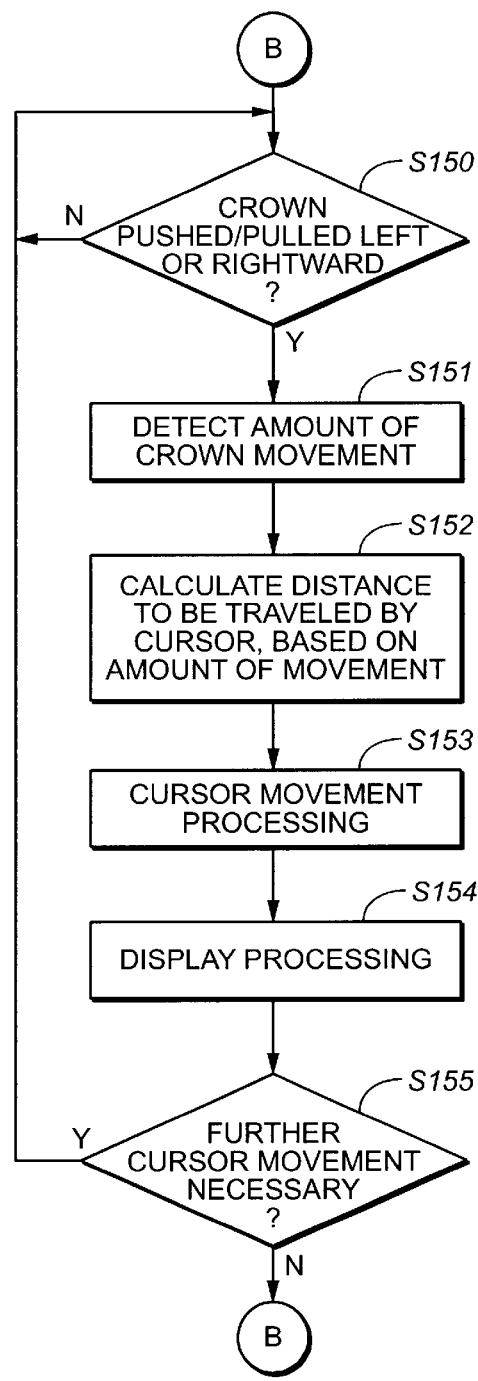
FIG._55C

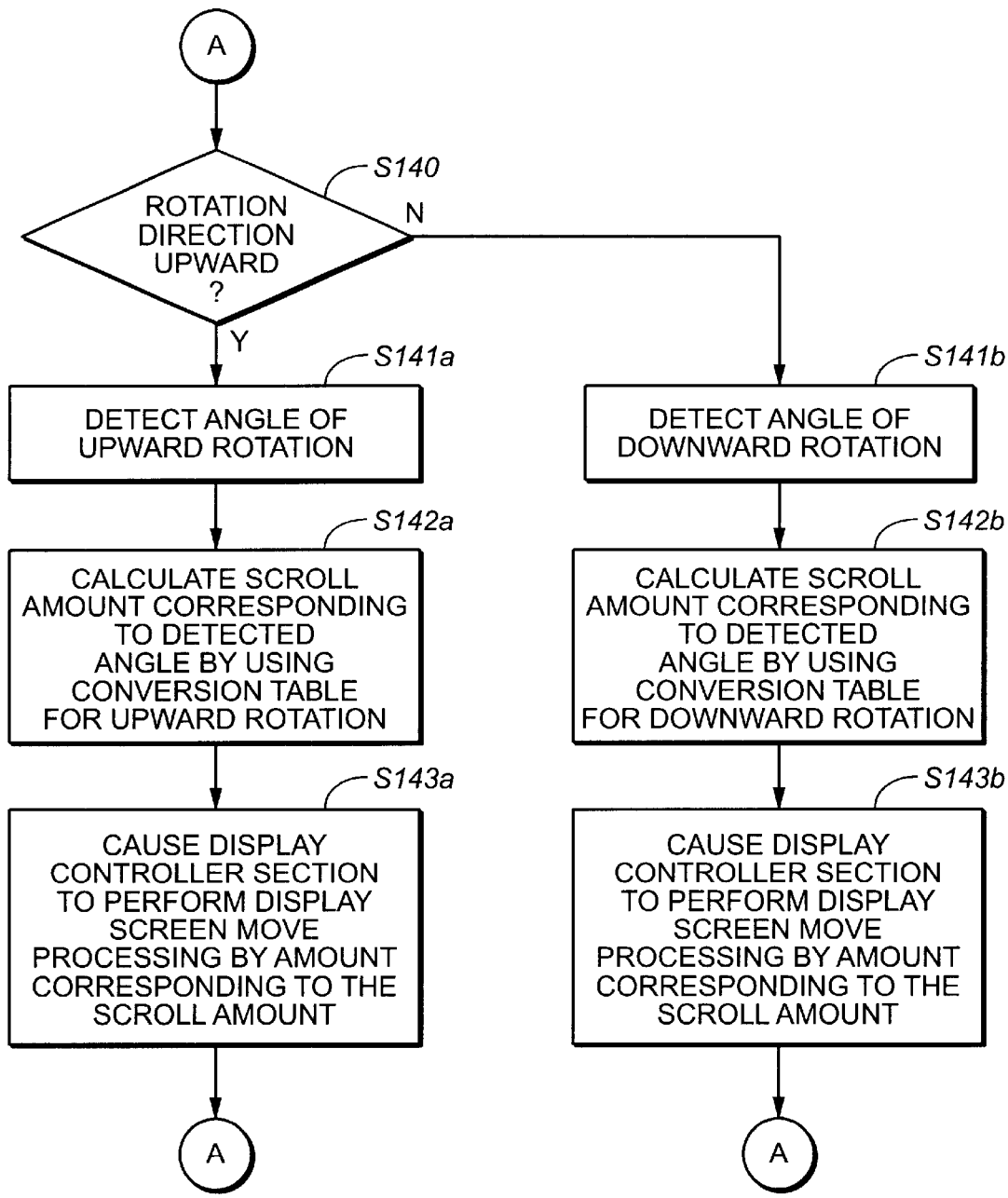
FIG._55B

FIG._56A
CASE 1
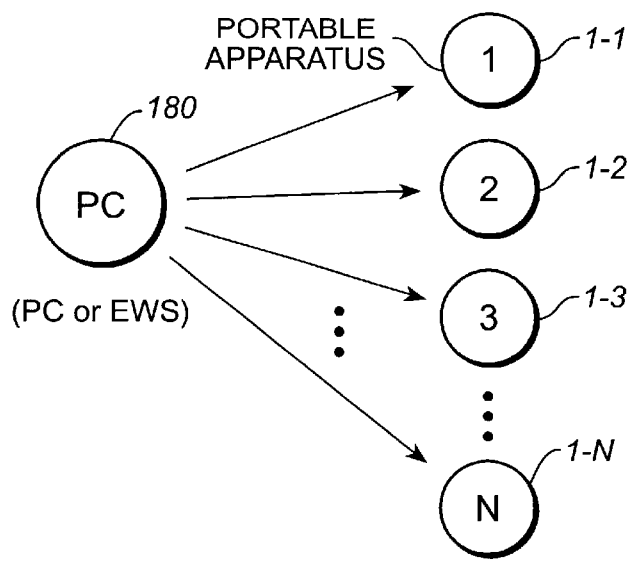
FIG._56B
CASE 2
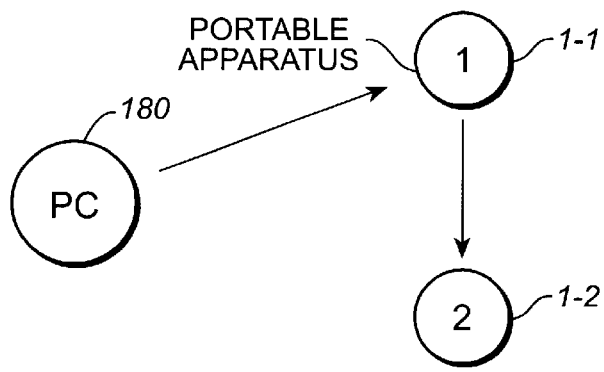
FIG._56C
CASE 3
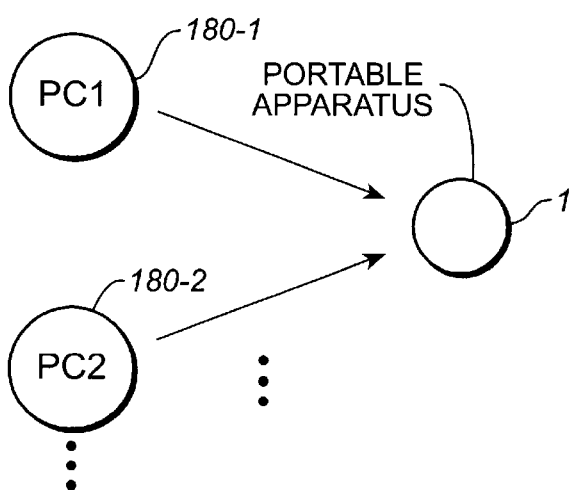

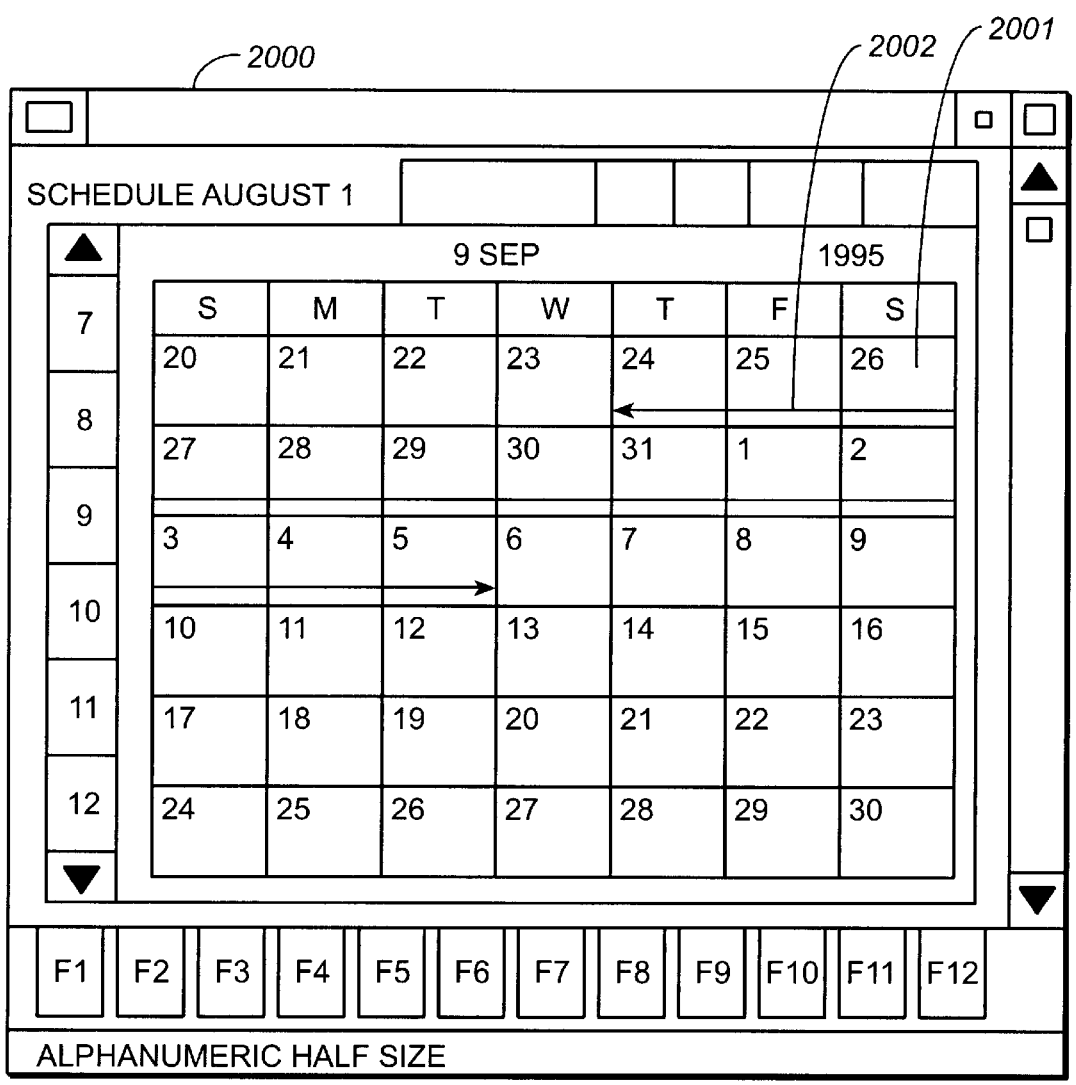
FIG._57
*(PRIOR ART)*

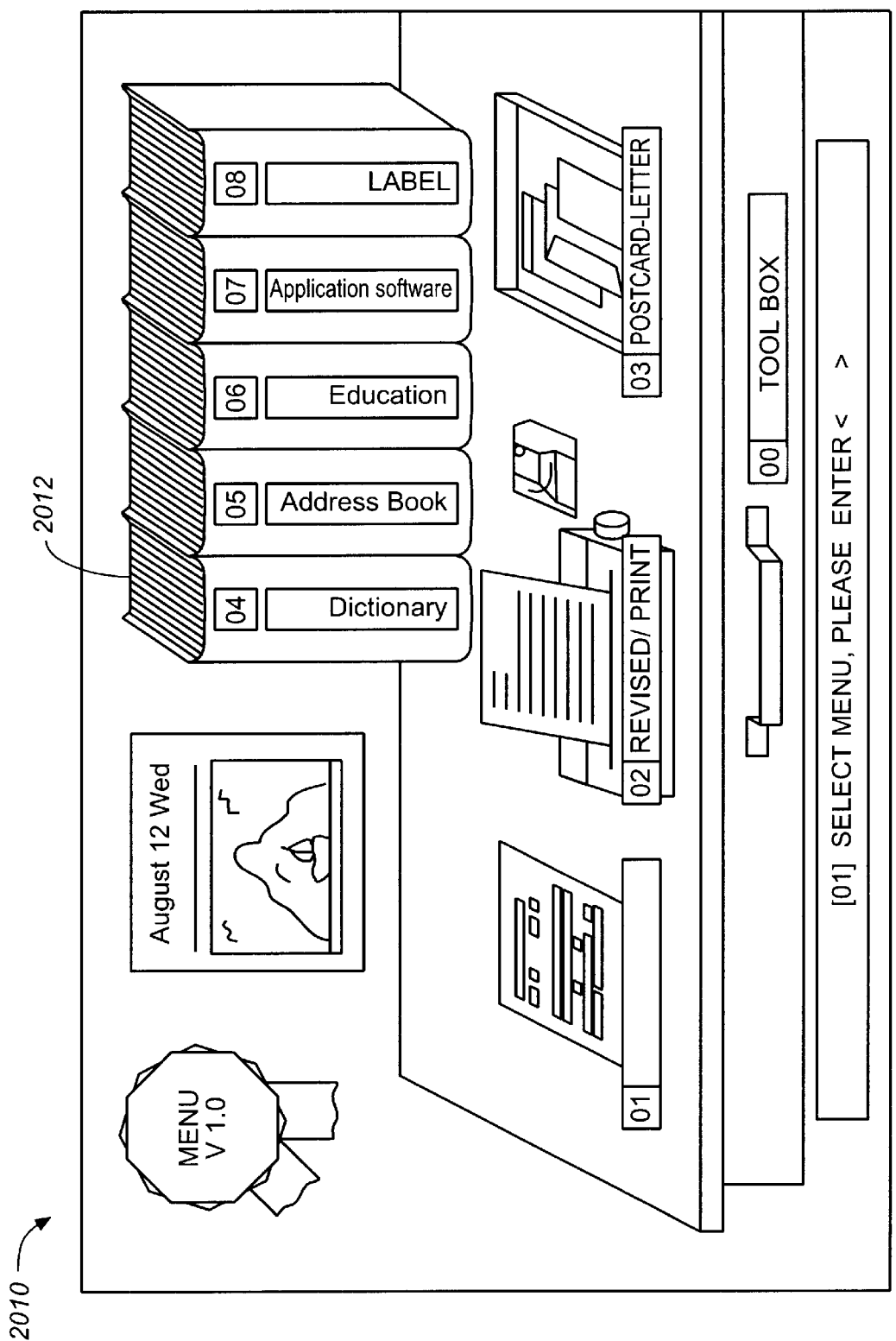
FIG._58
(PRIOR ART)

DISPLAY APPARATUS, PORTABLE INFORMATION PROCESSING APPARATUS, INFORMATION RECORDING MEDIUM, AND ELECTRONIC APPARATUS

BACKGROUND OF THE INVENTION

1. Field of the Invention

The present invention relates to a display apparatus, a portable information processing apparatus, and an electronic apparatus comprising the above apparatuses.

2. Description of the Related Art

Recently in the field of portable apparatuses, as a small-sized information processing apparatus, a display apparatus which is called a PDA (personal digital assistant) is known. In an information processing apparatus such as a PDA, a PC (personal computer), and an electronic pocket-notebook, a word processor, and a schedule manager are included to manage schedules for individual users.

In most of such applications called a scheduler, the schedule is managed on a daily, weekly, or monthly basis, in which, for example, a standard calendar display format covering a period of four to six weeks is adopted.

As shown in FIG. 57, for example, a plurality of date display areas 2001 indicating dates is formed on a menu screen 2000 which displays a calendar such as that described above, and operations such as combine-displaying of a line 2002 on the area 2001 and color-displaying are performed to recognize a position of a schedule/non-schedule item and the like so as to confirm the schedule. To see specific contents, the color-displayed area is selected and a window input with data items such as schedules is opened.

In a method such as that described above, however, since only a screen used to search a schedule and the like can be displayed, a defective problem arises that other hierarchical screens need to be opened to see different types of information.

In particular, although a type of calendar-mode menu screen can be displayed to see an information item such as a schedule, clicking needs to be repeated to shift display screens so as to see the hierarchical screen.

These operations to open another type of hierarchical screen are rough for the user when a desired type of information relates to other types of information. It is especially troublesome that the time-wise relationship between a type of information and other types of information cannot be grasped.

Furthermore, since respective menu screens for relative types of information are required to be selected, a plurality of hierarchical relationships among relative types of information need to be grasped.

Therefore, it takes much time for the user to grasp the plurality of relationships and perform the operation. Especially, when information items are related to various fields, functional usability is also troublesome in addition to the fact that much time is required for the operation to obtain desired information.

Incidentally, with a PDA, since a display screen is smaller than that of a standard PC, a problem arises that although an image is compressed or reduced at the same ratio as in the case of the PC, icons are displayed to be so much smaller that items thereby indicated are unclear to identify the relevant functions. Another problem arising in this connection is that a character is unclear to be identified when a font is displayed. As described above, since a character font is reduced to be smaller by changing the resolution as it is, the display image is identified with difficulty.

If the same amount of information as in the case of the PC, icons and fonts need to be displayed in a smaller size—which is an especially great problem to be resolved for products such as portable computers and electronic note-books. For example, for displaying the Japanese-language characters, fonts of at least 24×24 dots are easy to read, but these font sizes cannot be ensured because of restrictions with the display screens and "kanji" characters are not readable.

To resolve problems such as those described above, an arrangement is tried, in which a display screen is formed with a metaphor interface defined as a display state of icons and the like.

With a metaphor interface apparatus using a windows system to realize a desktop metaphor, image displaying can be easily understood by users having a knowledge regarding operations thereof, but it is difficult to understand for users having no preliminary knowledge about it. For example, with metaphor interface apparatuses in cases such as Japanese Unexamined Patent Publication No. 2-250113 and No. 4-2888641, a window represents an inter-application relationship when it is viewed from the application side, and a window mainly used to perform input operations and icons that represent supported functions, in-execution processing, and the like, are displayed on the same time axis.

With this type of apparatus, no specific meaning is given to the positional relationship on display screens. Therefore, for identification between the window and the icon, users need to memorize the difference between display areas and the meaning of items such as characters and graphics drawn inside them. In addition, users are confused by the performance that objects on different viewpoints are displayed on the same screen.

In other conventional apparatuses according to patent publications such as Japanese Unexamined Patent Publication No. 1-173139 and No. 4-168482, explanatory texts indicating detailed meaning of metaphor-environmental objects such as icons additionally displayed to reduce the burden of memorizing that users may have. With this type of apparatus, however, the icons having additional indications such as symbols and keywords are useful for a user who can understand the indications, but conversely increases the burden of memorizing and reduces operation efficiency for users who do not have sufficient preliminary knowledge because they need to memorize such additional indications. In addition, the visibility of indications such as characters is not good; therefore, such a method as above cannot be applied to PDAs.

As described above, the additional indications such as symbols and keywords provide increased burden to users who have not a sufficient preliminary knowledge because they need to memorize and understand such indications which are difficult to understand, leading to the problem of reduced operation efficiency.

A displaying method for icons as in the case of Japanese Unexamined Patent Publication No. 5-2817 other can also be considered for applicability. In this case, however, a displayed condition of icons is standard, in which for users to select their desired one of displayed icons, the only method possible is to find the position of a desired function by seeing a graphical design for function names indicated on the individual icons. In this type of arrangement, respective functions corresponding to icons that are arranged in a matrix pattern can be quickly identified by skilled users who remember a location of their desired icon. For novice users, however, much time is needed before they can understand the function itself, and the location of their desired icon cannot easily be found so that erroneous selection is frequently induced.

Normally, the size of the PDA display section is smaller, on which identification of execution function is difficult and in addition, individual icons are also smaller to cause the selection thereof to be difficult.

FIG. 58 shows an example of menu screen on which a background image and image that are given meaning and displayed. As shown in this FIG. 58, an icon 2012 is three-dimensionally displayed on a menu screen to assist the user to understand it. With this type of display shown as an example, a problem still remains with that assistance by means of character information is needed for the user to sufficiently understand the meaning of the icon information, and hence a display type such as the example cannot be applied to a PDA, of which display section is smaller, for the reason described above.

OBJECTS OF THE INVENTION

Therefore, it is an object of the present invention to overcome the aforementioned problems.

For resolution of problems as described above, an object of the present invention is to provide a display apparatus, a portable information processing apparatus, an information recording medium, and an electronic apparatus. With the provision of these apparatuses and medium, in operation of plural types of information as schedule information, inter-information relationships can be visually grasped, and functions can be easily understood because they are arranged to correspond to icons appearing on a menu screen with no character information. Therefore, the method can be applied to an apparatus of which the display screen is smaller.

SUMMARY OF THE INVENTION

To these ends, according to a first aspect of the present invention, there is provided a display apparatus comprising displaying means to combine a time axis with a background screen to be three-dimensionally displayed and to display the combined screen on a display screen, a width of the time axis changing to be wider as it approaches a past time and changing to be narrower as it approaches to the future, storing means to store background screen data used to display the background screen and time-axis display data used to display the time axis, and controlling means to display-control so as to combine the time axis with the background screen in accordance with the background screen data and the time-axis display data.

According to this aspect of the present invention, the time axis is given perspective, in which an object in the future can be displayed to look further and an object in the past can be displayed to look closer. Therefore the user can visually grasp old-and-new information at one look through the time axis.

In the operation of plural types of information to the time axis, inter-information relationships (time comparison) can be visually grasped from positional relationships of the plural types of information on the basis the time axis time.

Furthermore, a metaphor is realized such as that the user can easily grasp the meaning so as to avoid the use of characters or the like; therefore, the present invention can be applied to an apparatus such as a PDA of the which display screen is smaller.

According to a second aspect of the present invention, there is provided a display apparatus described as in the first aspect of the present invention, comprising clock means to allow the controlling means to display the time axis with changing time in accordance with the current time measured by the clock means.

According to this aspect of the present invention, the time axis is updated so that a new time axis can always be updated.

According to a third aspect of the present invention, there is provided a display apparatus described as in the first aspect of the present invention, in which the storing means comprising plural types of information of which attributes are different from each other, plural types of attribute information used to be used for identification of types of the plural types of information, plural items of time information related to the plural types of information, and icon information which corresponds to each of the plural types of information and is at least arranged along with the time axis and displayed three-dimensionally; and the controlling means performs selection of the icon information corresponding to the attribute of each of the plural types of information in accordance with the attribute information, and performs control in accordance with the time information related to the plural types of information so that the selected icon information is arrayed to each corresponding time of the time axis.

According to this aspect of the present invention, the three-dimensionally displayed icon information is displayed to provide the icon information with perspective so that old-and-new of the icon information can be visually grasped through the perspective view. Furthermore, since this icon information has an attribute corresponding to each of the plural types of information, the icon-information function can also be recognized.

According to a fourth aspect of the present invention, there is provided a display apparatus described as in the third aspect of the present invention, in which the controlling means performs display-control so that a time width of the time axis becomes wider as time approaches the current time.

According to this aspect of the present invention, the time-axis width, which is the width in the direction perpendicular to the past-future direction width (time-axis width), is also formed to become wider as time approaches the current time so as to provide the perspective presentation.

According to a fifth aspect of the present invention, there is provided a display apparatus described as in the third aspect of the present invention, in which the controlling means performs display-control by changing the size of the icon information so that it is wider at a past time and it becomes narrower as it approaches future time.

According to this aspect of the present invention, the icon information is also given the perspective so that old-and-new of the icon information can be visually grasped through the perspective view.

According to a sixth aspect of the present invention, there is provided a display apparatus described as in the third aspect of the present invention, comprising operating means to perform operation-inputting of information of the time axis and the icon information that are displayed on the display screen, and in which the controlling means performs display-control so that a bird's-eye-view-like screen is displayed on which the time width on the time axis is reduce-displayed along with the direction of the time axis and the size of the icon information is reduced linking with the reduce-displaying in accordance with an operation-input from the operation-inputting means.

According to this aspect of the present invention, as the time axis is reduced, the length of the time axis displayable in the display screen becomes larger, so that the time axis is displayed in an image viewed from an upper portion as a bird's-eye-view. Therefore, a tightness degree of the icon information corresponding to each time of the time axis can be visually grasped and the amount of the plural types of information at each time can be grasped.

According to a seventh aspect of the present invention, there is provided a display apparatus described as in the third aspect of the present invention, comprising operating means to perform operation-inputting of information of the time axis and the icon information that are displayed on the display screen, and in which the controlling means performs display-control so that the time width of the time axis is enlarge-displayed along the direction of the time axis and the size of the icon information is reduced linking with the enlarge-displaying in accordance with an operation-input from the operation-inputting means.

According to this aspect of the present invention, in a case such as that described above, the size of the icon information is variable linking with the enlarge-displaying of the time width of the time; in which when the reduce-displaying is performed, general tightness of the icon information can be recognized. However, according to this aspect of the present invention described as in the seventh aspect, the tightness degree of the icon information in a local time region can be recognized. By this, for the user to visually recognize the icon-information tightness, the recognition can be carried out with no misunderstanding for the visual tightness image, regardless of the time-axis enlargement ratio.

According to an eighth aspect of the present invention, there is provided a display apparatus described as in the third aspect of the present invention, comprising operating means to perform operation-inputting of information of the time axis and the icon information that are displayed on the display screen, in which the plural types of information comprises input information to be operation-input and information regarding time of inputting the input information, and controlling means displays the icon information in accordance with the input-time information.

According to this aspect of the present invention, the icon information is displayed in a sequence of input-time information to allow the user to visibly recognize old-and-new of the input time at one look.

According to a ninth aspect of the present invention, there is provided a display apparatus described as in the eighth aspect of the present invention, in which the input information comprises user-specified specification-time information, and the controlling means displays the icon information on the display screen.

According to this aspect of the present invention, the icon information is displayed in a sequence of the specification-time information to allow the user to visibly recognize old-and-new of the specified time at one look.

According to a tenth aspect of the present invention, there is provided a display apparatus described as in the eighth aspect of the present invention, in which the controlling means performs display-control to form the icon information within a width-wise region of the time axis so that it is represented to be wider at past time and is represented to become narrower as it approaches future time.

For three-dimensional displaying as described above, the time axis in a predetermined length uses a large exclusive space of itself for the space of the display screen. According to the aforementioned aspect of the present invention, the time axis has the icon information in its width region to allow effective use of the display-screen space and displaying of increased attributes of the icon information. The icon information displayed in this case can either be of a two or three dimension.

According to an eleventh aspect of the present invention, there is provided a display apparatus described as in the third aspect of the present invention, in which the plural types of information comprise file-size information regarding file sizes, and the controlling means performs display-control in accordance with the file-size information so that a length of the icon information changes in the direction perpendicular to the time axis.

According to this aspect of the present invention, the file sizes (information amount) of the plural types of information corresponding to the icon information can be visibly recognized by the user at one look.

According to a twelfth aspect of the present invention, there is provided a display apparatus described as in the third aspect of the present invention, in which the icon information comprises plural items of first icon information which are formed of characters different from each other depending upon the attribute of the plural types of information, and the control means selectively displays one shape of an icon of the plural items of the first icon information.

According to this aspect of the present invention, the identification of the plural types of information can be presented in the shape or the attribute.

According to a thirteenth aspect of the present invention, there is provided a display apparatus described as in the twelfth aspect of the present invention, in which the plural items of first icon information are formed of characters different in shape.

According to this aspect of the present invention, the user can visually and easily recognize the icon information of the functions which have meanings different from each other depending upon the display data.

According to a fourteenth aspect of the present invention, there is provided a display apparatus described as in the twelfth aspect of the present invention, in which the plural items of first icon information are formed of characters different in color.

According to this aspect of the present invention, the first icon information and the second icon information are distinguished by color to allow the user to recognize these types of information at one look.

According to a fifteenth aspect of the present invention, there is provided a display apparatus described as in the twelfth aspect of the present invention, in which the plural items of first icon information are formed of characters different in size.

According to this aspect of the present invention, the user can visually and easily recognize the icon information of the functions that have meanings different from each other depending upon the display data.

According to a sixteenth aspect of the present invention, there is provided a display apparatus described as in the eighth aspect of the present invention, in which the input information comprises first schedule information, second schedule information having contents different from those of the first schedule information, and identification information to identify the first schedule information and the second schedule information; and the controlling means displays the icon information on the display screen in accordance with the identification information.

According to this aspect of the present invention, in accordance with the first and second icon information, the schedule contents can be identified with the types of buildings. Displaying the information using the characters is limited for identification. The identification is possible when the information is displayed in the image form such as an icon for the meaning thereof.

According to a seventeenth aspect of the present invention, there is provided a display apparatus described as in the eighth aspect of the present invention, in which the icon information comprises icon-switching information to perform switching between two-dimensional display and three-dimensional display, and controlling means perform display-switching between the two-dimensional display and the three-dimensional display in accordance with the operation-input to the icon-switching information from the operating means.

According to this aspect of the present invention, the icon-switching information can be used to display the information contents by switching the three-dimensional display to the two-dimensional display. This allows identification of the type of information being displayed in the three-dimensional menu screen and two-dimensional screen. That is, when the user moves in a specific direction through an operation of the operation section with a three-dimensionally displayed screen, a two-dimensionally displayed screen positioned in a specific direction is picked up to allow the recognition of the difference from the menu screen.

According to an eighteenth aspect of the present invention, there is provided a display apparatus described as in the seventeenth aspect of the present invention, in which the icon information displays scrolling scroll-icon information used to perform scrolling along the time axis and the controlling means performs control so that the display screen is scrolled in accordance with an operation-input to the scrolling icon information from the operating means.

According to this aspect of the present invention, in accordance with the scroll-icon information, the scroll operation is carried out to allow displaying information contents to move forward to the future or backward to the past.

According to a nineteenth aspect of the present invention, there is provided a display apparatus described as in the eighth aspect of the present invention, in which the icon information comprises database icon information formed in a past region on the time axis and used to display contents of the database regarding the plural types of information, and the controlling means performs display-control of contents of the database in accordance with an operation-input to the database icon information from the operating means.

According to this aspect of the present invention, information used to search data in the database can be displayed on the menu screen, in which a complicated hierarchical structure as can be experienced with a conventional menu screen is not used to allow a quick search; by which complicated operation steps can be avoided to reduce the burden that is necessary to the user.

According to a twentieth aspect of the present invention, there is provided a display apparatus described as in the eighth aspect of the present invention, in which the icon information comprises a read-E-mail icon formed in a future region on the time axis and used to read-display contents of contents of the E-mail, and the controlling means performs display-control of contents of the E-mail in accordance with an operation-input to the read-E-mail icon information from the operating means.

According to this aspect of the present invention, since the E-mail information to be sent relates to the future, the read-E-mail icon information is displayed in the future region on the time axis. In this arrangement, the user does not need to study meanings of the icon information in advance, but the user can recognize the E-mail icon information at one look in accordance with the positional relationship between the time axis and the icon information.

According to a twenty-first aspect of the present invention, there is provided a display apparatus described as in the twentieth aspect of the present invention, in which the controlling means performs control so that items of the read-E-mail icon information are sort-displayed for each of mail to be sent, received, opened, and unopened.

According to this aspect of the present invention, information is displayed to allow the status of individual E-mails to be visually and easily recognized by the user.

According to a twenty-second aspect of the present invention, there is provided a display apparatus described as in the twenty-first aspect of the present invention, in which the controlling means performs control-display so that the amount of E-mail information is displayed for each of mail to be sent, received, opened, and unopened.

According to this aspect of the present invention, numerical values are displayed to allow the number and the status of individual E-mails to be visually and easily recognized by the user.

According to a twenty-third aspect of the present invention, there is provided a display apparatus described as in the nineteenth aspect of the present invention, in which the operating means comprises a pen-input operation member to operate the icon information, and the controlling means performs character-recognition and display-control in accordance with an input from the pen-input operation member.

According to this aspect of the present invention, when information is to be input, after the pen-input section is used and then the operation-input is carried out, the user can perform a storing operation for desired information anytime.

According to a twenty-fourth aspect of the present invention, there is provided a display apparatus described as in the twenty-third aspect of the present invention, in which the operating section comprises a key-input section formed of a plurality of concaved parts.

According to this aspect of the present invention, when information is to be input, the key-input section having a plurality of concaved parts is pressed at the pen-input operation section to perform the operation inputting of write-in data.

According to a twenty-fifth aspect of the present invention, there is provided an information recording medium that stores at least information used to generate a display screen, comprising background screen data to display a three-dimensional background screen, time-axis display data used to display a time axis that changes in shape so that it is wider at a past time and it becomes narrower as it approaches a future time on the background screen, and information used to perform display-control in accordance with the background screen data and the time-axis display data so that the time axis is combined with the background screen.

According to this aspect of the present invention, when the information recording medium -used to form the aforementioned display screen is to be formed, information such as that described above may be arranged to be included. In the arrangement in which the information recording medium is formed, installation and the like can be carried out through the information recording medium not only in the portable information processing apparatus but also in a standard type of personal computer to form a display screen.

According to a twenty-sixth aspect of the present invention, there is provided a display apparatus described as in the twenty-fifth aspect of the present invention, comprising plural items of attribute information used to identify plural types of information having a different attribute from each other, icon information three-dimensionally displayed corresponding to each of the plural types of information and which is arrayed at least along with the time axis, and information used to perform control so that the icon information corresponding to each attribute of the plural types of information is selected in accordance with the attribute information and each item of the icon information selected therein is arrayed to a corresponding time on the time axis in accordance with the time information regarding the plural types of information.

According to this aspect of the present invention, in addition to the time axis that is three-dimensionally displayed, the information recording medium such as that allows the icon information corresponding to the time axis to also be displayed three-dimensionally.

According to a twenty-seventh aspect of the present invention, there is provided a portable information processing apparatus comprising a display apparatus described as in an), one of the first to the twenty-fourth aspects of the present invention.

According to this aspect of the present invention, since the portable information processing apparatus is normally formed smaller and lighter, the size of the displaying means thereof is in most cases smaller than a standard personal computer. Therefore, the display form as described above is applied to the portable information processing apparatus to display the icon information representing plural types of information such as E-mails, schedules, memos, voice memos, and voice mails, by which the user can know the positional relationship of these items of information and can recognize them at one look. In addition, since displaying can be performed on the displaying means in attributes separated from each other with only the icon-information display form, troubles such as those resulting from a complicated hierarchical structure as a conventional application-software combination are eliminated. This allows not only skilled users but an undefined type and number of users to carry out the operation simply, and hence a portable information processing apparatus that is easy to use for the users can be formed.

According to a twenty-eighth aspect of the present invention, there is provided a portable information processing apparatus described as in the twenty-seventh aspect, which is connected to the display apparatus and comprises a wrist-wearing section to be put on the wrist of the user.

According to this aspect of the present invention, the wrist-wearing section is formed to allow the apparatus to be applied to very small information apparatuses.

According to a twenty-ninth aspect of the present invention, there is provided an electronic apparatus comprising an information recording medium described as in either one of the twenty-fifth and the twenty-sixth aspects.

According to this aspect of the present invention, the aforementioned display screen can be formed by use of a standard type of electronic apparatus.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIG. 1 is a schematic drawing showing an example of a display apparatus of an embodiment in accordance with the present invention;

FIGS. 2A and 2B are schematic drawings each showing an image example to be displayed on the display section of the display apparatus in FIG. 1;

FIG. 3 is a schematic diagram showing hardware configurations of a portable information processing apparatus as in FIG. 1 and a personal computer (PC);

FIG. 4 is a functional schematic diagram showing a software configuration of the portable information processing apparatus in accordance with the present invention;

FIGS. 5, 5A and 5B form a detailed functional schematic diagram of the functional schematic diagram in FIG. 4;

FIG. 6 is a schematic diagram showing upper-level menus and lower-level menus that are to be displayed step by step on the display section according to a controller system of the display apparatus in FIG. 1.

FIGS. 7A and 7B are schematic drawings each showing an image example to be displayed on the display section of the display apparatus in FIG. 1;

FIGS. 8A to 8F are schematic drawings each showing an image example to be displayed on the display section of the display apparatus in FIG. 1;

FIGS. 9A to 9F are schematic drawings each showing an image example to be displayed on the display section of the display apparatus in FIG. 1;

FIGS. 10A to 10F are schematic drawings each showing an image example to be displayed on the display section of the display apparatus in FIG. 1;

FIGS. 11A to 11F are schematic drawings each showing an image example to be displayed on the display section of the display apparatus in FIG. 1;

FIG. 12 is a functional schematic diagram showing a software configuration of the portable information processing apparatus in accordance with the present invention;

FIG. 13 is a schematic diagram showing a hierarchy of information to be stored in a storage section of the portable information processing apparatus in accordance with the present invention;

FIG. 14 is a schematic diagram showing a magnetic signal of data to be exchanged between a communication section and other internal apparatuses or the like;

FIG. 15A is an explanatory drawing showing an example of a table that defines the relationship between character data and function programs relating the character data, the character data being stored in a storage section of the portable information processing apparatus;

FIG. 15B is an explanatory drawing showing an example of a table that indicates character data, arrangement positions on screens, and menu formats in accordance with individual modes; the character data being stored in the: storage section of the portable information processing apparatus;

FIG. 16A is an explanatory drawing showing an example of background-screen character data to be stored in the storage section of the portable information processing apparatus;

FIG. 16B is an explanatory drawing showing an example of icon character data to be stored in the storage section of the portable information processing apparatus;

FIG. 17 is a flowchart showing a control procedure to be executed by the controller system;

FIG. 18 is a flowchart showing a detailed A-processing procedure in the flowchart shown in FIG. 17;

FIG. 19A is a flowchart showing a detailed procedure of a step 3 in the flowchart shown in FIG. 17;

FIG. 19B is a flowchart showing a detailed procedure of the step 3 in the flowchart shown in FIG. 17;

FIG. 20A is a flowchart showing detailed procedures of steps 32 and 42 in the flowcharts shown in FIGS. 19A and 19B;

FIG. 20B is a flowchart showing an example of the procedures to execute the steps 32 and 42 in the flowcharts shown in FIGS. 19A and 19B;

FIG. 20C is a flowchart showing an example of the procedures to execute the steps 32 and 42 in the flowcharts shown in FIGS. 19A and 19B;

FIG. 21A is a schematic drawing showing an example of a display screen of a display apparatus of another embodiment in accordance with the present invention;

FIGS. 21B and 21C are schematic drawings each showing an example of the screens to be displayed on the display section of the display apparatus in FIG. 21A;

FIGS. 22A through 22D are schematic drawings each showing an example of the screens to be displayed on the display section of the display apparatus in FIG. 21A;

FIGS. 23A through 23C are schematic drawings each showing an example of the screens to be displayed on the display section of the display apparatus in FIG. 21A;

FIGS. 24A through 24C are schematic drawings each showing an example of the screens to be displayed on the display section of the display apparatus in FIG. 21A;

FIG. 25 is a schematic drawing showing an example of a display screen of a display apparatus of an embodiment in accordance with the present invention;

FIG. 26 is a schematic drawing showing a lower-level menu screen (window) to be displayed when an icon of the display screen in FIG. 25 is clicked;

FIG. 27 is a schematic drawing showing a lower-level menu screen (window) to be displayed when the icon of the display screen in FIG. 25 is clicked;

FIG. 28 is a perspective view showing an example of the portable information processing apparatus and a related PC when the portable information processing apparatus in accordance with the present invention and the PC configure a network;

FIG. 29 is a plan view showing the portable information processing apparatus in accordance with the present invention;

FIG. 30 is a schematic diagram showing a main screen to be displayed in the display section of the portable information processing apparatus in FIG. 29;

FIGS. 31A to 31F are schematic drawings each showing examples of lower-level menu screens each to be displayed as a lower-level menu of the main screen in FIG. 30;

FIGS. 32A to 32E are schematic drawings each showing an example of a screen to be displayed in the display section of the portable information processing apparatus in FIG. 29;

FIG. 33 is an outline explanatory drawing showing upper-level menus, lower-level menus, and definition display screens to be displayed step by step according to the controller system of the display apparatus of the embodiments;

FIG. 34 is a flowchart showing an operation procedure to be executed by an operation system;

FIG. 35A is a schematic drawing showing an example of a display screen of a display apparatus of another embodiment in accordance with the present invention;

FIG. 35B is a schematic drawing showing a main screen of the display apparatus in FIG. 35A;

FIG. 36 is an outline explanatory drawing showing upper-level menus, lower-level menus, and definition display screens to be displayed step by step according to the controller system of the display apparatus in FIGS. 35A and 35B;

FIGS. 37A to 37C are schematic drawings each showing a screen to be displayed in the display section of the display apparatus in FIGS. 35A and 35B;

FIGS. 38A and 38B are schematic drawings each showing a screen to be displayed in the display section of the display apparatus in FIGS. 35A and 35B;

FIGS. 39A to 39C are schematic drawings each showing a screen to be displayed in the display section of the display apparatus in FIGS. 35A and 35B;:

FIGS. 40A to 40C are schematic drawings each showing a screen to be displayed in the display section of the display apparatus in FIGS. 35A and 35B;

FIGS. 41A to 41C are schematic drawings each showing a screen to be displayed in the display section of the display apparatus in FIGS. 35A and 35B;

FIGS. 42A to 42C are schematic drawings each showing a screen to be displayed in the display section of the display apparatus in FIGS. 35A and 35B;

FIGS. 43 is a schematic drawing showing a screen to be displayed in the display section of the display apparatus in FIGS. 35A and 35B;

FIG. 44A is a flowchart showing an operation procedure to be executed by an operation section of the display apparatus in FIGS. 35A and 35B;

FIG. 44B is a flowchart showing a detailed procedure of a step 101 in the flowchart shown in FIG. 44A;

FIG. 44C is a flowchart showing a detailed procedure of a step 104 in the flowchart shown in FIG. 44A;

FIG. 45A is a schematic drawing showing an example of a display screen of a display apparatus of another embodiment in accordance with the present invention;

FIG. 45B is a schematic drawing showing an example of a main screen to be displayed on a display section of the display apparatus in FIG. 45A;

FIG. 46 is an outline explanatory drawing showing upper-level menus, lower-level menus, and definition display screens to be displayed step by step according to a controller system of the display apparatus in FIGS. 45A and 45B;

FIGS. 47 is a schematic drawing showing a screen to be displayed in the display section of the display apparatus in FIGS. 45A and 45B;

FIGS. 48A to 48D are schematic drawings each showing a screen to be displayed in the display section of the display apparatus in FIGS. 45A and 45B;

FIGS. 49A to 49D are schematic drawings each showing a screen to be displayed in the display section of the display apparatus in FIGS. 45A and 45B;

FIGS. 50 is a schematic drawing showing a screen to be displayed in the display section of the display apparatus in FIGS. 45A and 45B;

FIGS. 51A and 51B are schematic drawings each showing a screen example to be displayed in the display section of the display apparatus in FIGS. 45A and 45B;

FIGS. 52A to 52C are schematic drawings each showing a screen example to be displayed in the display section of the display-apparatus in FIGS. 45A and 45B;

FIGS. 53A and 53B are schematic drawings each showing a screen example to be displayed in the display section of the display apparatus in FIGS. 45A and 45B;

FIGS. 54A through 54C are schematic drawings each showing a screen example to be displayed in the display section of the display apparatus in FIGS. 45A and 45B;

FIG. 55A is a flowchart showing an operation procedure to be executed by an operation section of the display apparatus in FIGS. 45A and 45B;

FIG. 55B is a flowchart showing a detailed procedure of a step 131 in the flowchart shown in FIG. 55A;

FIG. 55C is a flowchart showing a detailed procedure of a step 134 in the flowchart shown in FIG. 55A;

FIGS. 56A to 56C are schematic drawings each showing an example in which the portable information processing apparatus in accordance with the present invention and a related PC configure a network;

FIG. 57 is a schematic view showing a screen example of a calendar display screen arrangement; and FIG. 58 is a schematic view showing a screen example of a menu screen arrangement of a conventional display apparatus.

DESCRIPTION OF THE PREFERRED EMBODIMENTS

Hereinbelow, preferred embodiments of the display apparatus according to the present invention will be described in detail with reference to the accompanying drawings.

Embodiment 1
(General Configuration of System)

FIG. 3 shows a preferred embodiment of a system according to the present invention. As a first information processing apparatus, the system of this embodiment comprises a wrist-type portable apparatus 1 which is a PDA comprised of a single or a plurality of user terminals; and as a second information processing apparatus, it also comprises a personal computer (hereinafter referred to as a PC) 180. A network is configured in which the PC 180 and the portable apparatus 1 communicate with each other. The PC 180 is assumed to be installed in a place such as a user's residence or company office, and the portable apparatus 1 is assumed to be used by the user by wearing it on the wrist.

As widely known, the PC 180 is comprised of a high-performance computer which, as shown in FIG. 3, constitutes a clock section 181 to measure the time, a storage section 182 to store various types of data, a display section 183 to display the data, an operation section 184 to operate the various types of data to be displayed on the display section 183, a communicating means 185 to exchange information with other information processing apparatuses such as a portable apparatus 2, sound-output section 186 to output sound information, a sound-input section 187 to input the sound information, and a CPU 188 to control the aforementioned sections.

The storage section 182 contains data and software products such as to be dedicated to running the PC 180 itself, various kinds of programs such as application software which is dedicated to creating screens characterized by the present invention, a web browser to perform downloading to the portable apparatus 2, and other data such as protocols. It is preferable that the aforementioned software to create the screens characterized by the present invention be arranged independently of the main body of the PC 180, in the form of a PC card or the like.

(Data Synchronization)

The portable apparatus 1 is to be independently used, but, as shown in FIG. 3, it is configured so that it can also be used as a system synchronized with the PC 180.

There are some ways which can be considered to carry out this data synchronization. For example, a comparison is performed for displays of data to be stored in the portable apparatus 1 and the PC 180 to establish a data-updating means (not shown) which provides a command to update and synchronize the data. In this case, it is preferable that the data-updating means be established individually in the communicating means 185 of the PC 180 and a communicating means 25 of the portable apparatus 2, as shown in FIG. 3.

Another way to synchronize the data is that when the portable apparatus 1 is powered on to boot its system, in response to a request from the portable apparatus 1, data stored in the storage section 182 of the PC 180 is arranged to be downloaded to a storage section 22. Then, the data in the storage section 182 of the PC 180 is updated when necessary. Thereafter, booting the portable apparatus 1 resets the data so as to be in the same state as that updated.

In this way, when a basic data-input operation and a data-update operation are performed with either one of the portable apparatus 1 and the PC 180 is apparatus and PC are automatically updated. With this embodiment, the data synchronization can be performed transparently to the user even when the PC 180 and portable apparatus 1 are spaced by a long distance.

Furthermore, when contents of a display section 13 of the portable apparatus 2 are to be edited by using the display section 183 of the PC 180, an image of the portable apparatus 1 appears on part of a screen of the display section 183 of the PC 180 (FIG. 21A). Therefore, cutting out information from a screen of the PC 180 and pasting in a relevant window allows a desired image to be retrieved. This will be described in detail in the section of a second embodiment. Especially, it is notable that the display can be seen and effectively used even when a PC card is installed into the PC 180.

In the system of this embodiment, the size of the display section 183 of the PC 180 is a large, while a display section 13 of the portable apparatus 1 is formed to be small. In this case, only a simple synchronization does not provide anything better in the portable apparatus 1 than just to display a compressed image of the PC 180. Then, the system of this embodiment incorporates improvements described below to provide a configuration in which both the display images of the display section 183 and the display section 13 are the same image so that the user can naturally see that the two apparatuses are identical.

In the portable apparatus 1, a unique character pattern, which is different from a character pattern formed in the PC 180, is formed, is formed, by which, despite the same image, icons in the portable apparatus 1 are displayed clearer so that the user can quickly recognize and read them. Furthermore, background images and character images are arranged to be identical; therefore, the user interfaces are visually easy to understand for a novice user.

(Hardware Configuration of the Portable Apparatus)

FIG. 1 is an outside view schematically showing the portable apparatus 1. The portable apparatus 1 of this embodiment is composed to be small and light, comprising, foe example, a display section 13 comprised of a member such as an LCD display array, and an operation section 14 which is formed in the lower portion and the side portion of the display section 13 and carries out operations of display screens.

The portable apparatus 1 of this embodiment is comprised of a card type portable apparatus that allows a so-called pen input, that is a handwritten input. Therefore, a hardware configuration of this embodiment comprises, in addition to those in the configuration in FIG. 3, a pen-input operation member 14A (FIG. 2B). The configuration also comprises in a recognizing means in a CPU 18 to recognize items such as pen-input characters and graphics based on the recognition results of which various relevant processes are carried out. A storage section 12 comprises, in addition to the RAM and ROM, a nonvolatile memory card, a PCMCIA card, and a dedicated ID card of this portable device which are attachable to and removable from the portable apparatus 1.

As shown in FIG. 3, the portable apparatus 1 also comprises the CPU 18 to carry out the managerial control of a portable apparatus 2, of which a bus line is connected to an operation section 14 and a display section 13. Incidentally, functions of a display controller section which are shown in FIGS. 4 and 5 are achieved by means of a display driver of a CPU. 18 and a display interface (not shown) in the display section 13.

The bus line of the CPU 18 is connected to a storage, section 12 which comprises members, as shown FIG. 13, such as a controller section 22A to store management programs, and a real data section 22B to store various types of real data. The data in the real data section 22B, which will be described later in detail, is preferably stored in a medium such as a ROM or a RAM. The ROM in this case comprises a data memory to store icon character data, menu-screen background character (background image) data, font data, and layout-position data defining positions of individual icons on the background image. The ROM in this case also comprises a program memory to store various programs including a program to display menus of this embodiment, a function program defining various functions of the apparatus of this embodiment, a boot program which drives the CPU 18 to boot the apparatus system when the apparatus 2 is switched on, and various other programs including a display program predefined in a first to a fourth display definition sections. The boot program is structured such that when the portable apparatus 1 is switched on, the program accesses the storage section 182 of the PC 180 to read data of a web browser, various communication protocols, and others to download the retrieved data to the RAM.

The RAM stores information entered through various definition screens. Therefore, individual functions of the first to the fourth definition sections are achieved by means of display definition functions and the storage section 12 of the CPU 18 and memory interface functions (not shown) arranged in the storage section 12.

The bus line of the CPU 18 is further connected to sections such as a clock section 11, a sound-input section 17, and a sound-output section 16 comprising a microphone and the like.

As shown in the block diagram of FIG. 3, the bus line of the CPU 18 is also connected to a communicating means 15 to communicate with the PC 180. This communicating means 15 comprises an infrared data communication section (IRDA) 15D to perform the infrared data communication, a radio communication section 15C to perform the radio communication, a modem 15B that is connected to the foregoing members to work as a modem, a telephone 15E, and a communication section 15A which includes the telephone 15E as a serial interface and is connected to the modem 15B. This communication section 15A is connected to the CPU 18. Further, infrared data communication section (IRDA) 15D comprises infrared transmission section (port). The modem 15B is formed as a software modem through which the CPU 18 receives a serial bit string. The modem 15B comprises an infrared interface and processing with the modem 15B and the communication section 15A is carried out by the CPU 18. Therefore, the portable apparatus 1 enables the infrared data communication and electronic-mail (hereinafter referred to as "E-mail") communication.

The CPU 18 is connected to a notifying means 19B to perform information notification to the user. As this notifying means 19B, means which can be considered include a vibrating means to stimulate the user, a smell-providing means to provide smells step by step, a tone-altering means to provide altered alarm tones step by step, a light-emitting means to provide lights adjustable step by step, and an electric discharging means to provide the user with electrical shocks adjustable step by step. Further, the CPU 18 is connected to a battery-capacity checking means 19A to check the capacity of a battery, which is a power-supplying means.

A checking means (not shown) can also be connected to the CPU 18 to measure a position angle of a display section on the basis of the horizontal plane. In this case, the CPU is arranged to work as a position-switching controller section to use the measured position angles so as to turn a power-switch on when the angle is within a predetermined range and to turn the power-switch off when the angle is out of the predetermined range. According to this arrangement, the power for the display apparatus can be turned on or off by changing the position angle of the apparatus, and when the user does not see the display screen the power can be turned off to avoid wasteful display operations—which leads to the achievement to reduce the power consumption.

For reference, the display section 13 comprises an active-matrix liquid crystal display panel having an image display function and an electrostatic induction tablet function and a coordinate detector circuit to detect a point coordinate of a pen-input operation section which has received a signal from the pen-input operation member 14A (FIG. 2B) on the display screen.

The pen-input operation member 14A is connected to a line electrode and a column electrode on the display panel through a floating capacitor to have a high-input-impedance region-detector electrode on its point and an induction voltage is induced on the detector electrode in response to a scanning pulse applied to the line electrode or a scanning pulse applied to the column electrode. The coordinate detector circuit detects a point coordinate by detecting generation timing of the induction voltage generated on the detector electrode of the pen-input operation member 14A in accordance with a coordinate-detecting timing signal from a controller circuit.

Furthermore, in this embodiment an instruction-determining means to determine contents of one processing menu of the menus displayed on the display section, which is specified by the pen-input operation section 14A, and a function to carry out processing according to the determination. It also comprises the recognizing means to recognize items such as pen-input characters and graphics, and based on the recognition results, performance of various relevant processes and switching of these processes is enabled to be performed.

For reference, when the pen-input operation section is not cable-connected to the portable apparatus, the following arrangement is preferable. The pen-input operation section is arranged to comprise an information collector section, a code-information creator section, a temporary storage section, and a signal-generation-code information sender section so that a single pen-shaped coordinate instructor apparatus to allow handwritten and barcode input operations. Further, the display section is arranged to comprise a sense-matrix section, a position detector section (instruction-coordinate sense section), a code-information retriever section, and a position-detection processor section.

For the above arrangement, the portable apparatus 1 of this embodiment comprises the pen-input operation member 14A as the operation section 14, and scale-switching buttons 14B-1, 14C-1, and 14D-1.

(Display Screens of the Portable Apparatus)

FIG. 1 shows a layout of a main-screen (menu screen) arrangement. As shown in the figure, the display section 13 comprises, in an upper portion thereof, a date display area 20 to display a current time and a current date, an E-mail display area 30, a schedule display area 40, and a database display area 50.

The date display area 20 displays a date as an "AM10:05 59 Thursday October 12" 21. The E-mail display area 30 is positioned in a remote direction on the time axis and displays a sender mailbox icon 31 with the number of mail messages, an outgoing mailbox icon 32 with the number of mail messages, a received mailbox icon 33 with the number of mail messages, and an opened mailbox icon 34 with the number of mail messages.

The schedule display area 40 displays, on the basis of a time-axis display area 43 which is given perspective along with a landscape metaphor, a schedule in the form of buildings 46 and 47 in the right-side area and TO-DO listing in the form of billboards 48 in the left-side area.

The time-axis display area 43 displays time intervals in a form that changes as it goes beyond, in which a front-forward side indicates the present while a back-rearward side indicates the future. The time axis is thus arranged in the form of a road as viewed from an upper point, and a GUI is set in images of objects arranged such as to surround the road. In this embodiment, for example, the road represents the time axis, the buildings represent the schedule, the billboards represents TO-DO, and a manhole represents a memorandum. Furthermore, along with a time-axis display area 733 is formed a schedule/non-schedule-indicating background display area 734 of which a region indicating a schedule is color-displayed and is formed a background-image color display area 734 of which a region indicating the past from a current time is color-displayed.

The time axis provides perspective view in which an object existing further looks smaller and as a current time approaches closer to an intended time, the object looks clearer and the contents therein can be identified.

The schedule is displayed in the right-side area of the road in the form of buildings, the TO-DO listing is displayed in the left-side area of the road, and direction shifter icons 54 and 55 each are arranged as view-field shifter buttons to shift the display to respective function modes each so as to indicate which direction the user sees.

The buildings 46 and 47 represent plural types of animated three-dimensional icons, each of which differs in shape and attribute. The type of the building represents the type of schedule, and each type is unique according to the type of schedule. In this embodiment, the building 46 represents an official schedule and an ordinary house represents a private schedule.

The signboard (billboard) icons 48 are affixed to a point (time) of the road and are displayed floating in space with a legged signboard icon 48A representing time-relevant data and a non-legged signboard icon 48B representing time-irrelevant data. A past region of the time axis 43 comprises a manhole icon 49 to allow memo-writing. The past region of the time axis 43 is shaded dark to facilitate identification.

Furthermore, the screen can be scrolled to be displayed like a bird's eye view in which a schedule-view scale size (one day/one week) with the perspective-viewable road is seen and an object existing further is compressed smaller. That is, a scrolling operation allows larger scale of the time axis and thumbnail-view-screen displaying to gradually raise the view point of the three-dimensional display, in which a bird's-eye-view display mode 160, which is a display screen in an image such as to be viewed from an upper view point as in the case of a bird's-eye view when it is compressed, as shown in FIG. 2A. In this case, a time-axis display area 162 is a date-based time axis and icons each in a schedule display area 164 are formed to be small. The length of the individual small icons in the direction which is orthogonal to the time axis represents tightness of the day's schedule.

For generation of such a display screen, individual characters are picked up and bitmaps are modified corresponding to times to change the type of building according to the information. When control does not to need to be performed so punctually, the road portion is modified with numerals.

Furthermore, in the bird's-eye view display, selected characters are preferably pasted along the time axis. TO-DO this, the positions of the individual icons are determined according to the information on the start time of the top schedule and the length and, and depending on the length, character types are selected from available character types.

In this case, the larger the number of character types to be pasted, the more difficult the relevant processing becomes. Therefore, the character types to be pasted are preferably limited. For example, a preferable forming method to form the three-dimensional character represented by the building icon is that only the right-end side portion and the left-end side portion are preserved as graphics and lines are drawn such as to connect the right-end side and the left-end side and only the dot-data shading is formed.

The database display area 50 positioned in the lower portion of the display section 13 represents a database of the user and comprises a phone book icon 51, an icon 52 to scroll the screen in the direction of the past, a direction shifter icon 54 to shift the direction of the building icon 46 to a two-dimensional display so that it is front positioned, and a direction shifter icon 55 to shift the direction of a billboard icon 48 to a two-dimensional display so that it is front positioned.

The respective scale-switching buttons 14B-1, 14C-1, and 14D-1 at the card side portion allow displays to be switched to a month-basis display, a week-basis display, and a day-basis display. The day-basis display is arranged in a position corresponding to a position closer to the earth, the week-basis display is arranged at a height corresponding to a height of a bird's eye, and the month-basis display is arranged in a position corresponding to a view point of a satellite.

FIG. 11D shows a month-basis display 150. In this month-basis display, an upper portion of the display section shows a vicinity of a current time and a lower portion of the display section shows the future. The bar chart shows a total amount of the day's schedules.

As shown in FIG. 11E, continuous touching of a scroll icon scrolls the time axis and detaching the pen therefrom stops scrolling.

On the screen in FIG. 11F, for example, double-touching an area 154 of November 14 shifts the time axis to a day-basis time axis of the operation day. On the screen in FIG. 10A, double-touching the building icon 46 displays a schedule content, as shown in FIG. 10B. Here, to change the schedule display from that of November 14, the building on the time axis is dragged to a desired time position, as shown in FIG. 10C.

As shown in FIG. 11A, when a received mail messages icon listed on the screen is double-touched, the selected mail message among received mail messages is opened. This window lists names and titles of mail massages. When a mail message icon is double-touched, a lower-level menu window appears, as shown in FIG. 11B.

Here, as shown in FIG. 11C, when a time display area in the top portion of the display section is double-touched, the display mode returns to a time-axis display mode.

To simply close a screen, double-touching a closed box icon on the upper-left corner is sufficient. As shown in FIG. 10D, when any key of the keyboard is double-touched with the pen-input operation member 14A, a memo-input screen appears such as that shown in FIG. 10E. From the icons positioned in the top portion of a window of the input screen (on the title bar of the memo screen), an input-format selection icon 96 for schedules is selected and double-touched.

Then, a schedule display screen 100, as shown in FIG. 10F, appears. On this schedule display screen 100, the time is set by tracing a scale with the pen-input operation member 14A. When a user name is entered, an icon representing relevant data, if any in the database, is displayed after the entered name.

An alarm on/off icon 106 is used to specify whether or not an alarm is to be used. Further, one building type is selected from building icons 104A to 104D by touching one desired icon.

Upon closing the input screen to input the aforementioned schedule, as shown in FIG. 9A, the building icon 46 representing the schedule is automatically pasted along the time axis.

Next, to create an E-mail message, a memo-input screen 90 is opened, as shown in FIG. 9B. From the icons positioned in the top portion of a window of the memo-input screen 90 (on the title bar of the memo screen), an input-format selection icon 92 for memos is selected and double-touched.

Then, an E-mail display screen 110 such as that shown in FIG. 9C appears. On this E-mail display screen 110, input operations are carried out from the keyboard. When a user name is entered, an E-mail address is automatically retrieved from the database and displayed in the electronic mail display screen 110. After an E-mail massage has been created, the electronic mail display screen 110 can be closed when a closed box icon 112 positioned at the left end of the title bar on the top of the electronic mail display screen 110 is touched with the pen-input operation member 14A.

Upon creating the E-mail massage and closing the screen 110, the E-mail massage is stored in the outgoing mailbox icon 32; and when a card comprised in the portable apparatus of this embodiment is linked to a telephone line, the message is automatically sent out.

Next, when schedule items (a TO-DO listing) are created, as shown in FIG. 9D, the operation section 14 is used to touch the keyboard. Then, as shown in FIG. 9E, the memo-input screen 90 opens in a memo mode. From the icons positioned in the top portion of a window of the memo input-screen 90 (on the title bar of the memo screen), an input-format option icon 94 for the TO-DO listing is selected and double-touched with the pen-input operation member 14A. For reference, touching a reply-to button changes the screen to a reply-mail creation screen.

Then, a TO-DO listing display screen 120 such as that shown in FIG. 9F appears. In a handwriting area 122 of this TO-DO listing display screen 120, characters are handwritten as ink data.

In FIG. 9F, the character string "BUY WINE" is entered by handwriting. In this input, the characters are not displayed by use of a font data such as Mincho font data nor sans-serif font data but by use of a handwriting-font data. Although, it is not shown in the figures, characters entered from the keyboard as text data are displayed as text data by use of a font data such as Mincho font data or sans-serif font data.

When a character is entered in this handwriting area 122, this area is pasted and displayed as it is on the time axis.

This TO-DO listing has two types; one is a TO-DO listing which is fitted along the time axis, another is a TO-DO listing which is not fitted along the time axis. With a time specification, a legged billboard icon is pasted along the time axis as a TO-DO listing which is fitted along the time axis. For a TO-DO listing which is not fitted along the time axis, a non-legged billboard is simply displayed as a floating object in a portion of the time axis.

Normally, billboard icons disappear as time elapses. However, when a TO-DO listing fitted along the time area is not intended to be deleted, the billboard icon remains displayed in a lower portion until the delete operation is carried out. When plural billboard icons remain in the lower portion, they are displayed as multiple layers.

To delete the billboard icon, as shown in FIG. 8A, the operation section 14 is used to check it off, and the billboard icon 48B representing the TO-DO listing is deleted.

Next, to search a database, as shown FIG. 8B, a database box icon 51 is double-touched with the pen-input operation member 14A, the screen shifts to a for-searching database display mode.

As shown in FIG. 8C, in a search-mode screen 60, the word to be searched for, for example, initial letters "ya" of a personal name is entered from the keyboard in a search-word input tab 62 and a binoculars icon 64 is touched with the pen-input operation member 14A. This operation starts a search for the entered word and upon completion of the search, searched data can be displayed.

FIG. 8D shows a listing of searched data which is displayed in a searched data list display screen 70. When a selection tab 72 of desired data among the searched data is double-touched with the pen-input operation member 14A, detailed data can be displayed in a data display screen 80, as shown in FIG. 8E.

Next, to create a memo, as shown in FIG. 8F, the pen-input operation member 14A is used to touch a key of the keyboard. Then, as shown in FIG. 7A, the memo-input screen 90 in the memo mode opens and in this screen 90, handwritten characters are entered as ink data by use of the pen-input operation member 14A.

In FIG. 7A, the character string "TAXI Y720" are entered by handwriting. In this input, the characters are not displayed by use of a font data such as Mincho font data nor sans-serif font data but by use of a handwriting-font data. Although, it is not shown in the figures, characters entered from the keyboard as text data are displayed as text data by use of a font data such as Mincho font data or sans-serif font data.

Consecutively, when a closed box icon 99 is touched with the pen-input operation member 14A, the memo-input screen 90 is closed, and as shown in FIG. 7B, the memo is pasted and displayed on the time axis in the form the manhole icon 49. Conversely, by double-douching the manhole icon 49, the memo-contents display screen 90 appears.

(Software Structure of the Portable Apparatus)

FIG. 4 is a block diagram of a portable apparatus to achieve a hierarchical structure as described earlier.

As shown in this figure, as a display controller system, the portable apparatus comprises an operation section 14, a sound-input section 17, a first to a fourth display definition section 210A to 210D, a display controller section 260, and sound-output controller section 270. The operation section 14 is connected to the display definition sections 210A to 210D, in which information relating to the screen selection for a display section 13 and various types of definition information to be input are output.

Next, referring to FIG. 5, a detailed description will be given of the display definition sections 210A to 210D.

As definition information, the first display definition section 210A defines an initial screen which is composed from data compounded of time-indicating font data and is displayed after the power switch is turned ON on a background screen displayed using special metaphor. The screen changes to a main screen by operating a key 14.

As display information, the second display definition section 210B defines upper-level menus of the main screen which is three-dimensionally displayed. In this embodiment, the display field is comprised of, for example, three modes: a display area "schedule" which displays icons around a day-basis time axis, an "E-mail" area, and a "database" area which displays an icon for direction-shifting which is two-dimensionally displayed when a direction is shifted. However, the display field may be comprised of four modes with an additional area in which "date" is indicated by numerals. As shown in FIG. 1, these four modes each are displayed in a top-down order from the top of the display section 13, as follows: a "date" mode 21 is in-an upper region, an "E-mail" mode 30 is below the foregoing, a "schedule" mode 40 is in a middle region, and a "database" mode 50 is in a lower region. This four-mode group is displayed on the main screen which is defined through the initial screen which appears after the power switch is turned on. The operation section 14 is operated to select one of the modes on the main screen, which allows lower-level screens of the selected mode to be displayed.

This selected information is output to the third and fourth display definition sections 210C and 210D from the second display definition section 210B.

For reference, other displays on the aforementioned main screen include the following. Icons 31, 32, 33, and 34 and the like are displayed in the icon field of the "E-mail" mode. In the "schedule" mode, the time axis which changes in shape into a time-basis three-dimensional form is displayed and when the time axis contains a schedule given, background colors are displayed in a schedule/non-schedule-indicating background-display area. In the "database" mode are displayed icons such as a telephone icon 51, scroll icons 52 and 53, and direction shifter icons 54 and 55 that are used for search operations on the database. Any one of the foregoing icons can be selected by using the operation section 14 to select a desired icon, characters, and the like. The selected information is output to the third and fourth display definition sections 210C and 210D from the second display definition section 210B.

Referring to the output from the second display definition section 210B, the third display definition section 210C defines upper-level menus of the selected icons, characters, and the like, including lower-level menus, if any, as display information. An example of the lower-level menus is given in FIG. 11B. For example, when a "Received Mail Icon" 33 is selected in the second display definition section 210B, the third display definition section 210C defines the display information of an "E-mail Display Screen" 140 (FIG. 11B) as a lower-level menu. These lower-level menus are driven to be displayed by the display driver on the main screen of the display section 13 in the form of a window for example.

Thereafter, operating the operation section 14 allows selection of one of the lower-level menus on individual screens of the modes. This selected information is output to the fourth display definition section 210D from the third display definition section 210C.

Referring to the output from the second or third display definition section 210B or 210C, the fourth display definition section 210D defines, as display information, the selected upper-level menu (only when this upper-level menu does not include a lower-level screen) or a display screen or a definition screen corresponding to the lower-level screen.

When a screen is defined by the fourth display definition section 210D, the display driver section carries out display-control on the individual mode screens and further on the display section 13 for the screen and the lower-level screen. For example, in a "directory" mode, a search mode 60 (FIG. 8C) is displayed by the third display definition section 210C and further when the binoculars icon 64 is selected, a data list display screen 70 (FIG. 8D) is displayed by the fourth display definition section 210D. Further, an "E-mail display screen" is displayed, and touching the reply-to button icon 142 of this screen displays a reply-to mail creation screen.

For reference, thereafter, various types of information corresponding to the selected items are enabled to be entered by use of the pen-input operation member 14A. The defined conditional information is overlaid in the acting definition screen of the display section 13 to allow the defined information to be confirmed in operation. In addition, if two or more lower screens are needed, the display definition section may be increased, for example, with a fifth and a sixth ones.

(Display Definition Sections)

Hereinbelow, a detailed description will be given of the display definition section 210 with reference to FIG. 5. As shown in this figure, the display definition section 210 comprises a data processing section 230 to perform processing data body mainly according to time information from the clock section 11 and communication information from the communication section 15; a UI processing section 240 to create data such as data of a background image on the display screen and character data for icons and to define the display screen itself to process the user interface according to data from the data processing section 230 and input data from the operation section 14; and the storage section 12 which contains data to be processed in the data processing section 230 and data to be processed in the UI processing section 240. The data processing section 230 and the UI processing section 240 interact for input-processing data from the operation section 14.

The data processing section 230 is comprised of processing sections in accordance with functions of applications, such as a mail processing section 230A to process mail data, a memo processing section 230B to process memo data, a database data processing section 230C to process data of the database, and a voice memo processing section 230D to process voice memo data.

As a type of the information to be processed by this data processing section 230, included are communication information from the communication section 15, the time information from the clock section 11, and input-output information according to the operation of the operation section 14. The communication information includes E-mail information sent out or received through the communication section 15 and information on the mail-information received time which is stored in a header section accompanying the E-mail information. The information on mail-information received time and the E-mail information are stored as a set in a data management section 220 in the storage section 12. When the communication information is sound-information, the sound-communication information includes received-time information on voice-mail information that is stored in a header section accompanying the voice-mail information.

The input-output information comprises a schedule information including input schedules and specification-time information that is stored in a header section of the schedule information when the user specifies a scheduled execution time for the schedule information. These two types of information are stored as a set in the data management section 220 in the storage section 12, as the input-output information. When the input-output information is sound-information, the sound-input-output information includes voice memo information having input voice memos and input-time information on voice-memo information that is stored in a header section accompanying the voice-memo information.

The UI processing section 240 is comprised of auxiliary data accompanying the data body to be processed in the data processing section 230, for example, the data-received time information of the headers, a contents-analyzer section 242 to analyze the contents of the auxiliary data such as the size and number of files, an update-processing section 244 to update display images according to time information from the clock section 11 and operation-inputs from the operation section 14, a background image character data controller section 250A to create background images, an icon character data controller section 250B to create icon information, a font data controller section 250C to create character information, an image combining section 252 including a state holder section to synthesize either one of the pieces of data from the data controller sections 250A to 250C.

The contents-analyzer section 242 comprises sections such as a header analyzer section 242A to analyze the contents of a plurality of headers 1, 2, . . . in the header sections, a file size analyzer section 242B to analyze the contents of file sizes, and a file number analyzer 242C to analyze the number of files. Furthermore, the header analyzer section 242A serves the header analyzer sections, for example, it serves as the received-time header analyzer section when the header section stores the received-time information, and it serves as the specification-time header analyzer section when the header section stores the specification-time information.

As a metaphor environment creating means, a background image character data controller section 222A refers to a control signal from an operation-input controller section 280 and receives an execution result from the data processing section 230, based on which the controller section 222A creates a background image and outputs it to a display section 13, the background image being such that it uses metaphor (character data) simulating a real-world landscape and event that are perceivable to users in their daily life.

An icon display character data controller section 222B receives an interpretation result which is the output from the contents-analyzer section 242 and, according to the data from the storage section 22 (data on selection of a corresponding function from the preset functions), commands the image combining section 252 to change a performance state of the display screen and the like. For example, when the header section stores the received-time information, the icon display character data storage section 222B refers to a result of analysis (comparison of data-received times) and serves as an icon display character data controller section to display icon display data in the icon character data storage section 222B of the data storage section 222 on a display screen of the display section 13 in the reception order.

In this way, for example, the E-mail information is comprised of text data which is the data body and the auxiliary data stored in a header section of this E-mail information and accompanying the text data. This auxiliary data includes data such as data-received times and file sizes. The contents-analyzer section 242 determines whether or not the auxiliary data is received and fetches the auxiliary data such as a data-received time. Therefore, the header analyzer section 242A (data-received time) and function sections of the file size analyzer section 242B (data amount) determines the data type by file extensions (the auxiliary data also has a file name in its header section), such as TXT, GRP (graphics), and Exls.

The icon display character data controller section 222B thus fetches the information and, in accordance with data such as the data-received time indicating the degree of urgency, retrieves corresponding character data to incorporate it in an intended object.

The image combining section 252 comprises the state holder section to hold a current performance state and outputs the data onto the display section 13 through a display controller section 260.

The storage section 22 comprises the data management section 220 to store data processed in the data processing section 230 and the data storage section 222 to store data processed in the UI processing section 240.

The data management section 220 comprises levels of sections such as a mail data storage section 220A to manage data such as an address book, memo data storage section 220B to manage memo data, and a voice memo data storage section 220C to store voice data.

The data storage section 222 comprises the background image character storage section 222A to store a plurality of background image character data (such as time axis and sky metaphor), a background image character storage section 222B to store a plurality of icon character data of the icon information, and a font data storage section 222C to store a plurality of font data. The background image character storage section 222A stores a metaphor-applied display image such as a view or outlook of sky metaphor.

The data storage section 222 comprises a metaphor-rule storage section in addition to the background character data, the icon character data, and the font data. In the metaphor-rule storage section are stored applied metaphor rules such as a movement range and a display method for a character in the sky metaphor composed of a character which represents a sky view which represents the operation environment.

The operation-input controller section 280 comprises controller sections to perform control in accordance with an operation-input from the operation section 14, such as a sound-input controller section 280A to transmit-control sound-input information from a sound-input section 27 for the data processing section 230; a key input allocation controller section 280B to control the relationship among a plurality of operation buttons such as 14A, 14B, and 14C, icon information on the display section 13, and a cursor; a data input controller section 280C to relate other input information than the sound-input information to be input, such as handwritten-character input information, to fonts of the display section 13; a screen hierarchy controller section 280D to change the screen hierarchy (upper-level menu←→lower-level menu) and control the screen hierarchy so that screens are displayed disjunctively; a mode switching controller section 280E to control switching among various display screen modes, an enlarge/reduce controller section 280F to control an enlarge or reduce operation for an entire screen or a specific region of the screen (so as to allow time intervals on the time axis to be enlarged or reduced and to allow an icon-information size to be enlarged or reduced in conjunction with the enlarged or reduced time axis); a scroll controller section 280G to control scrolling of a display screen, and a move-icon controller section 280H to control moving of icon information of a display screen and the like.

The sound-input controller section 280A provides another function that, for example, when the data input controller section 280C and the like functions, detects the position of an input coordinate corresponding to the display section 13 during operation-inputting and outputs the coordinate position as data to the UI processing section 240 in accordance with the state display screen.

The display controller section 260 receives data of current state from the image combining section 252, reads out a necessary display image to form a display screen, and outputs it to the display section 13.

In this way, the aforementioned data management section 220 is used as a first storing means and the data storage section 222 comprised of various data storage sections is used as a second storing means.

In the data management section 220, different attribute types of information, such as mail data (communication information) and memo data (input-output information) are stored separately per attribute in the mail data storage section 220A, the memo data storage section 220B, and the voice memo data storage section 220C. In the individual storage sections, in addition to the display data, plural types of attribute information to identify the plural types of information are stored; for example, the data is stored with each file-specific extension for the mail data, memo data, voice memo data, and the like. Furthermore, These files of the display data are accompanied by plural pieces of time information relating to the plural types of information. The time information includes transfer time information transferred through the communication section, in addition to the information processed in the clock section.

The plural types of information include a first to an Nth information of different attributes, such as communication information (E-mail information, voice mail information) and input-output information (schedule information, memo information, and voice memo information). Here, the "attribute information" refers to the information to identify plural types of information including E-mail files, memo files, schedule files, and voice memo files. An example of the "attribute information" is an extension to identify file types of file systems, but "attribute information" is not restricted to such an example in this embodiment.

The icon character storage section 222B of the data storage section 222 contains plural types of icon information and three-dimensional-display information which correspond to plural types of attribute information. The background image character storage section 222A contains data such as background screen data, time axis display data, background display data, background-screen coloring data, and time-axis coloring data. The background screen data is used to create a background screen which is three-dimensionally displayed. The time axis display data is used to display the time axis of which the shape changes to be wider as it goes to the future and to be narrower to indicate the past. The background display data is used to background-display the time axis area. The background-screen coloring data is used to color-display the background of the time axis area. The time-axis coloring data is used to color-display time zones corresponding to the time axis of the icon information.

For reference, the time axis display data comprises a first to a fourth hierarchy display time axis data. The first hierarchy display time axis data is used to display a first hierarchy partitioned on a time basis. The second hierarchy display time axis data is used to display a second hierarchy partitioned on a day basis. The third hierarchy display time axis data is used to display a third hierarchy partitioned on a week basis. The fourth hierarchy display time axis data is used to display a fourth hierarchy partitioned on a month basis.

Accordingly, a controlling means refers to the attribute information to select respective icon information corresponding to the relevant one of the plural attribute types, and it refers to the time information related to the plural types of information to control a display item on the display screen so that the respective icon information selected is arrayed to the relevant time on the time axis. For further reference, a background screen creation section is formed by the background image character data controller section 250A and the image combining section 252.

The data management section 220 contains the following information: information which is used to display-control to combine the time axis with a background image on the basis of background image data and time axis display data; icon information which is three-dimensionally displayed individually corresponding to the plural types of information and along with at least the time axis; information which is used to select respective icon information corresponding to the relevant one of the plural types of attribute information on the basis of the icon information and the attribute information and to perform control on the basis of the time information respectively relating to the plural types of information so that pieces of the selected icon information are respectively arrayed at the times on the time axis; database display information which is used to arraying-display for-searching selected character information to search plural types of information on the basis of the alphabetical letters; search program information which is used to search plural types of information on the basis of at least the first one of the alphabetical letters; and information which is used to refer to the for-searching selected character information to specify a search term, to search the term using a search program, and to output a searched result.

When the plural types of information are the E-mail information to be sent or received through the communication section 15, the header section of the E-mail information contains the received-time information on the data-received time. Accordingly, the controlling means 210 refers to the received-time information to display the icon information in the received-time order.

When the plural types of information are the memo information to be operation-input, the header section of the memo information contains the input-time information which is operation-input. Accordingly, the controlling means 210 refers to the operation-input information to display the icon information in the creation-time order.

When the plural types of information are the TO-DO information, the header section of the TO-DO information contains the specification-time information which is the user-specified scheduled execution time. Accordingly, the controlling means 210 refers to the specification time information to display the icon information in the scheduled-time order.

As described, the display apparatus of the present invention comprises the first storing means, the second storing means, the displaying means, and the controlling means.
(Display-processing of the Menu Screen)

Referring to one example of the display screen in FIG. 1, for example, a background screen is represented in a road metaphor and each object is arranged in the form of a building icon 46 to command an application program to start. In this connection, the contents-analyzer section 242 analyzes the contents of the auxiliary data such as specification times and file sizes. A character data controller section 250 refers to the data such as the specification times and file sizes to perform icon-display processing for aspects such as the specification time sequence, file sizes, shapes which are different depending on the schedule contents.

The user can select the operation section 14 to operate these icons.

Selecting the building icon 46 starts up a corresponding application (schedule-related program) and displays a display window (lower-menu, lower instruction screen) of the application.

Specifically, when the user selects the building icon 46 in a state where an operation environment (road-metaphor screen) such as that displayed in the display section 13, an input coordinate corresponding to the display section 13 is detected by the operation-input controller section 280 and corresponding data (application startup request) is created in and from the current screen state (the building icon 46 is displayed in an input position). The data processing section 230 receives the above data through the character data controller section 250, selectively executes a corresponding process through the application program (schedule-related program), and outputs an execution result (such as completion of the application startup).

The character data controller section 250 receives the execution result from the data processing section 230, accesses the metaphor rules stored in the metaphor-rule storage section, and then determines a corresponding screen display state (combine-displays on the background screen by using the font data controller section). Using this determined state as a reference, the image combining section 252 modifies the operation state, creates a new operation state, and outputs it to the display controller section 260. According to the new operation state, the display controller section 260 reads out a necessary display image (such as an application startup screen), forms a display screen, and outputs it to the display section 13. In this way, as a result of the selection of the building icon 46, an application startup menu screen is displayed.

During execution of an application, an input operation is carried out by selection of items such as listings and software buttons and thereafter, processing is commanded by selection of the objects on the display screen. Upon completion of an application execution, the window closes and the display returns to the road-metaphor screen which appeared prior to the startup. The above screen-displays detailed contents and status and provides the user with visual information such as the selection and execution of applications.

Furthermore, according to the received new operation state, the operation section 14 creates data (such as an application input) from a following user-input coordinate position. This data is received by the data processing section 230 in the same manner as that described above and is thereby processed as an input data during the application execution. As a result of this processing, corresponding font data is called in the character data controller section 250, the operation state (such as a display screen) of the image combining section 252 is modified, and accordingly the display contents of the display section 13 are modified.

When the user carries out an input operation to terminate the application, in the same manner as described above, the operation state of the image combining section 252 is modified, the window closes, and the display returns to the road-metaphor screen. The display controller section 260 receives data of the modified state of the image combining section 252, performs display-modification of characters (such as image modification and movement), and outputs a result to the display section 13. Operations such those described above provide the user with the visual execution status.

As described above, an operation environment in which objects such as a road, buildings, signboards, a manhole, a sky, and a basement are integrated in the metaphor are provided, by which execution contents of applications are easily understood and the user can understand the display contents, the operation, and the like with a level of knowledge available in the daily life.

As an example shown in FIG. 1, to display the signboard icon 48 through which a message is input, a message is written with the pen-input operation member 14A and the data is saved in a text file. This text file is stored in the storage section 12 by use of the data processing section 230. Then, the UI processing section 240 is used to create a post-it display area 84 through the background image character data controller section 250A and the font data in a font data storage section 222A which corresponds to the text data is combine-displayed on the post-it display area 84. When the data is drawn with a tablet, it is stored in a format such as BMD (bitmap data). It can be held as line information so as to be miniaturized.

As an additional example, in scroll processing, an update-processing section 244 is updated by a scroll controller section 244G to serially update a display screen as an ordinary practice. However, it is preferable that a current time is reread one hour ahead for example, without moving a background screen and the screen is redisplayed by changing only the time. That is, the following is performed. The entire screen is once cleared and the background screen is displayed. Next, one-hour-ahead data is created and it is combined with characters. Then, the display region is moved out in a one direction and updating processing by the update-processing section 244 is repeated. However, a preferable arrangement is that only a new display region be created to supplement the region moved out. That is, an algorithm is preferably prepared such as one that allows a display screen which is common before and after scrolling to be retained as in the state, the retained screen to be redisplayed, and only a new display region which needs to be added to be rewritten.

When display processing is carried out to change a color of a background screen of a time with a schedule, a start time and a finish time of the period need to be analyzed. That is, the start time and finish time are saved in the data body as auxiliary data. Alternatively, the start time may be combined with a schedule time to be retained in the data body as auxiliary data. For a schedule, since various data, such as meeting attendants, in addition to importance degrees, is held as plural headers, a title and a time can be displayed at the same time. By this, the schedule tightness can be seen.

Furthermore, when an enlarge/reduce processing is performed, plural character patterns enlarged or reduced are prepared according to the enlarge/reduce controller section 280F and the update-processing section 244 and they are modified one by one.

Hereinbelow, with reference to FIGS. 15A, 15B, 16A, and 16B, a description will be given of data tables used to display menus in connection with the display operation of the initial screen and the main screen which are displayed when the power switch is turned on.

FIG. 15B shows a menu data table (Table 2) that is formed of menu title data to identify each item of menu data, menu type data to indicate types used to display the menus, background screen character data pointers BI1 to B19, . . . which point to addresses at which background screen character data in FIG. 16A which are to be used as menu backgrounds are stored, and the layout-position data which indicates layout positions of icons by the x-coordinates and y-coordinates of a screen. For reference, it is preferable that the table also stores the next-lower-hierarchy menu number data positioned in the next-lower hierarchy and icon number data indicating icon numbers with the next-lower hierarchy menus.

The menus defined in this menu data table represent the main screen and the next-lower hierarchy modes of the main screen. Icons corresponding to functions of the scheduler of this embodiment are displayed on desk menus.

FIG. 15A is an icon data table (Table 1) that contains plural items of icon data. This table is formed of function name data which identifies individual items of icon data and corresponds to individual icons, character data pointers DI1 to DI18, . . . which point addresses at which icon character data in FIG. 16B are stored, and function program pointers which point to addresses at which items of icon character data are stored, and function program pointers which point to addresses at which function programs F1 to F9 in FIG. 13 in which functions corresponding to icons are defined.

As described above, the data tables are used to display the menus. Next, display processing is shortly described.

When the types of menus to be displayed on the menu data table (Table 2 [FIG. 15B]) are referred to and a full screen is displayed character data (FIG. 16A) pointed to by the background screen character data pointers Bl1–B19, . . . , is displayed on the entire screen. In the case of pop-up type, a pop-up window frame is displayed and in the same manner as above, the background character data is displayed in the window. Then, icons to be combined and the icon layout position data in the icon data table (Table 2) and items of the character data (FIG. 16B) pointed to by the character pointers DI1–DI18, . . . , of the icon data corresponding to the aforementioned icons in the icon data table (Table 1) are referred to, the icons to be displayed are assembled, and then the assembled icons are displayed according to the layout position data (X1, X2), . . . , in the menu data table.

When icon selection is carried out, function program pointers F1 to F8, . . . , are referred to and corresponding programs (F1 to F9 in FIG. 13) are started.

(Mail Processing Section)

The mail processing section 230A of the data processing section 230 comprises not-shown means such as a mail input-output means, a mail send-receive controlling means, and a destination-listing managing means. The mail input-output means comprises a mail creation processing section to create new mail messages, a mail sending operation section to send mail, and a mail edit processing section to change a mail destination listing. The mail send-receive controlling means includes a mail send processing section to send mail according to the destination address listing and a mail receive processing section to post mail receipt to recipients. The destination-listing managing means comprises a destination-listing initialization section to initialize a destination listing, a destination-listing addition section to add destinations to the destination listing, and a destination-listing deletion section to delete destinations from the destination listing.

(Data Structure)

Hereinbelow, a description will be given of a structure of data which is stored in the mail data storage section 220A of the data management section 220 of the storage section 12 and is used by the programs to perform a window display such as that described above. FIG. 13 shows a hierarchical structure of the data to be stored in the mail data storage section 220A.

The storage section 12 comprises the controller section 22A to store management programs, the application programs F1 to F9 that include an E-mail related program F1, tables including the aforementioned Tables 1 and 2, the data storage section 222 including character data 2220A and 2220B and font data 2220C, and the data management section 220.

When the storage section 12 is used to form an information recording medium of the present invention which is to store at least information in order to create display images, the required information can be at least the items of information shown in FIG. 13.

In this case, information such as the plural items of attribute information to identify the plural types of information and plural items of time information relating to the plural types of information are stored in the individual header sections. The plural items of icon information corresponding to the plural items of attribute information are stored as the items of icon character data 2220B, and the time-axis display data to display the time axis is stored as the background image character data 2220A. Furthermore, items of information such as those described below are stored as a management program 22A. Items of icon information corresponding to attributes of the plural types of information are selected according to the attribute information and information to control the display on the display screen so that items of selected icon information are arrayed at corresponding times along the time axis according to the time information relating to the plural types of information.

The data management section 220 comprises sections such as the mail data storage section 220A, the memo data storage section 220B, and a voice memo data storage section 220C.

The mail data storage section 220A is comprised of plural files 1, 2, . . . Each of these files have a real data section 220A-15 which is formed of header sections 220A-1, 220A-2, 220A-3, . . . to store mail contents. In the header section 220A are stored the data-received time as a header 1 (220A-1), the file size as a header 2 (220A-2), and a name (ID) as a header 3 (220A-3).

The mail data storage section 220A is created for each node that appears in display windows and stored in the storage section 12. Specifically, it is formed to comprise various data entries. The entries include the file size, the data-received time, the name (ID), bitmap data of a photograph of sender's face (or, a pictograph), the display position of the face photograph, the size of the face photograph, mail-open times, mail-transfer times, the display position of mail-message display windows, the size of the mail-message display windows, the time-display position of the lower field of the mail display window, the size of the time display region, the size of the time-display characters, the size of mail-contents characters (fonts), real data (data body) about the mail contents, a senders-listing, transfer destination information (such as an address book and a destination listing), attributes, pointers to icons, and comments. In this embodiment, data other than the deal data (data body) such as the auxiliary data is arranged, for example, hierarchically in the header 1, header 2, . . . from the top and these data contents are in a state where they have been analyzed in the contents-analyzer section 242.

It is preferable that, other data such as a (mail display screen) window management table, and a destination-name management table be included.

The name (ID) is the respective user identifier for which is normally a name or a nickname of the user. To the destination address, a mail receiver address is set. For reference, in ordinary E-mail, an E-mail address is used to specify a storage area of storage section, and by accessing the address, users can have the information on a mail receipt status. The mail-open time is set according to a real time clock in a clock section 21 with the time when a received mail is opened for the first time. To the transfer time is set the time when a mail is sent (transferred or replied to) in accordance with the predefined destination listing. To the attribute is set a flag that indicates whether or not a mail recipient can edit the destination listing or whether or not the mail recipient is absent. To the display coordinate and the size are set items such as a character string to be indicated on a node corresponding to the data structure, a coordinate in a display window displaying an item such as an icon, character strings, and an icon size. To the pointer to an icon, a pointer is set so as to point to a region that stores an icon image (image information, character data) representing a node corresponding to the data structure. To the comment, a comment entered is set. For reference, the number of these entries may be arranged to be variable.

The window management table is a group of data sets used to display various windows on the display screens and is stored in the storage section. This window management table comprises fields of window names, window coordinates, and widths and heights of windows defined by the number of pixels, for example, a message display window and a group of data sets.

Furthermore, the mail data storage section 220A comprises a destination-name management table. This table preserves plural types of information regarding all the registered users and the preserved information is list-displayed on a window. This destination-name management table comprises fields such as names and destination addresses and is formed of a group of data sets corresponding to the aforementioned fields of individual registered users.

(Operation of the Portable Apparatus)

FIG. 17 shows an operation flowchart of the portable apparatus. First, the portable apparatus is turned on and booted. Then, the CPU is commanded by a boot program stored in the storage section to access the PC and reads out an OS (operating system), protocols, and other necessary data that are stored in the storage section.

Next, the portable apparatus 1 displays an initial screen on the display section 13. Then, the screen changes to a main screen, upon which icons are allocated with for-icon functions according to the data and the icons are displayed as characters within display areas. This performance allows the user to quickly make determination and therefore achieves an easier-to-use portable apparatus. For reference, in this embodiment, the character to be displayed may not only be a static image but may also be a motion image when necessary.

Turning on the portable apparatus first displays the initial screen (step [hereinafter, indicated as "S"] 1, that is as "S1"), and operating the operation section (S2) displays the main screen (S3). The main screen is displayed according to the display information provided from the first display definition section 210 in FIG. 14. Specifically, the CPU 18 in FIG. 3 calls the display information corresponding to the main screen stored in the storage section 12, transfers it, and then displays it on the display section 13.

This main screen is shown in FIG. 1, and one of the upper-level menus that is division-displayed is enabled to be selected.

In S3 that is a display of the main screen, more specifically, processes such as those in the flowcharts shown in FIGS. 19A and 19B are carried out. First, any operation carried out generates a state in which the screen needs to be changed. Then, the system determines whether or not an update of the screen is required (S30) and performs background-display processing to update the screen (S32). This background display processing is to create the main screen; therefore, it is performed in a manner so as to paste character data such as the background screen character data BI1–B19 onto specific positions.

Next, if an answer is YES to a query command "Any mail?", the system performs information notification, for example, by displaying a window on a display screen (S34). This information notification is performed only when a mail message is received in the portable apparatus. Therefore, the system first checks if the display is the initial (first) one (S34a), temporarily displays a face photograph of the mail sender and a topic for, for example, a predetermined period of one second, and automatically deletes the display (S34b).

Next, the mail contents are analyzed (S35). In this step, the mail-contents data itself, which is sent in communication, is processed (S35a). For example, the mail data in the storage section 12 of the data management section 220 is stored in the mail data storage section 220A. Further, since the data when it is received has data in plural header sections on the top areas (220A-1, . . . 220A-N) as an electromagnetic signal shown in FIG. 14, items of the information (such as a mail sender name and mail-received time) stored in these header areas (220A-1, . . . 220A-N) are read by the contents-analyzer section 242. File size data which is also included in this information is analyzed (S35c).

A detailed description is not given here, but this header analysis step analyzes other items of data such as a mail sender name.

In this way, by using the background screen character controller section and the icon character controller section shown in FIG. 5, respectively corresponding characters are combine-displayed on the display screen with the icons of E-mail icon bitmap images selected from plural characters of bitmap images stored in the storage section (S36).

Thereafter, a determination is carried out of whether other mail items are received (S37), and when a mail item is found to have been received, the routine of S34 to S36 is repeated; while when no mail item is found, processing is turned to keep a wait state until a next update arrives (the routine of S30 and S31 is repeated). The program is kept in the wait state until it recognizes a key-input. After these steps are repeated until the storage contains no mail data, pigeons are displayed parallel in the background screen.

In S35, for example, suppose an arrangement is made such as that an emergency degree is defined on the basis of a data-received time sequence, and when the emergency degree is higher, a first icon is pasted and when the emergency degree is lower, a second icon is pasted. If this arrangement is made, the header analysis section sets a constant time prior to a current time to a reference and uses this reference to determine an earlier case to be of a lower emergency degree and a later case to be of a higher emergency degree, and on the basis of the analysis result, a desired character icon is combine-displayed on the display screen in S36 by means of the character data controller section.

Furthermore, since the header section contains the information such as the time when the E-mail messages are written, using this information, icons can be pasted at desired places along the time axis in the time order.

In the same manner as above, in the case of memos, a determination is made of whether an update is input for the main screen (S41) and the background screen is display-processed (S42).

Next, when a query command "Any memo?" (S43) is issued, and if it is answered as YES, a post-it window as shown in FIG. 1 is displayed (S44).

For S43, a judgment block asking "What type of memo is received?" may be included.

Then, the same contents-analysis as S35 described above is performed. That is, since the header section contains the information such as the time when the E-mail messages are written, using this information, icons can be pasted at desired places along the time axis. Further, when the data contains text data, the font data controller section selects corresponding font data according to the font data storage section and the data processing section and outputs the selected data to the image combining section. Then, font data of characters such as "1,2,3,4,..." and "A,B,C,D,..." stored in the font data storage section is taken out one by one and pasted on the post-it window for character information output (S40). For reference, the font data storage section stores plural types of font data to provide simulated hand-written characters, in addition to the Mincho and sans-serif font data.

Thereafter, a determination is carried out of whether other mail items are received (S47), and when a mail item is found to have been received, the routine of S44 to S46 is repeated; while when no mail item is found, processing is turned to keep a wait state until a next update arrives (the routine of S40 and S41 is repeated). After these steps are repeated until the storage contains no mail data, signboard icons are displayed on the background screen, for example, as shown in FIG. 1.

For reference, for combine-display processing of other icons relating to different types of information such as the memo icons and schedule icons, the same method as that already described above is applied to combine-display them on the display screen. Therefore, a detailed description of the other display items is not repeated here.

Furthermore, when the icon character data controller section is arranged to control so that a file size larger than a constant size selects a first icon and a file size smaller than the constant size selects a second icon, the respective first and second icons are combine-displayed on the display screen.

In the background display processing of S32 and S44, the time axis is displayed on the main screen in this embodiment. Hereinbelow, a description will be given of a processing flow of the time axis creation with reference to a flowchart in FIG. 20.

When update operations such as scrolling, enlarge/reduce displaying, and mode-shifting have been carried out by use of the operation section (S50), the display region (display scale) to be displayed on the display screen in a standard size is determined (S51) and the time axis is combine-displayed on the display screen in the determined scale (S52). Subsequently, a current time is verified (S53) and respective times to be indicated at one end and another end of the time axis on the display screen are determined according to the display scale and the current time (S54). Thereafter, the background screen covering a time period in a past on the basis of the current time is color-displayed (S55). For reference, it will be understood as a matter of course that since the current time progresses serially, update processing of the time-axis display is kept to be performed corresponding to the progress of the current time. This performance allows the user to visually see that the time axis and plural types of information serially move on the display screen in accordance with the time progress.

Furthermore, the time axis of this embodiment is given a plurality of lattice-like lines, and an area of the background screen corresponding to a zone of the time axis which contains a schedule is color-displayed. In this case, too, as shown in FIG. 20, in the background display processing of S32 and S44, a character is combine-displayed on a corresponding time of the time axis (S60), then, areas corresponding to the zone and a scheduled/non-scheduled area may be color-displayed (S61).

Next, referring back to FIG. 17, when the main screen is thus displayed, when the screen is returned to the original state it returns to the initial screen (S4), and when no operation is performed it turns to a state to wait for an operation.

When a mode-shifting operation is performed through the operation section 14 (S6), the mode switching controller section 280E is used to display background screens in individual modes (S7). This mode-shifting operation is carried out by use of the operation section 14. For combine-display processing of items such as the other icons and the time axis, almost the same method as the aforementioned S2 (more particularly, S30 to S37 and S40 to S47 in FIGS. 19A and 19B), except for the background screen characters that are different from the main screen display processing (S3), is applied. Therefore, a detailed description of the other display items is not repeated.

In the same way, when the screen is to be returned to the original state it returns to the initial screen (S8), and when no operation is performed it turns to a state to wait for an operation.

When a mode-shifting operation is performed through the operation section (S10), the scroll controller section 280G is used to display background screens after they are scrolled (S11). This scroll operation is carried out by using the operation section and moving a cursor. As in the foregoing case, for combine-display processing of items such as the other icons and the time axis, almost the same method as the aforementioned S2 (more particularly, S30 to S37 and S40 to S47 in FIGS. 19A and 19B), except for the background screen characters that are different from the main screen display processing (S3), is applied. Therefore, a detailed description of the other display items is not repeated.

In the same way, when the screen is to be returned to the original state it returns to the screens of individual modes (S12), and when no operation is performed it turns to a state to wait for an operation.

When an enlarge/reduce operation is performed through the operation section (S14), the enlarge/reduce controller section 280F is used to display background screens after they are enlarged or reduced (S14). An operation such as zooming can be carried out by using the operation section.

As in the foregoing case, for combine-display processing of items such as the other icons and the time axis, almost the same method as the aforementioned S2 (more particularly, S30 to S37 and S40 to S47 in FIGS. 19A and 19B), except for the background screen characters that are different from the main screen display processing (S3), is applied. Therefore, a detailed description of the other display items is not repeated. After the above operations, the program again waits for a key input, and when the program has detected a key input it determines whether or not the input is a key input to turn zooming off.

In the same way, when the screen is to be returned to the original state it returns to the screens after they are scrolled (S16), and when no operation is performed it turns to a state to wait for an operation. Thereafter, when another display change operation is performed, operations (S5, S4, S13, and S17) described above are performed.

When no operation is performed to change displays, the program performs A-processing. In this A-processing, as shown in FIG. 18, since icons are displayed in individual screens, the user determines whether or not to select desired icons (S19).

An icon is selected by operation of the operation section and by moving the cursor to a position on one of the icons and clicking thereon. This turns S19 in FIG. 18 to YES. As an example, the information on an icon selected through operation of the operation section is output by the display definition section 210B to the third and fourth display definition sections 210C and 210D. Having received this information input, the third display definition section determines whether or not the selected icon has plural lower-level menus (S20). When the lower-level menus belonging to the selected icon are determined by the third display definition section 210C to exist, the lower-level menus are displayed on the display screens of individual modes. This display is performed in a manner that a window is opened on each-mode screen according to the third display definition section 210C and the lower-level menus are displayed parallel on the opened window. For example, when one "building icon" is selected in S19 from the upper-level menus shown in FIG. 1, the lower-level menus belonging to the selected icon, that is, a "schedule display screen" is displayed (S21).

A lower-level menu is also selected in the same manner as that for an icon by operating the operation section 14. When one of the lower-level menus is selected through operation of the operation section, the determination in S23 is turned to YES, the information on the selected lower-level menu is output by the third display definition section 210C to the fourth display definition section 210D, and the processing shifts to S24. For reference, when the determination in S20 is turned to NO, the processing also shifts to S24. A case in which the determination in S20 is turned to NO is a case in which an object is not included in the lower-level menus. In this case, since the fourth display definition section determines according to an output from the second display definition section that a definition screen corresponding to the selected icon exists, the function of the fourth display definition section 210D performs processing after S24. Alternatively, the third display definition section 210C may be arranged to output to the fourth display definition section 210D the information that the corresponding lower-level menus do not exist.

The operations of S19 to S24 specify one of the items and the function of the fourth display definition section 210D performs S25 and the steps. This fourth display definition section 210D displays a definition screen corresponding to the specified item on the display screen. Consecutively, various input operations are carried out by the data input controller section 280C in accordance with operations of the operation section. When an input operation is carried out through the operation section, S25 is turned to YES and input information is displayed in the definition screen (S26). Thereafter, when the input operation is terminated by operations to be described later, S27 turns to YES, the processing is returned to S3, S7, S11, and S15, and the main screen is displayed again. Furthermore, the definition screen described above displays other lower-level menus to be included in the same class and when one of the other lower-level menus is selected, the program turns S28 to YES, returns the processing to S21, and displays a definition screen corresponding to the selected lower-level menu. When S28 and S27 in each case are turned to NO, the routine of S25 to S27 is repeated.

These hierarchies of the upper and lower-level menus of the first to fourth display definition sections are controlled by the screen hierarchy controller section 280D in accordance with the operation of the operation section.

When an icon is to be moved to a desired position, the move-icon controller section 280H controls it in accordance with the operation of the operation section. In accordance with this control, for example, a desired icon and icon paste position in the icon character data controller section 250B of the UI processing section 240 are determined and output to the display section.

Sound-inputting or the like is also carried out in accordance with the operation section 14 through the sound-input section 17. The sound information is transferred to the data management section by the sounds-input controller section 280A. When a specified time is reached, the sound-output controller section 270 fetches stored sound information in accordance with the operation section, outputs the fetched information to the sound-output section 16, and concurrently performs a desired displaying operation to the display section through the display controller section.

The following describes how to use the PC 180 or portable apparatus 2. First, in a state when a menu screen is displayed, the user operates icons to which corresponding functions are allocated in S6 in FIG. 17. When an item is selected the "schedule" mode is selected from the upper-level menus shown in FIG. 1, and further, when the "building icon" is selected the "schedule display screen" is displayed in S19 through S21. Seeing this definition screen, the user carries out definition-inputting of schedule-related data.

A condition-definition bar is set to a position in accordance with the operation of the operation section, by which positioning in desired areas can be carried out and conditions can be changed. In the same manner as the aforementioned procedures, definitions of various types of inputting are completed for the PC 180 or the portable apparatus 1.

When these input operations are completed, for example, the lower-level menus can be selected and saved. The data is automatically defined as the data for the screen-data definition items and transferred to the PC side.

When the data input in this way is transferred, for example, from the portable apparatus 1 to the PC 180, the PC compares the data with the database display screens on the display section. In this way, the user can enter various types of schedule data from the portable apparatus 1 and can see listings of the data.

It will be understood as a matter of course that the software structures, the memory maps, and the like, can be applied to various other types of information processing apparatuses, PCs, EWSs, and the like, in addition to the portable apparatuses.

Embodiment 2

Referring to FIGS. 21 to 24, a description will be given of a display apparatus of the second embodiment according to the present invention. For the same structures and constitution members as those of the first embodiment, the same reference numerals or characters will be used and a detailed description will not be given below of those already described for the first embodiment.

FIG. 21A shows a display screen 302 currently displayed on a display screen 300 of a PC side. On the PC-side display screen, for example, documents, photographs, pictures, and explanatory texts retrieved from an Internet server are displayed and the displayed graphics can be transferred to a storage section of a portable apparatus of this embodiment. In this case, for example, a camera tool is selected using software (PIM software) specific to the display apparatus of this embodiment and the like and a range specification for target graphics is carried out to select retrieval areas of the graphics. Thereafter, the selections are transferred to a memo of a memo mode of this display apparatus.

Furthermore, as FIG. 21B shows a picture of graphics, the graphics selections can also be transferred to a TO-DO listing in a TO-DO mode.

With the PC and this portable apparatus, data synchronization can be performed for only prespecified items of information; in which the PIM software body, memos in the PIM, and E-mail messages downloaded can be synchronized with this portable apparatus. Therefore, the graphics transferred to the current screen of the PC are also synchronized in this portable apparatus. Therefore, even when users take only this portable apparatus with them, the PIM software body, the memos of the PIM, and the E-mail messages downloaded can be used in the same manner as that with the PC.

FIG. 21C shows a display screen in detail in the portable apparatus side. This figure shows, different from the case of the aforementioned first embodiment, a screen displaying a time axis 312 for a date in the metaphor of a road signboard. Another difference from the case of the first embodiment is that the schedule amount is represented by the height of a building icon.

FIG. 23A shows a screen displaying the graphics transferred to the TO-DO listing as a signboard 318 in a direction-shifted mode. In this way, graphics transferred to the TO-DO listing can also be used as the icon character data.

FIG. 23C shows an example of a screen with which when information notification is preset and when a set time reaches, sound information such as melody is output from the sound-output section and concurrently, a pop-up menu 326 indicating a schedule outline as shown in this figure is displayed adjacent to a building icon 324 in which the schedule has been input. In this way, for the information notification, both the sound information and the display information are used to provide the user with the notification.

FIG. 23B shows a display screen used when a schedule is written in the TO-DO listing. In a state of this figure, the mode of a TO-DO listing 310 is opened and concurrently a window of a character-input interface 322 which is formed of a keyboard display image is opened and keyboard tabs are selected by using the aforementioned pen-input operation section or a finger to write characters and the like onto the TO-DO listing 310.

FIG. 24A shows a screen displaying a note display mode 328. This note display mode 328 also allows the items to be changed for the sequence and a new item to be added. The change of the item sequence can be carried out by touching with a finger or pen-input operation section. The addition of a new item can also be carried out with the character-input interface 322 and by touching keys thereof with a finger or pen-input operation section.

FIG. 24B shows a screen displaying a balloon icon 316. This balloon icon 316 can be used by touching to open an E-mail message and display a lower display image mode that displays detailed contents of the E-mail. This contents display mode is shown in FIG. 24C. In a state of an E-mail display screen 320, the character-input interface 322 can also be used to create and edit reply messages.

Furthermore, created mail messages can also be sent to desired destinations. To send the messages, a card specific to this portable apparatus is first installed with a docking station containing an extended battery and the like and connected to a telephone. Then, as shown in FIG. 22B, the balloon icon 316 representing E-mail on the screen is moved on a mailbox icon 314 so as to be ready for transmission. Thereafter, connection to a telephone line is automatically performed and upon completion of mail-transmission, disconnection from the telephone line is automatically performed.

FIG. 22B shows a screen displaying a plurality of the balloon icons 316 flying over the road to indicate the mail transmission.

FIG. 22C shows an example of the E-mail display screen 320 indicating detailed contents of an E-mail message displayed after one of the balloon icons 316 is clicked. In this figure, in the case of E-mail attached with a schedule, a schedule verification icon 321 is displayed on the E-mail display screen 320. Selecting this icon 321 displays a time schedule display mode which is to be handled as a lower-level menu screen.

FIG. 22D shows a screen displaying a case in which conversely to the above, E-mail attached with a schedule is sent out. Clicking a schedule-OK button allows the schedule item to be automatically registered and concurrently the reply-to E-mail screen to be opened. Then, when the mailbox icon 314 is clicked, the mail is sent out.

Embodiment 3

Hereinbelow, referring to FIGS. 25 to 34, a description will be given of a display apparatus of a third embodiment according to the present invention. Regarding arrangements which are the same as those of the first embodiment, a detailed description will not be repeated. This embodiment has an arrangement in which a display screen in a PC side is as shown in FIG. 25 and a display screen in a portable-apparatus side is arranged as shown in FIG. 30.

FIG. 29 schematically shows an appearance of a portable apparatus 380. The portable apparatus 380 of this embodiment is arranged smaller and lighter so as to be wearable on a wrist of the user. Particularly, the apparatus 380 comprises a wrist-wearing section 384 (FIG. 28) to be put on the user's wrist, a display section 381 to be formed of, for example, an LCD display or the like that is connected to the wrist-wearing section 384, and an operation section 382 that is formed in upper, lower, right, and left portions of the display section 381 to be used to perform various operations of display screens.

The operation section 382 comprises a slider 382A as a first operation button, a recording button 382B as a second operation button, and a track point 382C as a third operation button.

As shown in FIG. 29, specific arrangements are as described below. In the right of the display section 381 is arranged the slider 382A as a mode-selecting means that slides in the directions indicated by arrows A and B. In the left of the display section 381 is arranged the recording button 382B to operate a sound-input section. In the lower portion of the display section 381 is a track point (IBM's trade mark) 382C as a cursor operation key to move a cursor in the directions indicated by arrows C, D, E, and F. The slider 382A is slid once or plural times in the direction indicated by arrows A and B to select one of a communication display mode (notify mode+memo mode), a schedule display mode which is a calendar mode, and a database display mode which is a directory mode.

(Display Screens in the PC Side)

One of the characterized aspects of the present invention is to correspondingly paste-display individual icons, which comprises plural types of functions displayed on the display screens, on a single time axis. Furthermore, because the size of the portable-apparatus display section is smaller than that of the PC-side display section, the size of the maximum time axis of the portable apparatus is accordingly smaller. Therefore, minimum-usable displaying can be achieved.

As shown in FIG. 25, a display screen displayed on a display section 330 is broadly split into three levels: a group of communication display areas 330A and 340, a schedule display area 350 (action), and a database display area 360. The group of the communication display areas 330A and 340 can be split into a region notify area 330A used to shift the mode to a notify mode of a lower level in response to information notification according to received E-mail and the like and a memo area 340 used to shift the mode to a memo mode of a lower level which allows contents of memos and the like to be read. The schedule display area 350 is a region that works as the schedule display mode or the calendar mode to display items such as schedules of the user. The database display area 360 is a region that works to open the directory mode or the database mode of a lower-level to sort items such as the aforementioned E-mail sender listing and address book.

In this case, the communication display area 330A displays a sky metaphor as a background screen, the schedule display area 350 displays a ground metaphor as a background screen, and the database display area 360 displays a basement metaphor as a background screen.

The communication display areas 330A and 340 display a plurality of different shapes and colors of carrier pigeon icons 331 along a power line, nest box icons 332, flower icons 341, and vase icons 342.

The carrier pigeon icons 331 are displayed as an E-mail metaphor and is clicked to allow E-mail contents to be list-displayed. When the E-mail item is opened, a lower-level menu screen 334 is displayed. This menu screen 334 can be displayed to be seen by clicking a "Recognize" tab 330B which is a in lower-level pull-down menu of a "Synfo" tab 333A in FIG. 26. For reference, another tab "Synchronize" is used for data synchronization.

The carrier pigeon icons 331 are line-arranged along the power line in a time sequence of order of E-mails received time order along a time axis. Further, the carrier pigeon icons 331 each are allocated to specific functions according to their shape and color. For example, a black carrier pigeon 331D represents an emergent E-mail contents and message item and a white carrier pigeon 331C represents important E-mail contents and message items.

The nest box icons 332 each comprise a function for sorting-store displayed E-mail items on the basis of the contents and each of them stores plural E-mail items. With this embodiment, the user can sort and manage E-mail items by sorting into a work nest icon 332A and a personal nest icon 332B. When the number of received E-mail items exceeds a constant value, that is, when the number of carrier pigeon icons 331 exceed a certain number, an arrangement may be such as that the nest box icons 332 store the E-mail data.

The flower icons 341 each comprise a function to store the information relating to a memo handwritten-input in a manner such as pen-inputting. Clicking each of the flower icons 341 displays a post-it tab 343 on the display screen. The position of this post-it tab 343 can be changed as desired for its position on the display screen, regardless of the display areas. Therefore, if contents of a memo on the tab 343 relate to a time schedule for example, the tab 343 can be pasted on a desired time axis in the schedule display area; while if the memo contents relate to, for example, a phone number which has nothing to do with a time schedule, the post-it tab 343 can be pasted in the sky on the display screen. For reference, when the post-it tab 343 is clicked again, the display returns to the original state of the flower icon 341. Handwritten inputting to the post-it tab 343 can be carried out by memo-inputting in a memo window corresponding to a "Post-it Creation Menu" shown in FIG. 27. Then, the handwritten input thus created is handled as a "Post-it data to be preserved" item and it is preferably pasted onto a desired position by an operation such as a dragging operation.

The vase icons 342 are sorted into functions on the basis of the memo contents and each vase icon 342 is used to store a plurality of flower icons 341, i.e. memo-related information. In this embodiment, the types of the vase icons 342 comprise a "New" vase icon 342A to store a plurality of memos containing information relatively recently input, a "TO-DO-list" vase icon 342B to store a plurality of memos containing information on items to be done in future, and an "Urgent" vase icon 342C to store a plurality of memos containing information on urgent contents.

The number of flowers in the vase icon 342 represents the number of memos. In this type of display, for example, the number of the flowers are classified into three groups of an at-least-one group, an at-least-two group, and an at-least-three group to prepare three types of characters, and when a plurality of at least three memos are stored but actually 10 memos are stored, simply a "three-flowers" icon is arranged to be displayed. Arranging this way allows the number of character patterns to be minimized and the display processing to be faster with a secured memory capacity.

The schedule display area 350 combine-displays the time axis along with one direction of the display screen and displays a schedule listing 351 at the individual corresponding time of the time axis. Further, the post-it tab 343 is pasted across the schedule display area 350 and the communication display section 330.

The database display area 360 has input tabs to individual databases, which are in this case a "Clients" tab 361, a "Vendors" tab 362, and a "Personal" tab 363, and when one of the tabs is clicked it can be pulled down to lower menus.

For reference, as shown in FIG. 26, the menu screen 334 has display fields of items such as a name 334$a$, a title 334$b$, a company name 334$c$, a company address 334$d$, a company phone number 334$e$, a company facsimile number 334$f$, a home phone number 334$g$, a home E-mail address 334$h$, and a comment 334$i$.

(Display Screens of the Portable Apparatus)

FIG. 29 shows an example of a display screen of the display section 381 of the portable apparatus 380. In this embodiment, as shown in FIG. 29, on the display section 381 is displayed an initial screen on which the same background screen as that of the three metaphors of sky, ground and basement, which is displayed on a display screen of a PC 370, and on this display screen, a time and a date are displayed.

When the slider 382A is operated, a main screen shown in FIG. 30 appears. This main screen performs a three-division display of individual areas (communication display areas 390, 400, and 360) of which attributes are the same as the three individual areas (the group of the communication display areas 330A and 340, the schedule display area 350, and the database display area 360) displayed on the display screen of the PC 370. By closing up one of these three areas, the divisional displays shift to individual area modes.

This embodiment uses metaphors of nature views for individual areas. In particular, upper levels of the display section 381 including the communication display areas 390 and 400 and the sky, in which the weather is suddenly changeable, have images of information "flying" in; therefore, the background screen is displayed as a sky screen. The communication display areas 390 and 400 are classified with respect to the display area into a region notify area 390 to shift the mode to a lower-level notify mode in response to information notification according to received E-mail and the like and a memo area 400 used to shift the mode to a lower-level memo mode which allows contents of memos and the like to be read.

An intermediate level of the display section 381 is a schedule display area 410 that works as the schedule display mode or the calendar mode to display items such as schedules of the user. It is displayed with a ground background screen since the ground has an image in which people perceive the ground to be time.

A lower level of the display section 381 is a database display area 420 that works to open the lower-level directory mode which sorting-stores items such as aforementioned E-mail sender listing and address book. It is displayed with a basement background screen since the basement has an image where things are stable.

Of the items described above, areas being used and screens to activate are enlarge-displayed. Concurrently the areas being used are displayed in a higher contrast, while other areas are displayed in a lower contrast.

Furthermore, as shown in FIGS. 31A and 31C and in the same manner as the display screen of the PC 370 that is shown in FIG. 25, for the display section 381, individual program functions are defined to be represented by plural icons displayed in plural types of animation characters (metaphors) corresponding to landscapes. Examples are described as follows. A carrier pigeon icon 394A displayed in the sky background shown in FIG. 31A represents E-mail. Flower icons 401A, 401B, and 401C in FIG. 31C represent voice memos and the handwritten memos. A butterfly 426 in FIG. 32C presents a cursor. In this way, icons such as those icons 394A, 401A, 401B, 402, and 426 have the same attributes as those of the icons displayed on the display screens in the side of the PC 370.

In connection with the above, on the side of the PC 370, the individual character icons are arranged in high-resolution bitmap data; while on the side of the portable apparatus 380, the individual character icons are arranged in relatively lower-resolution bitmap data, that is, in displaying the characters more simplified than those in the PC side, and is arranged so as not to display character information, even though the character information is also displayed. By this arrangement, in the portable apparatus 380, even when it is as small as a wrist watch, icon-represented characters can be clearly displayed; therefore, such arrangement is preferable from the viewpoint of size reduction of the apparatus. Furthermore, according to the above arrangement, a smaller amount of bitmap data satisfies the memory capacity requirements of the portable apparatus 380, by which the memory capacity furnished to the apparatus 380 can be reduced, or the memory-using regions in the upper-address controller section of the storage section 22 and at lower addresses other than the real address section can be expanded so as to be effectively used to store additional information and to be used to make processing faster.

For an icon, when it is allocated to a function, the carrier pigeon 394A that represents an animal is displayed as a character corresponding to the icon. By this, the user can quickly and visually determine a function allocated to each icon. For reference, an arrangement may be to allow functions allocated to the operation section to be changeable according to the contents of screens to be displayed.

(Details of Various Modes)

A hierarchical structure such as that described above is schematically shown in FIG. 33. As this figure shows, from the main screen, by using the slider 382A, the mode can be shifted to the three modes (the communication display mode, schedule [action] display mode [calendar mode], and database display mode [directory mode]); and when the communication display mode is separated into the two modes, which are the notify mode and memo mode, the mode can be shifted to the four modes.

In the communication display areas 390 and 400, the carrier pigeon icon 394A representing items such as E-mail spontaneously sent from the PC 370 to the portable apparatus 380 is line-displayed in the received-time order.

In particular, by operating the slider 382A shown in FIG. 29, as shown in FIG. 31A, the communication display areas 390 and 400 are enlarge-displayed in the respective display areas. Then, when the carrier pigeon icon 394A is clicked, for example, a window 394 showing an E-mail title, i.e. pictographs drawn by a sender or a face photograph 394a of a sender, a mail-received time 394d, a sender name 394b, and an E-mail representation icon 394c is displayed. When further operations are carried out, contents of E-mail 395 is displayed. In this case, the face photograph of the sender can be automatically converted to pictographs (text data to graphics) when desired. In this way, plural types of data can be automatically converted to desired media.

Here, when E-mail is received by the portable apparatus 380, a sound-output section provides sound-notification as information notification and concurrently, a notification screen 394 showing a digest of the E-mail message is interrupt-displayed on the main screen in the display section 381.

The E-mail arrival is notified to the user by sounds as described above but it can be notified in other ways such as by tones, vibrations, smells, lights, and electrical shocks. In this case, corresponding controller means, which are a tone adjustment controlling means, a smell controller means, a vibration controlling means, a smell controller means, a light-amount/color controlling means, an electrical controlling means, are preferably arranged in the apparatus. In addition, the notification by these media may be arranged to be adjustable for strength.

Referring back to items of the carrier pigeon icon 394A, they are each allocated with a specific function depending upon their shape and color. For example, a black carrier pigeon 331D represents an emergent E-mail contents and message items and a white carrier pigeon 331C represents important E-mail contents and message items. Furthermore, a parrot icon 394B represents voice mail.

Furthermore, as shown in FIG. 31D, when the flower icon 402 is clicked, a window 403 showing a memo-input time is displayed. When further operations are carried out, as shown in FIG. 31C, a post-it like window 404 showing a handwritten memo is displayed. For reference, when the flower icon 402 is clicked, the carrier pigeon icon is displayed on the top of the display screen.

The number of petals represents the file size of memo contents, i.e. an amount of information, and the larger the number of petals shown, the lager is the amount of information contained. Further, the flower icons 401A and 402B each represent a voice memo. In this way, in this embodiment, the data amount, importance degree, urgency, and the like are represented by the icons arranged to be different from each other in size, color, shape, movement, and the like; by which the icon representations are defined according to the data characteristics.

A schedule display area 410 is arranged such that the mode can be shifted to modes each having respective time axis of a time basis, day basis, week basis, and month. Furthermore, as shown in FIG. 32A, when a slider 382A is operated to shift the screen to a schedule (action) display mode, the communication display areas 390 and 400 are enlarged to be larger than the other areas and the database display area 420 is reduce-displayed.

In this schedule display area 410, the time axis is first displayed in a lower potion, then a schedule icon 41 used to list-output schedules according to the time axis is displayed. To this schedule icon 412, fonts outlining the schedule contents are added.

Furthermore, a time axis 413A comprises a scheduled/non-scheduled display area 414A on a partly hatched portion. By color-displaying this scheduled/non-scheduled display area, an input time of a schedule can be quickly known. In such a manner, contents of display data can be pigeonhole-managed with the current time axis on the display screen. In this way, avoiding a complicated hierarchical arrangement, an arrangement such as that described above allows data to be easily searched on the basis of a search key of time. The data intentionally moved on the time axis can be used as a schedule.

Furthermore, a background screen 414 representing the past on the basis of a current-time border line is color-displayed to allow the user to visually recognize the current time, an amount of time data containing schedules, and schedules which have already gone to the past. In this embodiment, items in the time-axis representation for the past and future can be identified with the display color (or inverted black to white). The current time is represented as a differently colored border so as to be quickly identified with respect to the past, the future, and the present when they are displayed. For reference, on the time axis displayed on the time basis, a date is also indicated.

The schedule display area 410 is comprised of the following four modes, each of which allows independent displaying. They are a "5 hour view" 411B (FIG. 32B) to display schedules on a time basis of five hours in the schedule display region, a "Day view" 411A (FIG. 32A) to display a calendar on a day basis, a "Week view" 411C (FIG. 32C) to display a calendar on a week basis, and a "Month view" 411D (FIG. 32D) to display a calendar on a month basis.

For reference, in the "Week view" 411C (FIG. 32C) to display a calendar on the week basis, the schedule icon 412 has two types; an icon 412A indicated in black and an icon 412B indicated with hatched lines. These two types of icons are formed to allow the schedule contents to be distinguished.

Furthermore, operating the track point 382C and a cursor 426 allows a calendar display screen to be scrolled either in the future or past direction. Furthermore, as shown in FIG. 32B, for example, time intervals of the individual time axis can be picked up by link-operation with scrolling to enlarge or reduce the time axis (such as zooming) through the operation section 382.

Furthermore, enlarging or reducing display contents which is linked with the time-axis scale can also be carried out. In accordance with a zoom scale (such as schedule for 5 hours, 12 hours, or 1 week), a data-display range is changed. In this case, depending upon the enlarged or reduced time-axis scale, small-sized data items accompanying schedules becomes visible in a case (an enlarged example in 32B) or not visible in a case (a reduced example in 32D). Even when reduced, from schedule volumes which are displayed with corresponding sizes, a rough schedule tightness degree is known. The scale of the time axis can be adjusted per time-axis unit (a hierarchy of a month, a week, a day, a time, or the like). For reference, a means for changing the color and brightness of a specified day area is also useful. Further, since the time axis moves as time passes, the time-wise positional relationship between the present and targeted events and the like can be clearly seen.

Furthermore, in this embodiment, in the calendar display mode included in the schedule display mode, the butterfly icon is used and while the cursor is moving, feathers of the butterfly are arranged to flap. This arrangement allows the cursor to be visibly more identifiable even when the cursor is used on such a calendar-shown background screen formed in a matrix-like pattern. To carry out such display processing, for example, processing such as that shown in FIG. 34 is preferable.

Specifically, in FIG. 34, first, a determination is performed of whether or not the cursor is commanded to be displayed (S90). If the cursor is not so commanded, the processing is turned to a wait state. If the cursor is commanded to be operated, butterfly character data stored in the storage section is combine-displayed on an instruction coordinate designated by the cursor (S91).

Then, a determination is made of whether or not the cursor is to be moved. If the cursor is not to be moved, the processing ends; if the cursor is to be moved, a step S93 is then performed. In the step S93, control is performed to display a plurality of butterfly character data alternately every one hour, the butterflies each being arranged such that the feathers shake, and concurrently, control is performed to transfer the butterfly character data in accordance with a random cursor-instruction-coordinate value generated in a random-number generation section (not shown).

Then, a determination is made of whether or not the cursor movement is completed (S94). If the cursor movement is continuing, the step S93 is repeated; if the cursor movement is completed, the processing ends.

For reference, in this embodiment, as shown in FIG. 32, the cursor 426 is displayed as a butterfly metaphor, allowing the cursor 426 to be visually recognizable intensively. Here, when operation-inputs are occurred in series from the operation section 382 for a constant time period, the butterfly is preferably arranged so as to appear to be dancing. To make such an arrangement, display-control is arranged to be performed so that the current display position and movement pattern are computed in accordance with the random-number generation section (not shown) to cause an irregular movement, by which display behavior of the cursor 426 changes in such a manner as to repeat an ON-OFF routine.

The database display area 420 displays alphabetical characters, for example, ABCD . . . . In this case, the user is to select items such as a desired personal name, address, and company name on the basis of the alphabetical characters.

For example, as shown in FIG. 31E, selecting the alphabetical character D displays part of a group of data starting with D on a window 422. In this opened window 422 opened, the database display area 420 is enlarge-displayed on other areas, and the communication display area 390 and the schedule display area 410 are compress-displayed.

Thereafter, when the operation section 382 is operated, as shown in FIG. 31F, items such as a phone number and a facsimile number of a job relating to "Dale, . . . " appear on a personal data display screen 423.

For reference, while the modes are not being displayed, that is, while no operation-input is carried out in the operation section 382 for a constant time period, initial screens, for example, as screen savers are displayed on the display section 381. Alternatively, this area may be arranged to be closed according to the necessity and the background of the communication display area may be arranged to be displayed as a black region, as the eyelid is closed.

Embodiment 4

Hereinbelow, a description will be given of a display apparatus of a fourth embodiment according to the present invention with reference to FIGS. 35 to 43. Regarding arrangements which are the same as those of the first embodiment, a detailed description will not be repeated. This embodiment has an arrangement in which a display screen is as shown in FIGS. 35A and 35B.

A portable apparatus 500 of this embodiment has a rugby ball type of an operation section 501 that is formed of a cursor button 501A, which is an elliptical rotation input section, a tab switch 501B, an option button 501C, and a recording button 501D.

This cursor button 501A is arranged to allow three operations: as shown in FIG. 35B, a rotatory operation to rotate it in the direction indicated by an arrow θ on the basis of a vertical coordinate Y; a push-up operation to first push it and then to put it up to the direction indicated by an arrow P; and a push-down operation to first push it and then lower it in the direction indicated by an arrow Q.

The tab switch 501B is arranged to allow push-up/push-down performance in the direction perpendicular to a paper-sheet face.

FIG. 35A shows a state of an initial-screen (default view) 510 after being powered on. This initial screen 510 has an arrangement in which a day display area 510A is located in an upper region of the display section 502 to display a current day, a time display area 510B is located in a middle region of the display section 502 to display a current time, and a date display area 501C is located in a lower region of the display section 502 to display a current date.

After being powered on, on the display section 502 are displayed first the initial screen 510 in FIG. 35A and then a schedule display mode 520A as a main screen in FIG. 35B through an operation of the operation section 501.

This schedule display mode 520A is formed of a date display area 530 located at the top of the display screen and vertical lines indicating a predetermined time axis which comprises a schedule display area 540 as a calendar, a time-axis display area 550A to indicate the time unit of the schedule display area 540, and an icon display area 560 at the bottom of the display screen.

This date display area 530 has, at a lowest end, a black bar 534 formed as an arrow to indicate a current time displayed on schedule display area 540, and it serves as a cursor.

Making a vertical line 544 of the time axis which indicated by the black bar 534 to be a border, for example, as a background screen color display area 542, a background screen of a time region representing the past is color-displayed in dark.

At the lower end of the schedule display area 540, a schedule icon 546 is located at a desired schedule time, which is operated to display lower-level menu schedules.

In the schedule display area 540 is formed a schedule/non-schedule color display area 552 to indicate a position along the time axis corresponding to the schedule icon 546. In FIG. 35B, the schedule icon 546 is formed in a time range from 9:00 to 12:00 o'clock, in which case the same time range from 9:00 to 12:00 o'clock is also color-displayed in the schedule/non-schedule color display area 552 to allow the user to visually detect a current schedule easily on the time axis.

In the icon display area 560 are displayed a microphone icon 562 to indicate that a voice memo has been stored, and an envelop icon 564 to indicate that an E-mail message has been received. When these icons are operated in the same manner as that for the schedule icon 546, lower-level menu items can be used for listening to a voice memo, reading of an E-mail message, and the like.

Pushing the tab switch 501B shifts the schedule display mode 520A to a 6-hour mode, a twelve-hour mode, one-week mode, and one-month mode so as to perform a zoom-in (enlarge-display) operation for the individual display modes. Further, pushing up the tab switch 501B allows a zoom-out (reduce-display) operation. FIG. 35B shows a screen in the six-hour mode, FIG. 38A shows a screen in the twelve-hour mode, and FIG. 38B shows a screen in the one-week mode.

In the state shown in FIG. 39A, pushing down the cursor button 501A shifts the mode from the schedule display mode to the memo mode. Particularly, as shown in FIG. 39B, the push-down operation of the cursor button 501A causes the date display area 530 to jump down to the icon display area 560. Thus, the cursor button 501A is rotated to move the cursor to a desired position and further to the position of the microphone icon 562A. When it is positioned at the microphone icon 562A, the tab switch 501B is then pushed. This allows the user to listen to recorded contents through a sound-out section.

When the recorded information is to be transferred into the schedule display area 540, as shown in FIG. 39C, the tab switch 501B is put up to raise the microphone icon until it touches the black bar 534. Then, as shown in FIG. 40, by pushing up and down the cursor button 501A, the date display area 530 is raised. Thereafter, the cursor button 601A is rotated to move the microphone icon 562 up to a desired time level, for example, 6:00 PM, as shown in FIG. 40C. When the tab switch 501B is pushed down, the microphone icon 562 leaves the cursor and the microphone icon 562 is pasted on the schedule display area 540. Then, transferring of the recorded information into the time axis is completed.

Furthermore, as shown in FIG. 41A, a single push operation of an option button 501C allows mode shifting and re-pushing operation returns to an original normal mode (schedule display mode).

With this embodiment, the mode is shifted to a database mode 600, as shown in FIG. 41B. The database mode has four categories: "Clients" 610, "Vendors" 611, "Personal"

612, and "Settings" 613. For reference, the "Settings" mode is used to perform various adjustments, such as time adjustment.

By operation of the cursor button 501A, a black bar (cursor) 603 is moved in an horizontal direction to select one of the categories; and, as shown in FIG. 41C, by operation of the tab switch 501B, a "Clients" listing 610 is selected. Then, a screen such as that shown in FIG. 42A appears, in which the cursor button 501A is rotated to move a selection bar 603 horizontally and an initial letter K, for example, is selected.

Then, as shown in FIG. 42B, on the side of a personal-name listing is displayed a virtual cursor movable upward and downward, in which the cursor button 501A is pushed up or down so as to select a desired personal name. For reference, when the cursor reaches an end of the display section 602, scrolling automatically starts.

Information provided with a personal name can be displayed by operation of the tab switch 501B. Thereafter, desired information can be searched through screen-scrolling by a push-up or down operation of the cursor button 501A.

When an E-mail message is received, as shown in FIG. 37C, a notification window appears.

When received information is not an urgent one, the information notification is not displayed, and it is automatically given a corresponding envelop icon 564 which can be selected later by the user to read the contents.

When a voice memo is to be recorded, a record button 501 is selected to allow the voice memo to be recorded while the display screen in FIG. 43 is being displayed.

In the schedule display mode in FIG. 35B, rotating the cursor button 501A allows the screen to be scrolled in the same direction as that of the time axis. With conventional arrangements for operation sections, a problem is caused in that when a wrist-wearable portable apparatus, such as a wrist watch, is worn on the wrist and the operation section is operated, display-screen change operations, cursor operations, scrolling operations, and the like cannot be carried out satisfactorily because of the worn direction on the wrist, the size of the operation section, and the like. With this embodiment, however, the operation section is arranged to rotate in the same direction as that of scrolling to improve efficiency of the user operation.

Another problem is caused in that with an all-direction movable pointer, such as a mouse and a track-point, a cursor is easily movable and the direction is rather unstable. With this embodiment, however, the cursor is restricted to be rotatable only in the single time-axis direction; therefore, it can be moved with stability and precision. In addition, this rotatory operation rotatable in the single time-axis direction utilizes centrifugal force and inertia of the rotation and allows the cursor to move with more stability and speed in the single time-axis direction. By performing the rotatory operation in this way, precise horizontal direction and faster movement of the cursor can be achieved; and since the operation execution and the corresponding screen reaction are uni-purposed, an easy-to-understand interface can be realized.

Furthermore, this embodiment comprises out-of-display-frame-data display (cabinet metaphor) function. With this function, a memo (or, an object) pasted onto the time axis moves away with the time axis as time passes; however, a memo that is still necessary even when the time position to which the memo is pasted is out of a display frame still remains without moving away from the frame.

In such a case, for example, a catch-net area is arranged over the left-end area representing the past of the display screen 302 and data which is out of the time axis is pasted in the catch-net area. That is, the catch-net area displays the icon information that will disappear from the display screen as time passes on the time-axis display area.

This display processing with the catch-net is performed according to a flowchart shown in FIG. 20C.

Concurrently with an update processing for the time-axis movement, a determination is made of whether or not an icon has entered the catch-net area (S70). When entered, layers and the like of the icon are displayed on the catch-net area, regardless of the time axis (S71). When an icon has not entered the catch-net area, processing is performed according to the normal time axis. Then, when the icon in the catch-net area has stayed therein longer than K hours from a schedule occurrence time (when the difference between a schedule input time and the current time exceeds K hours), the icon is, deleted from the display screen of the catch-net area (S72). In this way, the icon can be deleted after the constant K hours have passed.

FIG. 36 shows a hierarchical structure of a display screen such as that described above. The operation section allows the database display mode and the schedule mode to be shifted.

FIGS. 44A to 44C show display processing to be performed when a screen is scrolled and zooming is carried out. When the scrolling is carried out, as shown in FIG. 44A, the cursor button 501A, which is a rugby-ball type of operation section, is first rotated (S100) and the rotation direction is determined in processing "A" (S101).

That is, processing "A" of S101 first is a determination of whether the rotation direction is rightward or leftward (S110). When the operation section is rotated leftward, a detection is performed of items of data for the leftward rotations, such as the amount of rotations, the rotation angle, and the number of rotations (S111a). Then, a calculation is performed of the amount of scroll movement on the display screen corresponding to the detected number of rotations, the calculation being performed by use of a data item such as a rotation-number/scroll-movement-amount conversion table (S112a) which has been prepared in advance in a way such as storing. Thereafter, by the calculated amount of scroll movement, the display controller section performs move processing of the display screen, that is, update processing of the display screen (S113a). After the processing as described above, the display-screen scroll processing (S102) is reached.

For reference, in the update processing of the display screen to be submitted to this scroll processing, the processing arrangements below are preferable. When a scroll-moved amount X is smaller than a size X1 in the horizontal direction of the display screen, a display region X1–X of older data which does not need to be updated is temporarily state-held to keep the display screen, and the update processing is performed so as to add only the region X to be newly displayed. By this arrangement, an improvement such as faster processing can be achieved. Furthermore, in S110, when a rightward rotation has occurred, as in S111b to S113b, the same processing as a routine of S111a to S113a is performed.

For reference, in S112b in which the rotation-number/scroll-movement-amount conversion table is independently arranged for the leftward rotation, the table used for the rightward rotation may, however, be shared for the leftward rotation.

Then, the display processing related to the scroll processing is performed (S102). Consecutively, verification is performed of whether the rotation of the cursor button 501A has stopped (S103), then a "B" processing is performed (S104).

The cursor button 501A of the operation section of this embodiment, in addition to the display-screen scroll processing by the rotatory operation, can be used to enlarge/reduce process a display region by the push-up or push-down operation and to move-process the black bar (cursor) in the upper or lower direction. Therefore, the "B" processing described below can also be performed.

As shown in FIG. 44C, the "B" processing in S104 determines which one of push-up and push-down operations is performed (S121) for a push-up or push-down operation of the cursor button 501A which is found to have occurred (S120). When no operation has occurred, the "B" processing terminates. When a push-up operation is detected, a display region in a lower portion is enlarge-displayed (S122). When a push-down operation is detected (S123), a display region in an upper portion is enlarge-displayed (S124). To terminate the enlarge-display processing, the "B" processing is terminated. To continue the enlarge-display processing, the routine starting with S121 is repeated (S125).

In this way, the fourth embodiment allows pigeonhole-management with a display screen of contents of display data created or received on the basis of the time axis at the respective action time. In this way, avoiding a complicated hierarchical arrangement, an arrangement such as that described above allows data to be easily searched on the basis of a search key of time.

Furthermore, the data intentionally moved on the time axis can be used as a listing and a schedule. Further, since the time axis moves as time passes, the time-wise positional relationship between the present and targeted events and the like can be clearly seen.

Furthermore, the past and future can be identified with the display color (or inverted black and white). Therefore, the current time is represented as a differently colored border so as to be quickly identified with respect to the past, the future, and the present when they are displayed.

Furthermore, the time scale adjustment (zooming) and the individual columns (hierarchy of a month, a week, day, time, and the like) can be zoomed for each hierarchical level. Display contents can be enlarged or reduced in connection with the time scale. The data display range is arranged to automatically change to correspond to the zooming scale (schedules in 5 hours, 12 hours, or 1 week).

Since the time axis is enlarged or reduced, smaller representation items of data such as those accompanying the schedule are visible (when they are enlarged) or not visible (when they are reduced). However, such smaller items that are reduced are still useful to see rough schedule tightness when at least the schedule data amount is arranged to be displayed in area-space wise display.

In this embodiment, the control relationship between the rotatory section and scrolling is achieved by preparation of a table that moves for several centimeters every three rotations. However, the embodiment may have an arrangement in which a rotation-angle detecting means is connected to the CPU, and a rotation-number/scroll-movement-amount conversion table that defines the relationship between the rotation angle and the horizontal movement amount is stored in the storage section, and the CPU serves as a rotation-number/scroll-movement-amount converting means.

Embodiment 5

Referring to FIGS. 45 to 55, a description will be given of a display apparatus of a fifth embodiment according to the present invention. For the same structures and constitution members as those of the first embodiment, the same reference numerals or characters will be used and a detailed description will not be given below of those already described for the first embodiment. The fifth embodiment is arranged as shown in FIGS. 45A and 45B.

In these figures, the display apparatus 700 is comprised of a crown 701A which is a rotatory input section as a operation section 701, a zoom-in button 701B arranged on an upper portion of the crown 701A, a zoom-out button 701C arranged in a lower portion of the crown 701A, a function button 701D in a lower portion of a display section 703, and a record button 701E.

The crown 701A is arranged to allow two types of operations: a rotatory operation to rotate the crown 701A in the direction indicated by an arrow R or an arrow "S" in FIG. 45A, and a push operation to allow the crown 701A to be pushed or pulled in the T direction. By the rotatory operations, a cursor moves upward (U) or downward (V). When the cursor reaches the upper end or the lower end, the screen can be scrolled upward (U) or downward (V).

The zoom-in button 701B is used to shift the mode to a five-hour mode, a twelve-hour mode, one-week mode, one-month mode, and a one-year mode. To return a shifted mode to an original mode, the zoom-out button 701C is operated. The zoom-out button 701C is used to select an icon and to display a lower-level menu screen of the selected icon. When the zoom-in button 701B and the zoom-out button 701C are pushed together, any screen can be returned to a one-day-five-hour schedule display mode.

In the one-week mode of the schedule display mode, only an E-mail icon 760 and a voice memo icon 750 are displayed on the time axis and no schedule is displayed. Therefore, for example, to detect a desired schedule time zone to which a schedule is input, first, as shown in FIG. 49D, one-month mode of the schedule display modes is used to set the cursor to the week desired to zoom-in and the week is operated to be enlarged. In the same manner, as shown in FIG. 49C, by selecting a date desired to zoom-in in the one-week mode of the schedule display modes, a desired schedule item can be detected.

In FIG. 45B, a schedule display mode 710 as the main screen is split into, from left, a scheduled date display area 712, a time-axis display area 720, and a schedule display area 730, and a current-time display area 716. The time axis and schedule are represented on the screen so as to be the future in upward areas, the past in downward areas, and a current time on the border line. The area lower than the border line in the background screen, for example is displayed in gray.

In the lower portion of the display section 703, the voice memo icon 750A and the E-mail icon 760 are formed; in an upper portion of the display section 703, TO-DO icons 736A to 736D are formed; and in the schedule display area 730, a schedule icon 734 is formed.

The TO-DO icon 736A, which is an item to be done in the future, is displayed in series with other TO-DO icons on the upper right of the screen representing the future. The size of the TO-DO icon 736A represents importance and urgency of the individual information items. These TO-DO icons are arrayed from left to right in the sequence from the oldest.

The display screen in this case is characterized in that as the required completion time of an item approaches, the icon information items such as the schedule icon 734 and the TO-DO icon 736A in FIG. 45B are displayed larger. Furthermore, the voice memo icon 750A is displayed larger when record time is longer; therefore, the user can recall the contents by seeing the icon size.

Furthermore, the E-mail icons 760 are multilayer-displayed so as to include a folder region in which the same type of icons are sequentially stacked in multiple layers from the bottom to allow an increased number of icons to be displayed. By this arrangement, the number of items such as E-mail messages can be visually and generally recognized by seeing the overlaid condition of items such as blocks. The number of the layers is handled as being numerous when it exceeds a constant number.

When a window is opened by selecting the TO-DO icon 736, a display screen as shown in FIG. 51A appears. By pushing or pulling the crown 701A and using the zoom-in button 701B, "DONE" 738A or "NOTYET" is selected. When a DONE tab 738A is selected, a check mark 789, as shown in FIG. 51B, is displayed, and a display means is arranged so as to explode the window (dialog), in which the explosion provides the user with a feeling of achievement when a TO-DO item is implemented.

A voice memo icon 750, which has already been created, is displayed on the lower right of the screen representing the past.

When the zoom-in button 701B is operated and a voice memo icon 750 is selected, as shown in FIG. 52A, a bar-graph 753 indicating a date, time, and record time of memo creation (recording) is displayed in an upper portion of the screen. The user can refer to this information to recall the memo contents without replaying the contents.

In a lower potion are displayed "scrap" 752A, "replay" 752B, and "move to time axis" 752C, which are icons indicating processing for the memo.

A desired icon is inverted by pushing or pulling the crown 701A, and processing is selected by use of the zoom-in button 701B having a selection function. When no processing needs to be performed, the zoom-out button 701C having a cancellation function is pushed to close the window.

When "move to time axis" 752C is selected, the voice memo icon 750A is caught by the cursor and blinks. Then, the operation section 701 is rotated, dragged to a desired time position, and pasted on the time axis by pushing the crown 701A.

In this case, when the zoom-in button 701B is pushed, a window appears. With this window, a time and date to be set is confirmed, and after, a notifying means such as the tone of an alarm sound, beep sound, or vibration is selected. A voice memo icon 750C is thereby arranged on the time axis (FIG. 52B).

This notifying means has a first notifying means to perform notification in accordance with a user state, a second notifying means to perform notification in accordance with the contents of information, and a third notifying means to perform notification in accordance with the importance and urgency of the information to be notified. One of these three means can be switched. For example, for a state such as a sleeping state, a moderate-blinking state, and in-conference state, a noisy sound is not used, but vibration is used or user names voiced are used for notification of mail arrival. As other notifying means, a tone-changing means, a voice-changing means, a vibration-generating means, a smell-generating means, a light-generating means, an electrical generating means to cause electrical shocks, and the like, can be considered as examples.

When a voice memo is to be recorded, pushing the record button 702 displays a window, as shown in FIG. 54A, and causes the record function to be on standby. In this state, the user can perform recording. When a sound is recognized, as shown in FIG. 54B, a RECORD screen 822 blinks as a recording indication and record-progress time is displayed. When speech sound is stopped, the recording automatically terminates, and a next lower-level menu window 824 is opened.

With this window 824, as shown in FIG. 54C, a date and time of recording is displayed, and processes "delete" 826C, "replay" 826B, and "move to time axis" 826A are selected by pushing or pulling the crown 701A and operating the zoom-in button 701B. When the zoom-out button 701C is pushed, the schedule display screen returns.

When a desktop computer, a notebook PC, or a server receives an E-mail message, the receipt is notified to the portable apparatus 2. In particular, as shown in FIG. 53A, the E-mail icon 760 appears at a current time position and blinks. By the operation of the zoom-in button 701B, a window 761 having a lower-level menu title such as "URGENT" 761B and "R.S.V.P." appears. In the window 761, a face photograph 761A of the mail sender and a summary of the mail contents are displayed.

In this state, when the zoom-in button 701B is further pushed, a lower-level menu 762 appears. The lower-level menu 762 displays a mail-received time, a date, and a sender's name on an upper area thereof. On this screen, when icons in a lower area are used and "Opened" 763B and "Move to time axis" 763A which represent processing of the received mail are selected, action time is notified to the user.

These icons can be pasted freely on the time axis to allow time-wise combination of objects. An example is shown in FIG. 52C in which the voice memo icon 750B is placed on the side of the time axis.

In this embodiment, the voice memo icon 750, E-mail icon 760, input time, and mail-received time are placed on the time axis, and objects that are older than the time being displayed are collected in a lower area of the schedule display region and displayed on the screen by a catch-net metaphor function included in this embodiment.

FIG. 50 shows a sleep-mode screen that is an initial screen displayed after the apparatus is powered on. When the screen is turned to this sleep-mode screen, the area displaying a current time 718 in the lower portion is enlarged so as to cover the screen as the eyelid covers the eye. In this area, a battery level is additionally indicated. For reference, although this area is arranged to entirely close, it may be arranged to display, for example, only a scale to cover about two hours. In the latter case, a main screen does not need to be called to confirm a schedule. The sleep mode thus formed darkens the screen as a security measure, by which schedule contents being displayed can be prevented from being easily seen by a third party. However, icons can still be displayed to allow to know whether or not schedules exist. On the right in the screen, a battery level is indicated.

As a screen saver, the screen can be shifted to the schedule display by the operation of either one of the switches. When no operation is performed in a constant period, the screen returns to the sleep mode.

(Scrolling)

As shown in FIG. 48, the crown is rotated to scroll a screen. The speed of the crown rotation is arranged to match the scrolling speed.

As shown in FIG. 55A, when a screen is scrolled, the crown is first rotated (S130) and the rotation direction is determined in processing "A" (S131).

That is, processing "A" of S101 first is a determination of whether the rotation direction is upward or downward (S140). When the crown is rotated upward, a detection is performed of items of data for the upward rotations, such as the amount of rotations, the rotation angle, and the number of rotations (S141a). Then, a calculation is performed of the amount of scroll movement on the display screen corresponding to the detected number of rotations, the calculation being performed by the use of a data item such as a rotation-number/scroll-movement-amount conversion table (S142a) which has been prepared in advance in a way such as storing. Thereafter, by the calculated amount of scroll movement, the display controller section performs move processing of the display screen, that is, update processing of the display screen (S143a). After the processing described above, the display-screen scroll processing (S132) is reached.

For reference, in the update processing of the display screen to be submitted to this scroll processing, the processing arrangements below are preferable. When a scroll-moved amount Y is smaller than a size Y1 in the horizontal direction of the display screen, a display region X1–X of older data which does not need to be updated is held in a temporary state to keep the display screen, and the update processing is performed so as to add only the region Y to be newly displayed. By this arrangement, an improvement such as faster processing can be achieved. Furthermore, in S140, when a downward rotation has occurred, as in S141b to S143b, the same processing as the routine of S141a to S143a is performed. For reference, in S142b in which the rotation-number/scroll-movement-amount conversion table is independently arranged for the downward rotation, the table used for the upward rotation may, however, be shared for the leftward rotation.

Then, display processing related to the scroll processing is performed (S132). Consecutively, verification is performed of whether the rotation of the cursor button 501A has stopped (S133), and then a "B" processing is performed (S134).

The crown 701A of the operation section of this embodiment, in addition to the display-screen scroll processing by the rotatory operation, can be used to enlarge/reduce process a display region by the push-up or push-down operation and to move-process the cursor in the left or right direction. Therefore, the "B" processing described below can also be performed.

As shown in FIG. 53C, the "B" processing in S134 determines which of a push-in or pull-out operation of the crown 701A is performed (S150). When no operation has occurred, the "B" processing terminates. When an operation is detected, the program detects the amount of movement of the crown 701A (S151). Then, based on the detected amount of movement of the crown 701A, and using a corresponding table and the like, the cursor movement amount is calculated (S152); by which cursor movement processing is performed. Thereafter, for example, display processing such as click-and-drag processing is performed by use of the cursor (S154), and a determination is made of whether or not the cursor is still necessary (S155). In this S155, if the cursor is determined to be necessary for movement, the processing from S150 is repeated; if the cursor is determined to be unnecessary for movement, the "B" processing then terminates.

As shown in FIGS. 48A to 48D, in the scroll operation, the schedule scale can be shifted to be one of five hours, twelve hours, one week, and one month. Therefore, depending upon the scale size, the balance among the date, time axis, and schedule-display area, especially the time-axis width (the width of the time-axis display area 720) is reduced as G1→G2→G3→G4, the width of a schedule/non-schedule color display area 722 is reduced as H1→H2, and the scheduled date display area 712 is reduced as F1→F2→F3→F3 to allow the time scale to be easily grasped. For reference, the schedule titles are also changed corresponding to the scale with respect to the number and size of the display fonts.

(Database)

Selecting the function button 701D shifts the mode to a database mode and, as shown in FIG. 49A, displays a database menu screen 772. The screen of the database mode is displayed in five categories: "PEOPLE" 772A, "OFFICE" 772B, "PROJECT" 772C, "SYNCHRONIZE" 772D, and "PREFERENCE" 772E. The crown 701A is rotated to invert-display a desired category ("OFFICE" 772B in the example shown in FIG. 49A), and the crown 701A is pulled to select the category and move it to a lower hierarchy. Then, as shown in FIG. 49B, an initial selection screen 784 appears and a menu selection region 782 is compressed toward the left. The initial selection screen 784 displays a list of alphabetically sequenced names from the right of the screen, which belongs to a lower-level hierarchy. The menu selection region 782 displays a category of an upper-level hierarchy.

Further, on the initial selection screen 784, the crown 701A is rotated to invert-display a desired initial ("G" in the example shown in FIG. 49B) and the crown 701A is pulled to select the initial and move to a lower-level hierarchy.

When a display screen such as that shown in FIG. 49B is to be generated, a method such as that described below is preferable. That is, generally, a screen on which a cursor is allowed to move is useful, while a screen on which a cursor is not allowed to move is not useful. Therefore, in FIG. 49B, screens other than the initial selection screen 784 are displayed as background screens. The initial selection screen 784 is serially updated according to scrolling, in which when the crown 701A is rotated to A, B, C, D, . . . , the letter "G" or "H" appears. Then, only "G" is selected to be displayed.

The screen after, for example, "G" as shown in FIG. 49C, is selected and displayed as another screen compressed to the left side of the display screen. Here, the initial selection screen 784 is not modified, but another region is modified. For reference, data items are prearranged to be listed in the sequence of the order following the hierarchical structure, by which sorting or re-extracting processing can be eliminated to allow simplified control. From this point, a preferable arrangement is such as that all data items are listed in alphabetical order.

At the hierarchy shown in FIG. 49C, a name selection screen 790 that displays names in alphabetical order is displayed. On this name selection screen 790, the menu selection region 782 and the initial selection screen 784 are further compressed to the left. With this name selection screen 790 being displayed, the crown 701A is rotated to invert-display a desired name and the crown 701A is pulled to select the name. These operations display a personal-data display screen 800 belonging to the lowest-level hierarchy.

On this personal-data display screen 800, the menu selection region 782 and the initial selection screen 784, and a name selection region 796 are further compressed to the left of the screen. On a personal-data display region 808, a face photograph 810, a name 812A, a phone number 812B, and an address 812C are displayed.

In this embodiment, the category "PEOPLE" 772A has a hierarchical structure in which the screens are positioned in a top-down order as the menu screen 772, the initial selection screen 784, the name selection screen 790, and the personal-data display screen 800.

The lower-level hierarchy items sequentially appear from the right of the screen. That is, as shown in FIGS. 49A to 49D, the width of the menu selection region 782 is arranged to become narrower, as L1→L2→L3, as it shifts to lower hierarchical levels, and the width of the initial selection screen 784 is also arranged to become narrower, as M1→M2→M3, as it shifts to lower hierarchical levels. In this way, an arrangement is made such that the hierarchical levels of data are horizontally arranged, items in the hierarchical levels are vertically arranged, the interhierarchy movement is performed by the push/pull operation of the crown 701A, and the intrahierarchy selection is performed by the rotatation of the crown 701A.

Therefore, at any hierarchy level, all the items of hierarchy higher than the currently displayed hierarchy in one screen; by which data is given a hierarchical structure, can be easily understood, and data can be easily moved to another hierarchy. In addition, the direction of the hierarchy of data and the direction of the hierarchy-selection are arranged to be identical so that the operation methods are uni-purposed, by which an interface that can easily be understood is realized.

In this embodiment, the control relationship between the rotatory section and scrolling is achieved by preparation of a table that moves for several centimeters every three rotations. However, the embodiment may have an arrangement in which detecting means such as a rotation-angle detecting means, a left-right movement amount detecting means, and a rotation-angular velocity detecting means are connected to the CPU, and a rotation-angle/vertical-movement-amount conversion table that defines the relationship between the rotation angle and the vertical movement amount, a crown-left-right-movement amount/cursor-movement conversion table that defines the relationship between the crown-left-right movement amount and the cursor-movement amount, and a rotation angular velocity/enlarge-reduce degree conversion table that defines the relationship between the rotation angular velocity and the enlarge-reduce degree are stored in the storage section, and the CPU serves as a rotation angle/scroll-movement-amount converting means, a crown-left-right-movement amount/cursor-movement conversion means, and a rotation angular velocity/enlarge-reduce degree conversion means.

For example, an icon is displayed larger when the importance and urgency of the information increase. Furthermore, as the required completion time of an item approaches, an icon is also displayed larger. Therefore, the user can recall the contents of the icon by seeing only the icon size.

While the present invention has been described with reference to what are presently considered to be the preferred embodiments, it is to be understood that the invention is not limited to the disclosed embodiments and the invention is intended to cover various other modifications and equivalent arrangements included within the spirit and scope of the appended claims. For example, as shown in FIGS. 56A to 56C each showing drawings that illustrate the concept, the portable apparatus including the display apparatus according to each of the embodiments may be used in a network such as that shown in each of FIGS. 56A to 56C. That is, a network may be arranged so that a PC 180 and portable apparatuses 1-2, 1-2, . . . can communicate with each other.

In these embodiments, a description has been given taking an example in which the present invention is worn on the wrist; however, the invention is not limited to such a case, but it can be used for various other purposes on an as-and-when necessary basis. Further, the keys used for the portable apparatus according to these embodiments may be different in number.

Furthermore, a description has been given of a case in which, as a display section member, an LCD display is used. In the present invention, however, the display section member is not restricted to such a display, but other types of displays can be used, such as a thin cathode-ray tube, a small television display using a crystal shutter, and a plasma display. Further, an image displayed on the display section of the present invention is not limited to a three-dimensional image.

Furthermore, when data for icon characters that can be changed, for example, from pigeons to animals is formed in the PC-side display section, an arrangement may be made so that the data for the animal icon characters is displayed in the portable-apparatus-side display section, and the PC and the portable apparatus are synchronized.

Furthermore, an arrangement may be made so that the PC 180 is connected to another Internet server through lines such as an intranet line, and the portable apparatus 2 can access the Internet server through the PC 180, or the portable apparatus 2 and other portable apparatuses can share information through the PC 180.

Furthermore, a description has been given of a case in which a PC is applied as a second information processing apparatus and the display apparatus of the present invention is applied as a first information processing apparatus; however, as the second information apparatus, apparatuses such as a PDA, an MCC, and a server may be used. Further, for the PC used as the first information processing apparatus, such apparatuses such as a workstation, a main-frame processor, and a word processor may be used.

Furthermore, as an apparatus that forms display screens used for the first and second embodiments, an arrangement may be such that a wrist-wearing section is formed.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A display apparatus comprising:

displaying means to combine a time axis with a background screen to be three-dimensionally displayed and to display the combined screen on a display screen, a width of said time axis changing to be wider as it approaches a past time and changing to be narrower as it approaches to the future;

storing means to store background screen data used to display said background screen and time-axis display data used to display said time axis, said storing means having plural types of information of which attributes are different from each other, plural types of attribute information used for identification of types of said plural types of information, plural items of time information related to said plural types of information, and icon information which corresponds to each of said plural types of information and is at least arranged along with said time axis and displayed three-dimensionally; and controlling means to display-control so as to combine said time axis with said background screen in accordance with said background screen data and said time-axis display data, said controlling means being effective for performing selection of said icon information corresponding to the attribute of each of said plural types of information in accordance with said attribute information, and performing control in accordance with said time information related to plural types of information so that said selected icon information is arrayed to each corresponding time of said time axis;

wherein said plural types of information includes file-size information regarding file sizes, and said controlling means performs display-control in accordance with said file-size information so that a length of said icon information changes in the direction perpendicular to said time axis.

2. A display apparatus according to claim 1, comprising clock means to allow said controlling means to display said time axis with changing time in accordance with the current time measured by said clock means.

3. A display apparatus according to claim 1, in which said controlling means performs display-control so that a time width of said time axis becomes wider as time approaches the current time.

4. A display apparatus according to claim 1, in which said controlling means performs display-control by changing the size of said icon information so that it is wider at a past time and it becomes narrower as it approaches future time.

5. A display apparatus according to claim 1, comprising operating means to perform operation-inputting of information of said time axis and said icon information that are displayed on said display screen, and in which said controlling means performs display-control so that a screen image is displayed showing an aerial view on which the time width on said time axis is reduce-displayed along the direction of the said time axis and the size of said icon information is reduced linking with the reduce-displaying in accordance with an operation-input from said operation-inputting means.

6. A display apparatus according to claim 1, comprising operating means to perform operation-inputting of information of said time axis and said icon information that are displayed on said display screen, and in which said controlling means performs display-control so that the time width of said time axis is enlarge-displayed along the direction of said time axis and the size of said icon information is reduced linking with the enlarge-displaying in accordance with an operation-input from said operation-inputting means.

7. A display apparatus according to claim 1, comprising operating means to perform operation-inputting of information of said time axis and said icon information that are displayed on said display screen, in which said plural types of information comprises input information to be operation-input and information regarding time of inputting said input information, and controlling means displays said icon information in accordance with the input-time information.

8. A display apparatus according to claim 7, in which said input information comprises user-specified specification-time information, and said controlling means displays said icon information on said display screen.

9. A display apparatus according to claim 7, in which said controlling means performs display-control to form said icon information within a width-wise region of said time axis so that it is represented to be wider at past time and is represented to become narrower as it approaches future time.

10. A display apparatus according to claim 7, in which said input information comprises first schedule information, second schedule information having contents different from those of said first schedule information, and identification information to identify said first schedule information and said second schedule information; and said controlling means displays said icon information on said display screen in accordance with said identification information.

11. A display apparatus according to claim 7, in which said icon information comprises icon-switching information to perform switching between two-dimensional display and three-dimensional display, and controlling means perform display-switching between the two-dimensional display and the three-dimensional display in accordance with said operation-input to said icon-switching information from said operating means.

12. A display apparatus according to claim 11, in which said icon information displays scrolling scroll-icon information used to perform scrolling along said time axis and said controlling means performs control so that said display screen is scrolled in accordance with an operation-input to said scrolling icon information from said operating means.

13. A display apparatus, comprising:

displaying means to combine a time axis with a background screen to be three-dimensionally displayed and to display the combined screen on a display screen, a width of said time axis changing to be wider as it approaches a past time and changing to be narrower as it approaches to the future;

storing means to store background screen data used to display said background screen and time-axis display data used to display said time axis, said storing means having plural types of information of which attributes are different from each other, plural types of attribute information used for identification of types of said plural types of information, plural items of time information related to said plural types of information, and icon information which corresponds to each of said plural types of information and is at least arranged along with said time axis and displayed three-dimensionally; and controlling means to display-control so as to combine said time axis with said background screen in accordance with said background screen data and said time-axis display data, said controlling means being effective for performing selection of said icon information corresponding to the attribute of each of said plural types of information in accordance with said attribute information, and performing control in accordance with said time information related to plural types of information so that said selected icon information is arrayed to each corresponding time of said time axis;

wherein said icon information comprises plural items of first icon information which are formed of characters different from each other depending upon the attribute of said plural types of information, and said control means selectively displays one shape of an icon of said plural items of said first icon information.

14. A display apparatus according to claim 13, in which said plural items of first icon information are formed of characters different in shape.

15. A display apparatus according to claim 13, in which said plural items of first icon information are formed of characters different in color.

16. A display apparatus according to claim 13, in which said plural items of first icon information are formed of characters different in size.

17. A display apparatus, comprising:

displaying means to combine a time axis with a background screen to be three-dimensionally displayed and to display the combined screen on a display screen, a width of said time axis changing to be wider as it approaches a past time and changing to be narrower as it approaches to the future;

storing means to store background screen data used to display said background screen and time-axis display data used to display said time axis, said storing means having plural types of information of which attributes are different from each other, plural types of attribute information used for identification of types of said plural types of information, plural items of time information related to said plural types of information, and icon information which corresponds to each of said plural types of information and is at least arranged along with said time axis and displayed three-dimensionally;

controlling means to display-control so as to combine said time axis with said background screen in accordance with said background screen data and said time-axis display data, said controlling means being effective for performing selection of said icon information corresponding to the attribute of each of said plural types of information in accordance with said attribute information, and performing control in accordance with said time information related to plural types of information so that said selected icon information is arrayed to each corresponding time of said time axis; and operating means to perform operation-inputting of information of said time axis and said icon information that are displayed on said display screen, in which, said plural types of information comprises input information to be operation-input and information regarding time of inputting said input information, and controlling means displays said icon information in accordance with the input-time information;

wherein said icon information comprises database icon information formed in a past region on said time axis and used to display contents of said database regarding said plural types of information, and said controlling means performs display-control of contents of said database in accordance with an operation-input to said database icon information from said operating means.

18. A display apparatus according to claim 17, in which said operating means comprises a pen-input operation member to operate said icon information, and said controlling means performs character-recognition and display-control in accordance with an input from said pen-input operation member.

19. A display apparatus according to claim 18, in which said operating section comprises a key-input section formed of a plurality of concaved parts.

20. A display apparatus, comprising:

displaying means to combine a time axis with a background screen to be three-dimensionally displayed and to display the combined screen on a display screen, a width of said time axis changing to be wider as it approaches a past time and changing to be narrower as it approaches to the future;

storing means to store background screen data used to display said background screen and time-axis display data used to display said time axis, said storing means having plural types of information of which attributes are different from each other, plural types of attribute information used for identification of types of said plural types of information, plural items of time information related to said plural types of information, and icon information which corresponds to each of said plural types of information and is at least arranged along with said time axis and displayed three-dimensionally;

controlling means to display-control so as to combine said time axis with said background screen in accordance with said background screen data and said time-axis display data, said controlling means being effective for performing selection of said icon information corresponding to the attribute of each of said plural types of information in accordance with said attribute information, and performing control in accordance with said time information related to plural types of information so that said selected icon information is arrayed to each corresponding time of said time axis; and operating means to perform operation-inputting of information of said time axis and said icon information that are displayed on said display screen, in which said plural types of information comprises input information to be operation-input and information regarding time of inputting said input information, and controlling means displays said icon information in accordance with the input-time information;

wherein said icon information comprises a read-E-mail icon formed in a future region on the said time axis and used to read-display contents of contents of said E-mail, and said controlling means performs display-control of contents of said E-mail in accordance with an operation-input to said read-E-mail icon information from said operating means.

21. A display apparatus according to claim 20, in which said controlling means performs control so that items of said read-E-mail icon information are sort-displayed for each of mail to be sent, received, opened, unopened.

22. A display apparatus according to claim 20, in which said controlling means performs control-display so that the amount of E-mail information is displayed for each of mail to be sent, received, opened, unopened.

23. A portable information processing apparatus, comprising a display apparatus according to one of claims 1, 2, 3 to 9 and 13 to 19.

24. A portable information processing apparatus according to claim 23, which is connected to said display apparatus and comprises a wrist-wearing section to be put on the wrist of the user.

25. An information recording medium that stores at least information used to generate a display screen, said information comprising:

background screen data to display a three-dimensional background screen;

time-axis display, data used to display a time axis that changes in shape so that it is wider at a past time and it becomes narrower as it approaches a future time on said background screen;

information used to perform display-control in accordance with said background screen data and said time-axis display data so that said time axis is combined with said background screen; and file-size information regarding file sizes;

wherein said information used to perform display-control is augmented by said file-size information such that said display-control is performed in accordance with said file-size information so that a length-of-icon information for controlling display of an icon changes in a direction perpendicular to said time axis in accordance with said file-size.

26. An information recording medium according to claim 25, comprising:

plural items of attribute information used to identify plural types of information having a different attribute from each other, icon information three-dimensionally displayed corresponding to each of said plural types of information and which is arrayed at least along with said time axis, and information used to perform control so that said icon information corresponding to each attribute of said plural types of information is selected in accordance with said attribute information and each item of said icon information selected therein is arrayed to a corresponding time on said time axis in accordance with said time information regarding said plural types of information.

27. An electronic apparatus comprising a information recording medium according to one of claims 25 and 26.

* * * * *